(12) United States Patent
Yamanaka et al.

(10) Patent No.: US 6,611,785 B1
(45) Date of Patent: Aug. 26, 2003

(54) FLOWMETER, FLOW DETECTING SWITCH, CONTROL METHOD OF FLOWMETER, CONTROL METHOD OF FLOW DETECTING SWITCH, AND RECORDING MEDIUM HAVING RECORDED A CONTROL PROGRAM

(75) Inventors: Hidemi Yamanaka, Saitama (JP); Akinori Kitamura, Saitama (JP); Seiichi Nakahara, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 09/787,134

(22) PCT Filed: Sep. 13, 1999

(86) PCT No.: PCT/JP99/04979

§ 371 (c)(1),
(2), (4) Date: Mar. 13, 2001

(30) Foreign Application Priority Data

Sep. 14, 1998 (JP) ............................................. 10-259807
Sep. 22, 1998 (JP) ............................................. 10-267630

(51) Int. Cl.$^7$ ............................................. G06F 15/00
(52) U.S. Cl. ..................................... 702/155; 73/861.12
(58) Field of Search ........................... 702/155, 66, 83; 73/861.12, 194 E; 364/580; 750/369

(56) References Cited

U.S. PATENT DOCUMENTS 4,100,797 A * 7/1978 Oberhardt et al. ............. 73/861
4,217,496 A * 8/1980 Daniels et al. ............... 250/369
4,910,682 A * 3/1990 Wolff et al. .................... 702/46
4,980,825 A * 12/1990 Tootell et al. ................. 702/83
5,469,746 A * 11/1995 Fukunaga et al. ........ 73/861.12

FOREIGN PATENT DOCUMENTS

| JP | 60-238720 | 11/1985 |
| JP | 60-247117 | 12/1985 |
| JP | 61-75217 A | 4/1986 |
| JP | 1-241919 A | 9/1989 |
| JP | 5-297036 | 11/1993 |
| JP | 9-89613 A | 4/1997 |
| JP | 9-89613 | 4/1997 |
| JP | 11-160117 | 6/1999 |

* cited by examiner

*Primary Examiner*—John Barlow
*Assistant Examiner*—Xiuqin Sun
(74) *Attorney, Agent, or Firm*—Butzel Long

(57) ABSTRACT

A frequency measuring apparatus and a flowmeter which can carry out highly accurate measurement in a short time is provided. A measured pulse signal from a frequency detecting portion is outputted to a first counter as a count input and to second counter as a control signal. The first counter counts the number of the input pulse in each period of the first timer output according to the output from the first timer having been set in 1 second period, for example. The second counter carries out the count of the reference clock from the rising point of the input pulse and measures the period of the input pulse. The arithmetic processing portion calculates the input pulse signal frequency up to the decimal portion on the basis of the count value of the first counter, the count value of the second counter at a generation timing of the output signal from the first timer, and the period of the input pulse.

17 Claims, 43 Drawing Sheets

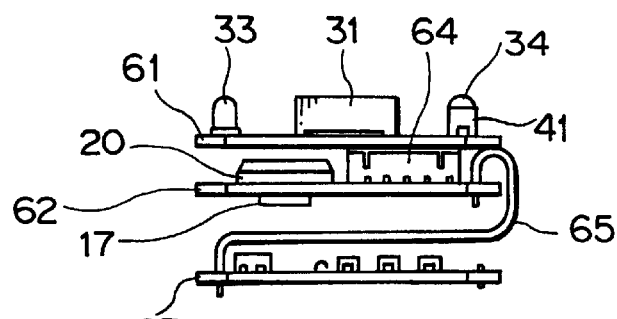
FIG. 10A
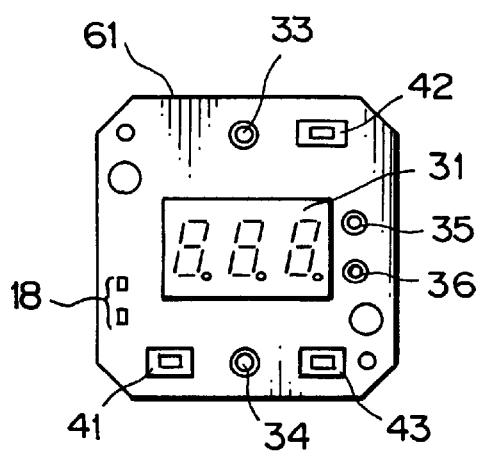 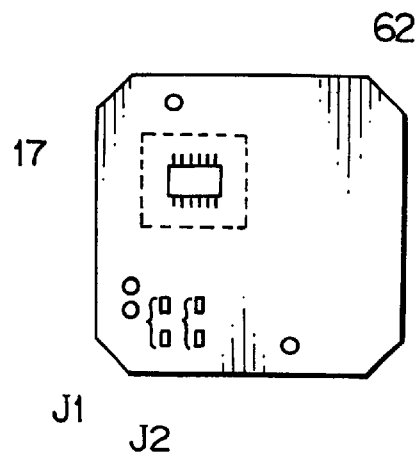
FIG. 10B  FIG. 10C
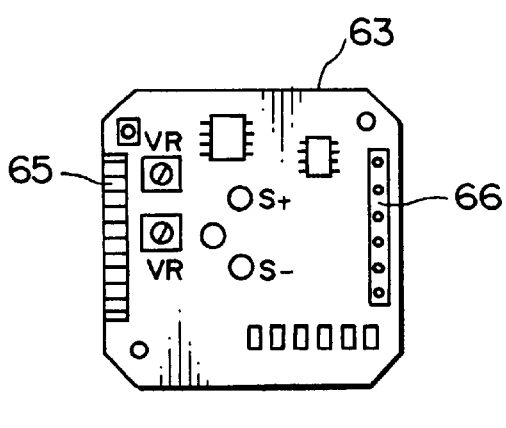 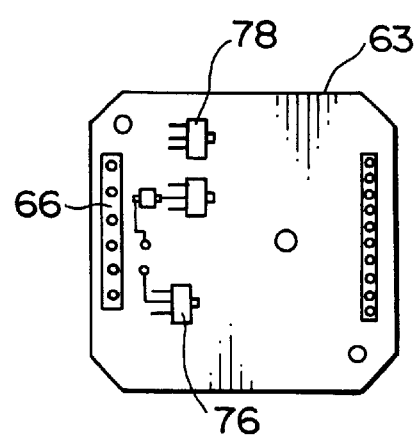
FIG. 10D  FIG. 10E

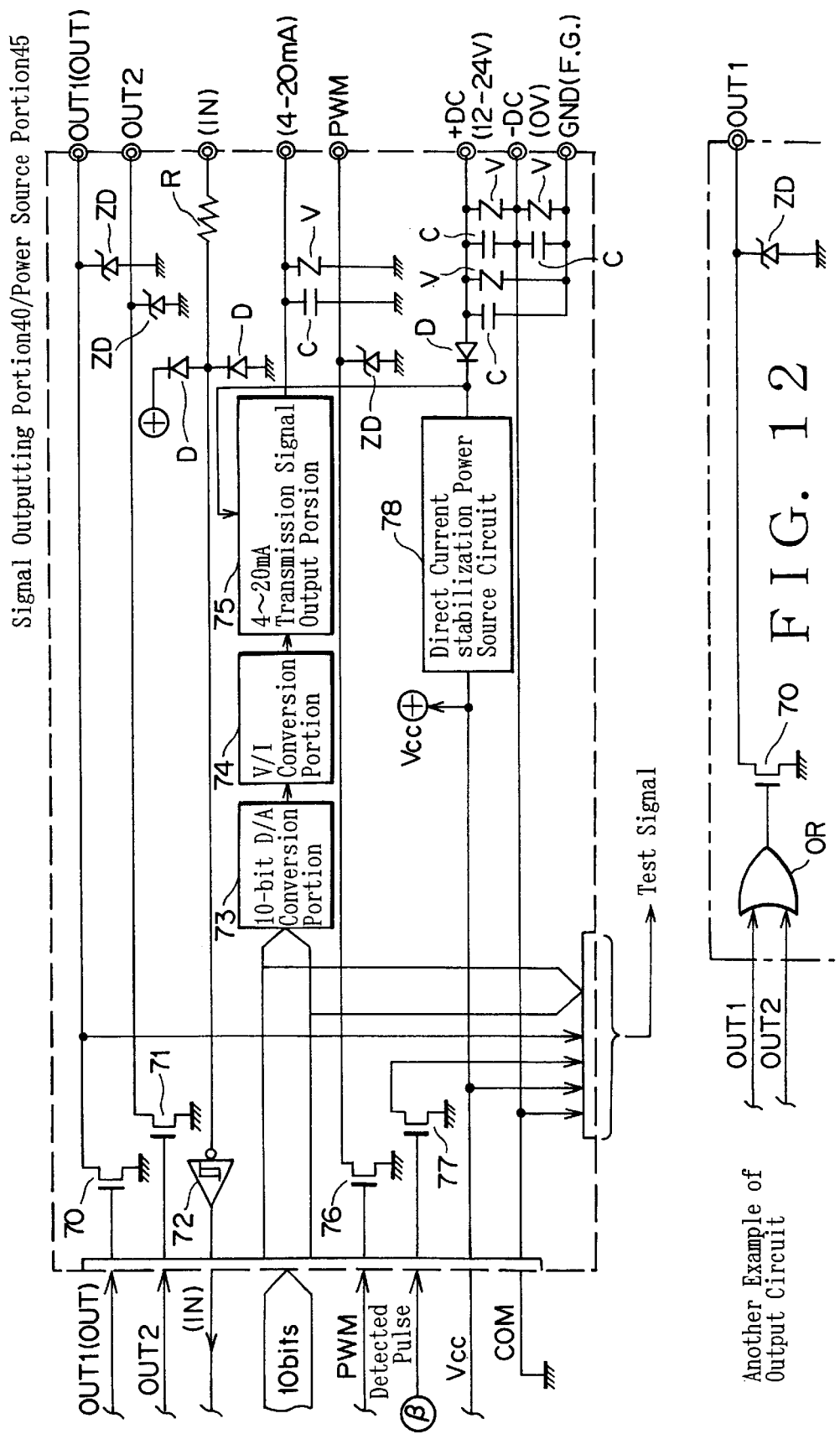
F I G. 12

FIG. 16A Diameter

FIG. 16B Material

FIG. 16C Version of Software

FLOWMETER, FLOW DETECTING SWITCH, CONTROL METHOD OF FLOWMETER, CONTROL METHOD OF FLOW DETECTING SWITCH, AND RECORDING MEDIUM HAVING RECORDED A CONTROL PROGRAM

TECHNICAL FIELD

This invention relates to a flowmeter and control method thereof to measure flow rate of fluid by using a pulse signal having a frequency corresponding to a flow rate from a sensor, a flow detecting switch and control method thereof to compare a measured flow rate and a preset flow rate value and to output a digital output corresponding to a comparison result toward an external apparatus, and a recording medium having recorded a control program.

And, the present invention relates also to a flowmeter to measure an injection rate of each fluid so that a plurality of fluids to be measured can be fixed in a fixed percentage in one tank or to measure an injection rate of each fluid so that a plurality of fluids with different temperature or the like can be mixed in one tank, a control method thereof, and a recording medium having recorded a control program.

BACKGROUND ART

Some kinds of liquids are often transferred, mixed and saved in a liquid tank in a fixed percentage in a manufacturing process using liquid medicine and in a cleaning process after the manufacturing process in a semiconductor manufacturing facility, a liquid crystal manufacturing facility, and the like.

An outline of such a conventional liquid mixing system is shown in FIG. 42.

In FIG. 42, the liquid mixing system 100 has reservoirs 101A–101C to reserve respective liquids to be mixed, a liquid tank 102 to mix the liquids, solenoid valves 103A–103C provided on respective flow-channels between the reservoirs 101A–101C and the liquid tank 102 in order to carry out injection/injection stop of the respective liquids, a plurality of flowmeters 104A–104C provided on respective flow-channels between the solenoid valves 103A–103C and the liquid tank 102 in order to output flow detection signals FA–FC, for example analog signals, having current values of 4–20 [mA] corresponding to respective flow rate values every fixed measuring period, a plurality of totalizers 105A–105C to output on/off control signals SC for opening and closing the respective solenoid valves 103A–103C when fixed integrated batch flow rates are obtained, and a concentrated monitor 106 to receive the batch output signals BA–BC and to output reset signals SR to reset the integrated batch flow rates of the totalizers 105A–105C. The plurality of totalizers 105A–105C also integrate the respective flow rates on the basis of the flow detection signals FA–FC and output respective batch output signals BA–BC to inform of the completion of the integrating when the respective fixed integrated batch flow rates are obtained. Here, in this specification, the words related to "integrate" mean almost the same as of "totalize". A pump M in FIG. 42 is controlled by a sequencer 106A.

The concentrated monitor 106 has the sequencer 106A to carry out the control of the whole liquid mixing system 100 and a display touch panel 106B to carry out the input of various data and the indication of data.

And, the above totalizers 105A–105C are set on a local monitoring board 107 provided at the flowmeters 104A–104C side (i.e. local side).

Summary of operation of this liquid mixing system 100 is described hereinafter. Here, only a liquid system of the reservoir 101A will be described because operation of each liquid system is the same. And, it is assumed that a liquid injection rate (i.e. an integrated batch flow rate) has been preset to the totalizer 105A in advance.

When the sequencer 106A of the concentrated monitor outputs the reset signal SR, the integrated batch flow rate of the totalizer 105A is reset, and this totalizer 105A outputs on/off control signal SC to the solenoid valve 103A.

By this, ON signal the solenoid valve 103A comes to an opened state, and the liquid reserved in the reservoir 101A is injected in the liquid tank 102.

With this, the flowmeter 104A outputs the flow detection signal FA corresponding to the flow rate to the totalizer 105A.

When the integrated batch flow rate reaches the preset integrated batch flow rate, the totalizer 105A outputs the on/off control signal SC to the solenoid valve 103A, and the solenoid valve 103A comes to a closed state with this off signal. And, the injection of the liquid to the liquid tank 102 stops, and the batch output signal BA is outputted to the sequencer 106A of the concentrated monitor 106.

As a result, the sequencer 106A indicates the liquid injection having closed on the display touch panel 106B.

By the way, a frequency meter, a rotation speedometer, a pulse counter and the like are known as devices to measure a signal from a sensor which outputs a pulse signal based on measurement of a physical quantity.

For example, a capacitance type pressure sensor forms an oscillator and generates a signal with a frequency corresponding to the pressure. Then, pressure can be measured by measuring the frequency of the signal from this pressure sensor. And, in a vane wheel type flow sensor a magnetized vane wheel is rotated by a flow, and a secured Hall element detects the magnetism thereby to output a pulse signal having a frequency corresponding to the flow rate. The flow rate can be measured by measuring the frequency of this pulse signal.

There is a Karman vortex type flow sensor as a flow sensor of the above flowmeter or as one of such a physical quantity measuring apparatus. The Karman vortex type flow sensor detects the frequency of Karman vortexes by means of a supersonic wave sensor or a pressure-electricity element sensor in order to measure the flow rate of the fluid such as gas or liquid.

The flow measurement range and the frequency of Karman vortexes corresponding to the above flow rate are decided by a diameter of a flow-channel and material of the pipe portion of the flow sensor.

Here, an instantaneous flow rate value Q is obtained from the next linear expression (1) by using the frequency value f.

$$Q = a \times f + b \quad (1)$$

And, because the expression (1) does not give an accurate result, the following expression (2) is applied, wherein the flow measurement range is divided into a plurality of sections n, and a linear expression for each section i (i=1–n) is defined thereby to secure nearly a full scale accuracy ±1%. (Japanese Patent Application Laid-open NO. 60-238720)

$$Q = ai \times f + bi \quad (2)$$

For further improving the accuracy, the following expression (3) is proposed thereby to secure a full scale accuracy ±0.5%, wherein the above ai value and bi value are decided for each device and the individually decided values, i.e. corrected coefficients, Ai(s) and Bi(s) (i=1–n) are stored in a RAM or an EEPROM. (Japanese Patent Application NO. 9-345742)

$$Q = Ai \times f + Bi \tag{3}$$

And, as for the above frequency value f, the measuring accuracy should be studied. Generally, when the frequency of a pulse signal is measured, the pulse number inputted during a fixed time-period (a gate-time) is counted, or the frequency is calculated from the reciprocal number of the measured period of the input pulse. However, in the flow measurement, the frequency of the generated pulse is high (the period is short) in a large flow and is low (the period is long) in a small flow. Accordingly, a sufficient measuring accuracy has to be obtained in each of the large and small flows.

Therefore, a frequency measuring apparatus having a counter controlling means to control a count operation with a timer, a clock generator, a clock counter, and a clock and a processing means to detect and count a pulse signal and to carry out a fixed arithmetic control is proposed. (Japanese Patent Application Laid-open NO. 5-297036)

According to this frequency measuring apparatus, a time not less than 2 times of the period of a measurement bottom frequency is set to the above timer, and the detection and the count of the pulse signal is started. And, when a pulse signal is detected, the above counter controlling means is controlled so that the above clock counter starts the count of a clock from the above clock generator, and the count value of the clock counter is checked every time the pulse signal is detected. And, the detection and the count continue when the above count value does not reach a specified value. Meanwhile, when the above count value has reached the specified value, the above detection and the count are stopped, and a measured frequency value is calculated from the count value of the above clock counter by controlling the above counter controlling means. And, when the count of the clock has not completed at the time of the completion of the clocking of the timer, the detection and the count of the pulse signal is stopped, and the above counter controlling means is controlled to close the count by the clock counter.

With the above, N-time of the period of the pulse signal is counted by the clock counter, and a required measurement resolvability can be obtained regardless of the frequency value of the pulse signal by continuing the integration (i.e. totalizing) of the period until the count value secures a desirable resolvability.

And, an average period calculation apparatus of the output pulse of a Karman vortex type airflow rate sensor is also proposed for the purpose of enhancing a calculation accuracy of an average period in a large flow and improving responsibility in a small flow. (Japanese Patent Application Laid-open NO. 5-70086)

This average period calculation apparatus has a pulse number counting means, a pulse period measuring means, a pulse period comparing means to compare a measuring period and a first fixed time, and an average period calculating means. Specifically, the average period calculating means calculates the average of the period of a pulse signal, when the pulse number corresponding to a first specified value is counted by the above pulse number counting means from the time of the completion of the last average calculation, when a comparison result of "larger" are outputted from the above pulse period comparing means by the number of times corresponded to a second specified value, or when a state that a comparison result of "larger" subsequently to a comparison result of "smaller" has occurred in the pulse period comparison means by the number of times corresponding to a third specified value. The average period calculation apparatus further has a second average period calculating means to calculate an average period from a comparison result by the above pulse period comparing means using the second specified value, or a second pulse period comparing means to compare the above measuring period and the second fixed time and a second average period calculating means to calculate an average period from the output of the above second pulse period comparing means.

With these structures an average period of an inputted pulse signal from the sensor can be quickly calculated in a range from the small flow to the large flow.

On the other hand, in such a flow sensor, the measured flow rate is converted into a fixed signal form and outputted to an external apparatus by a flow transmitter. Generally, in such a flow transmitter, 8-bit digital data corresponding to the measured value is converted into the above fixed signal form and transmitted.

And, in such a flowmeter, it is known that a measured flow rate (i.e. an instantaneous flow rate) is integrated (namely, totalized) so as to obtain an integrated flow rate and the integrated flow rate in addition to the instantaneous flow rate are indicated at an indicating portion.

Further, as an application example of such a flowmeter, a flow detecting switch is proposed, wherein a flow rate of the fluid flowing through the flow-channel is compared with a reference flow value (a preset flow rate value) to be preset in advance, and a signal for controlling external equipment is outputted according to the comparison result. (Japanese Patent Application Laid-open NO. 9-89613)

In this proposed flow detecting switch, the period of a pulse signal having the frequency corresponding to the period of Karman vortexes is measured, and its flow rate value is obtained based on the measured period while referring to a table. And, periods of a plurality of pulses are measured and averaged in order to improve the measurement accuracy. And, a measured flow rate is compared with a preset threshold value, the comparison result is indicated by means of LED, and the base of a transistor whose collector is connected to an output terminal is applied with a voltage, thereby controlling the power supply to a load or the like connected to the output terminal.

Generally, in a frequency measuring method for counting the number of input pulse, the resolvability for low input-frequency should not be good regardless of the gate-time value. For example, when the gate-time is one second, the frequency not less than 200 Hz is required to obtain an accuracy of ±0.5%.

And, in a case of the period measuring, the measurement resolvability for high input-frequency is coarse, and therefore sufficient accuracy is not obtained regardless of the length of the period or a value of the reference clock for the measurement. Therefore, a count number not less than 200 is required for example.

And, in the above frequency measuring apparatus, since the timer to which a time not less than 2 times of the period of a measurement bottom frequency is set is used, when the frequency near the measurement bottom frequency is measured, a measuring time not less than 2 times of the period is required. And, a N-times period of a pulse signal is counted by the clock counter before the completion of the count timer of the timer, the detection and the count are stopped when the above count value has reached the specified value, and a frequency measured value is calculated from the above count value. In this case, because a measuring of the whole preset time of the timer has not been made, the true frequency of the inputted pulse signal is not measured.

And, according to the above average period calculation apparatus, though the average period of an inputted pulse signal from the sensor can be quickly calculated in a range from a small flow to a large flow by setting four or five parameters, the structure is complicated since the pulse number counting means, the pulse period measuring means, the first and second pulse period comparing means, and the first and second average period calculating means are used. And, in case that the processings by these means are executed by means of a microcomputer, enormous memory is required in the program, and a long time is required for the computing processing. And, since the average period calculation processing occupies a lot of time, the other processings would not often be difficult to be executed.

Further, as described above, the 8-bit digital data corresponding to the measured value is converted into the fixed signal form and transmit in the flow transmitter. In this case, since the error comes to about ±0.4% due to an digital quantization error of ±1 digit, the digital data with a lager bit-number than 8-bit should be used for preventing propagation of the error in order to output a high quality signal basing on a high accuracy detection toward an external apparatus.

And further, in the conventional flowmeter having a function to indicate an integrated flow rate value, since the integrated flow rate is indicated on the fixed-point system, there should be an inconvenience on reading a large integrated flow rate value.

Still further, as stated above, in the Karman vortex type flow sensor, since a flow measurement range and the frequency of the generated Karman vortexes are decided by a diameter of the flow-channel and material of the pipe portion of the flow sensor, it is preferably required that a single kind of flowmeter is easily applicable to the pipe portion in which the flowmeter is inserted.

And still further, in the above flow detecting switch, since the period of the Karman vortexes is measured, when the frequency is high, that is, the period is short, sufficient measurement resolvability is not obtained, that is, the measurement accuracy is not good. And, since the flow rate is decided from the frequency obtained from a reciprocal number of the period by referring to a data table, one flow rate data is defined correspondingly to one frequency, whereby the memory of enormous capacity is required. Therefore, since a data table for various diameters and the control program could not be stored in one microcomputer, a plurality of microcomputers should be prepared.

Further, a high-speed switch output is sometimes required for the flow detecting switch according to its use. For example, in a welding gun or an electric spark machining machine, when the above flow detecting switch is arranged on a flow-channel of cooling water so that an abnormal state of equipment can be detected based on a change of the flow rate of the cooling water, a high-speed switch output is required in order to prevent an overheat or the like of the equipment.

In view of the foregoing, an object of the present invention is to provide a flowmeter with simple processing, simple operation, low price, and high accuracy.

Further, another object of the present invention is to provide a flowmeter superior in utility by increasing an indication digit number of an integrated flow rate value.

Still further, another object of the present invention is to provide a flowmeter wherein the characteristics of a flow-channel can be easily selected with the operation of a key operation portion.

Still further, another object of the present invention is to provide a flow detecting switch which is easy to use since a setting mistake and an operation mistake can be prevented and the preset value can be easily checked and changed when used as a switch for transmitting an output signal to an external control unit after detecting an instantaneous flow rate and after comparing it with a preset value.

Still further, another object of the present invention is to provide an instantaneous flow rate detection switch which can carry out an switch output operation with a high speed when an accident happened to the flow of fluid.

Still further, another object of the present invention is to provide a flowmeter (an instantaneous flow rate transmitter) which can output a transmission signal at a fixed timing.

Still further, another object of the present invention is to provide a flowmeter (an instantaneous flow rate transmitter) which can output a high quality transmission signal to an external apparatus.

And, in the above conventional liquid mixing system, a local monitoring board is arranged neat the flowmeter or and the solenoid valve installed on a pipe, and a plurality of totalizers are arranged in the local monitoring board. Accordingly, since the local monitoring board is necessary other than the concentrated monitor, the system is not simple. And, since wires or cables are necessary between the concentrated monitors and the totalizers, a lot of man-hours and costs are required.

Therefore, though it would be possible to directly input the flow rate signal of the flowmeter in a sequencer forming the concentrated monitor without using the totalizers, a processing program for the sequencer to carry out a batch integrating processing and the required memory become large.

And, though the above totalizers 105A–105C integrate flow detection signals FA–FC inputted from the above flowmeters 104A–104C, compare the integrated results and preset integrated batch flow rate values, and output the above on/off control signals SC to the respective solenoid valves 103A–103C, there could often be a case that an integrated result has already exceeded the preset integrated batch flow rate value when the integrated result has been calculated.

Referring to FIG. 43, this situation will be described. The vertical axis indicates the integrated flow rate value (in cubic meter or little), the horizontal axis indicates the time, Qbs designates the above-described preset integrated batch flow rate, and Qb designates the integrated batch flow rate. As described above, since the totalizers 105A–105C calculate the integrated batch flow rate values Qb by integrating the flow detection signals FA–FC inputted from the flowmeters 104A 104C every measuring period, actual outputs of totalizers 105A–105C are outputted at time intervals corresponding to the above measuring period. In FIG. 43, Qbn−1, Qbn, Qbn+1 designate the integrated batch flow rate values, respectively, at the respective times of tn−1, tn, tn+1 having the above time interval therebetween. Accordingly, even if the integrated batch flow rate value Qb agrees with the preset integrated batch flow rate value Qbs at time t0, since it is judged that the integrated batch flow rate value Qb has actually reached the preset integrated batch flow rate value Qbs at each of the totalizers 105A–105C, the on/off control signal SC is outputted at time tn+1. In a fact, since time required for calculation of the flow rate at the above flowmeters 104A–104C and time required for the integration at the totalizers 105A–105C are necessary, a time delay of a maximum of about one measuring period arises.

Accordingly, since the above solenoid valves 103A–103C work in larger flow rate values than the preset integrated batch flow rate values Qbs, a good fluid mixture can not be obtaind.

In view of the foregoing, an object of the present invention is also to provide a flowmeter, a control method thereof, and a recording medium having recorded a control program, wherein downsizing of the system is attained, a wire or cable arrangement process can be omitted, and the load of a concentrated monitor can be reduced.

And, another object of the present invention is to provide a flowmeter, a control method thereof, and a recording medium having recorded a control program, wherein high speed and highly accurate measurement can be carried out with a simple structure.

Further, another object of the present invention is to provide a flowmeter, a control method thereof, and a recording medium having recorded a control program, wherein an automatic operation can be carried out, while outputting/inputting signals between external apparatuses such as a concentrated monitor and the like.

DISCLOSURE OF THE INVENTION

In order to achieve the above object, in the present invention, a flowmeter is characterized by comprising: a sensor portion to output a pulse signal having a frequency corresponding to a flow rate to be measured; a first signal generating portion to generate a first signal having a first period; a first measuring portion to count number of pulses outputted from the sensor portion during the first period according to the first signal; a second measuring portion to measure position of the first signal in a pulse including the first signal in its period; a first arithmetic portion to calculate the frequency of the pulse signal every first period on a basis of both of a count value by the first measuring portion and a measurement result by the second measuring portion; and a second arithmetic portion to calculate an instantaneous flow rate on a basis of the frequency calculated.

Further, the flowmeter is characterized by comprising a means for invalidating the measurement result when a state that a pulse period of the pulse signal is equal to a period corresponding to a commercial alternating current power supply frequency has occurred successively fixed times.

Further, the flowmeter is characterized in that the indicating portion indicates the integrated flow rate, while switching indication of upper figures and lower figures of the integrated flow rate in turn.

Further, a flow detecting switch of the present invention is characterized by comprising a sensor portion to output a signal corresponding to a measured flow rate, an instantaneous flow rate measuring portion to measure an instantaneous flow rate on a basis of the signal from the sensor portion, a comparing portion to compare the instantaneous flow rate value calculated by an arithmetic portion with a preset flow rate value having been preset, and a switch output portion to output a comparison result of the comparing portion as a digital signal, wherein the comparing portion has two operation modes of a normal mode to compare the instantaneous flow rate value calculated every first period with the preset flow rate value and a high-speed mode to compare the instantaneous flow rate value calculated every second period shorter than the first period with the preset flow rate value.

Further, the flowmeter is characterized in that the instantaneous flow rate measuring portion has a first signal generating portion to generate a first signal having a first period, a first measuring portion to count number of pulses included in a pulse signal outputted from the sensor portion during the first period according to the first signal, a second measuring portion to measure a position of the first signal in a pulse including the first signal in its period, and a first arithmetic portion to calculate a frequency of the pulse signal every first period on a basis of both of a count value by the first measuring portion and a measurement result by the second measuring portion.

Further, the control method of the flowmeter is characterized by further comprising a sixth step to compare the instantaneous flow rate calculated at the fourth step and a preset flow rate value having been preset and to output a digital signal corresponding to a comparison result to an external apparatus.

Further, a control method of a flow detecting switch for measuring an instantaneous flow rate value, for comparing the measured instantaneous flow rate value and a preset flow rate value having been preset, and for outputting a digital signal corresponding to a comparison result to an external apparatus is characterized by comprising the steps of: a first step to calculate the instantaneous flow rate value on a basis of a signal, corresponding to a measured flow rate, from a sensor portion; a second step to compare the preset flow rate value and the instantaneous flow rate value calculated at the first step; and a third step to output a digital signal corresponding to a comparison result of the second step, wherein the second step has two operation modes of a normal mode to compare the instantaneous flow rate value calculated at the first step and the preset flow rate value every first period and a high-speed mode to compare them every second period shorter than the first period.

Further, a flowmeter for carrying out flow measurement on a basis of a flow detection signal outputted from a flow sensor according to a flow rate of a measured fluid is characterized by comprising an instantaneous flow rate calculating means to calculate an instantaneous flow rate every fixed measuring period on a basis of the flow detection signal, an integrated flow rate calculating means to calculate an integrated flow rate by integrating the instantaneous flow rate, a judging means to judge whether or not the integrated flow rate has reached a preset integrated flow rate, an integration completion informing means to output an integration completion signal when the integrated flow rate has reached the preset integrated flow rate, an estimating operation means to calculate an estimated value of the integrated flow rate calculated by the integrated flow rate calculating means at a next measuring time-point and to judge whether or not the estimated value of the integrated flow rate reaches the preset integrated flow rate, and a measuring period controlling means to change the measuring period of the instantaneous flow rate calculating means to a shorter period when the estimating operation means has judged that the estimated value of the integrated flow rate at the next measuring time-point reaches the preset integrated flow rate.

Further, the flowmeter is characterized in that the integrated flow rate calculating means starts an integrating operation of the instantaneous flow rate according to an integration start direction signal supplied from an outside.

Further, the flowmeter is characterized in that the integrated flow rate is reset when the integration start direction signal has continued not less than a first fixed time and below a second fixed time, the integrating operation by the integrated flow rate calculating means is stopped when the integration start direction signal has continued not less than the second fixed time, and the integrating operation is restarted when an input of the integration start direction signal has disappeared.

Further, the flowmeter is characterized in that the estimating operation means calculates an estimated value of the integrated flow rate at the next measuring time-point by using the instantaneous flow rate having been calculated.

Further, the flowmeter is characterized in that the instantaneous flow rate calculating means has a first signal generating portion to generate a first signal having a first period, a first measuring portion to count number of pulses included in the flow detection signal inputted during the first period according to the first signal, a second measuring portion to measure a position of the first signal in a pulse including the first signal in its period, and a first arithmetic portion to calculate a frequency of the flow detection signal every first period on a basis of both of a count value by the first measuring portion and a measurement result by the second measuring portion, and a second arithmetic portion to calculate the instantaneous flow rate on a basis of the frequency having been calculated.

Further, the flowmeter is characterized by further comprising a manual operating portion for enabling the preset integrated flow rate to be changed.

Further, a control method of a flowmeter for carrying out flow measurement on a basis of a flow detection signal outputted from a flow sensor according to a flow rate of a measured fluid is characterized by comprising the steps of: an instantaneous flow rate calculating step to calculate an instantaneous flow rate every fixed measuring period on a basis of the flow detection signal; an integrated flow rate calculating step to calculate an integrated flow rate by integrating the instantaneous flow rate; a judging step to judge whether or not the integrated flow rate has reached a preset integrated flow rate; an integration completion informing step to inform of an integration completion when the integrated flow rate has reached the preset integrated flow rate; an estimating operation step to calculate an estimated value of the integrated flow rate calculated by the integrated flow rate calculating step at a next measuring time-point and to judge whether or not the estimated value of the integrated flow rate reaches the preset integrated flow rate; and a measuring period controlling step to change the measuring period of the instantaneous flow rate calculating step to a shorter period when the estimating operation step has judged that the estimated value of the integrated flow rate at the next measuring time-point reaches the preset integrated flow rate.

Further, the control method of the flowmeter is characterized in that the integrated flow rate calculating step starts an integrating operation of the instantaneous flow rate according to an integration start direction signal supplied from an outside.

Further, the control method of the flowmeter is characterized in that the integrated flow rate is reset when the integration start direction signal has continued not less than a first fixed time and below a second fixed time, the integrating operation by the integrated flow rate calculating step is stopped when the integration start direction signal has continued not less than the second fixed time, and the integrating operation is restarted when an input of the integration start direction signal has disappeared.

Further, the control method of the flowmeter is characterized in that the estimating operation step calculates an estimated value of the integrated flow rate at the next measuring time-point by using the instantaneous flow rate having been calculated.

Further, the control method of the flowmeter is characterized in that the instantaneous flow rate calculating step comprises the steps of: a first step to count number of pulses included in the flow detection signal inputted during a first period according to a first signal having the first period, a second step to measure position of the first signal in a pulse including the first signal in its period, a third step to calculate a frequency of the flow detection signal every first period on a basis of both of a count value by the first step and a measurement result by the second step, and a fourth step to calculate the instantaneous flow rate on a basis of the frequency calculated at the third step.

Further, in the present invention provided is a recording medium having recorded a control program for making a flowmeter carry out flow measurement on a basis of a flow detection signal outputted from a flow sensor according to a flow rate of a measured fluid, which recording medium having recorded a control program makes a flowmeter: calculate an instantaneous flow rate every fixed measuring period on a basis of the flow detection signal; calculate an integrated flow rate by integrating the instantaneous flow rate on a basis of an instruction from an outside; judge whether or not the integrated flow rate has reached a preset integrated flow rate; inform of an integration completion when the integrated flow rate has reached the preset integrated flow rate; calculate an estimated value of the integrated flow rate calculated at a next measuring time-point and judge whether or not the estimated value reaches the preset integrated flow rate; and change the measuring period for calculating the instantaneous flow rate to a shorter period when it has been judged that the estimated value of the integrated flow rate reaches the preset integrated flow rate.

BRIEF DESCRIPTION OF THE DRAWINGS

FIGS. 10A to 10E show an example of an arrangement of a printed circuit board and a parts arrangement on the printed circuit board in the flowmeter of the present invention.

FIG. 12 is a block diagram showing a structure of a power source portion and a signal outputting portion of the flowmeter of the present invention.

BEAT MODE OF THE INVENTION

Figure 1:
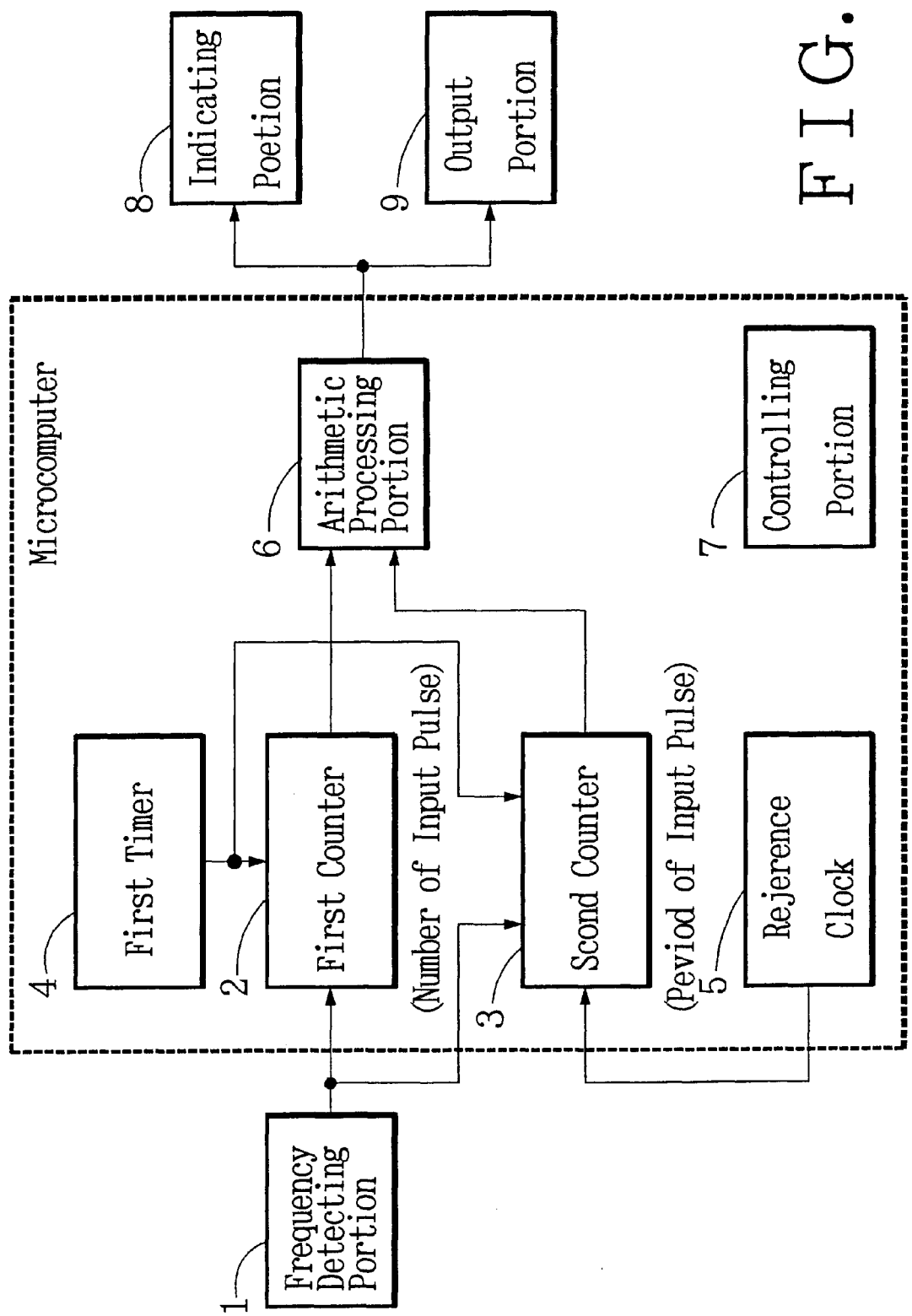
FIG. 1 is a block diagram showing a structure of a frequency measuring apparatus applied to the present invention.

FIG. 1 is a block diagram showing a structure of a frequency measuring apparatus applied to the present invention. In FIG. 1, 1 designates a frequency detecting portion to output a pulse signal of a measured object, 2 is a first counter, and 4 is a first timer to generate a first signal to decide a measurement starting time-point and a measurement ending time-point. The first counter 2 counts the number of an input pulse to be inputted between the measurement starting time-point and the measurement ending time-point decided by the first signal from the above first timer 4. And, 3 is a third counter, and 5 is a reference clock generating portion to generate a reference clock signal. The second counter 3 measures the period of the input pulse by counting the number of the reference clock inputted from the above reference clock generating portion 5 between a time-period of a rising edge (or a dropping edge) of the input pulse from the above frequency detecting portion 1 and the next rising edge (or the nest dropping edge) of the next input pulse. And, the first signal from the above first timer 4 is applied to the second counter 3 as a control signal, the second counter 3 can output a count value at a generation timing of the above first signal.

And, 6 is an arithmetic processing portion to calculate the frequency of the above input pulse signal on the basis of the count output from the above first counter 2 and the above second counter 3. 8 is an indicating portion to indicate the frequency calculated by the above arithmetic processing portion 6, 9 is an output portion to output the above calculated frequency to an external apparatus, and 7 is a controlling portion to control the operation of the above components.

Here, the first counter 2, the second counter 3, the first timer 4, the reference clock generating portion 5, the arithmetic processing portion 6 and the controlling portion 7 can be formed by a single tip microcomputer, for example.

Figure 2:
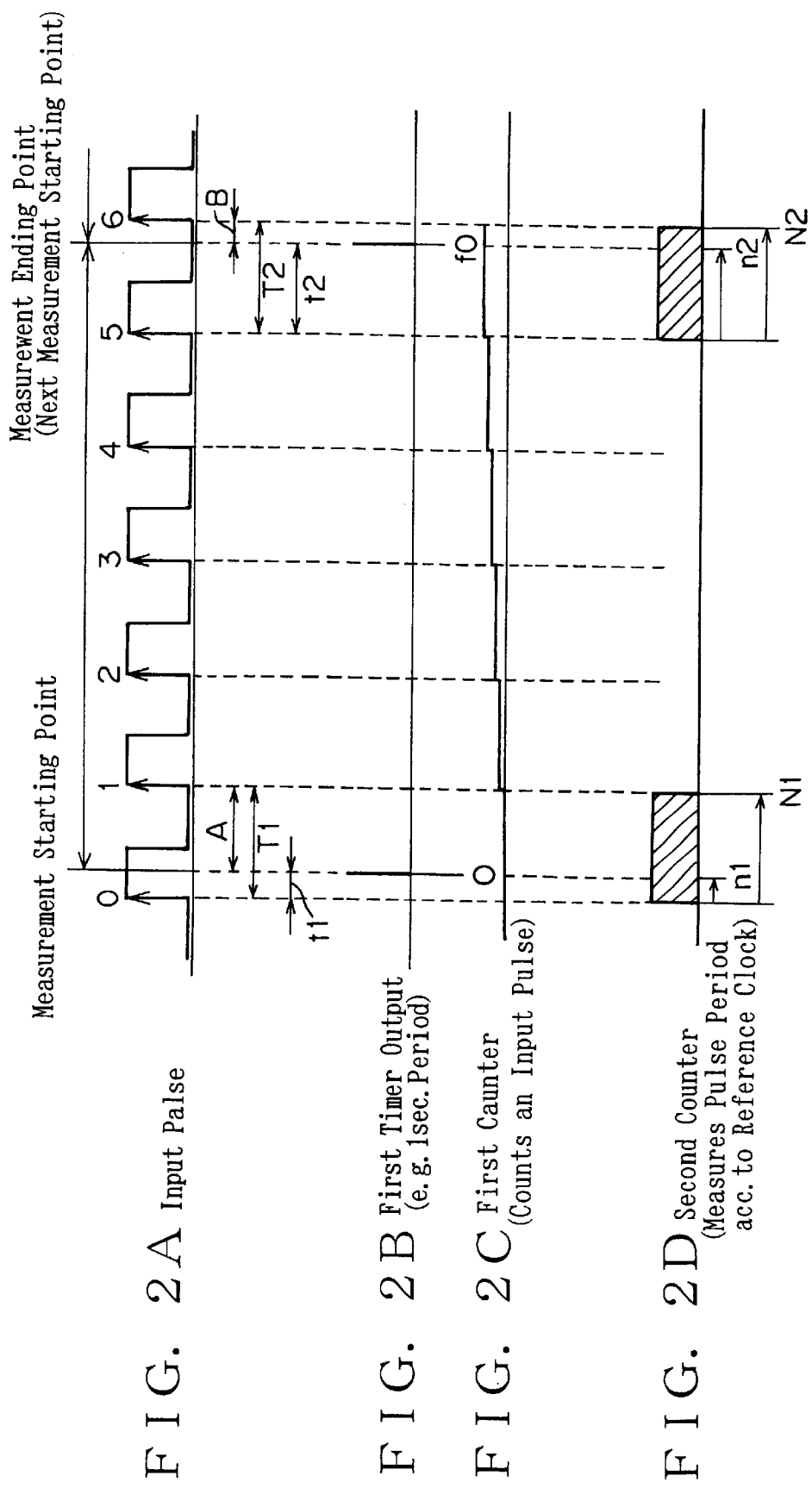
FIGS. 2A to 2D are a timing chart showing the frequency measuring method applied to the present invention.

The frequency measuring method or measuring principle to be executed with the apparatus constructed above will be described referring to FIGS. 2A–2D, wherein FIG. 2A is an example of the input pulse signal from the frequency detecting portion 1, FIG. 2B is the first signal outputted from the first timer 4, FIG. 2C is the count value of the first counter 2, and FIG. 2D is the count contents at the second counter 3. Here, the first signal of the above FIG. 2B decides the measurement starting point and the measurement ending point in this frequency measurement and can be set to a signal with the period corresponding to the frequency of a measured pulse signal. The first signal is here set as an output signal with the period of one second for easier explanation. Here, by setting the measurement ending point as the measurement starting point at the next measuring period, the frequency can be continuously measured every period (the first period) of the above first signal. And, the period of the reference clock to measure the period of the above input pulse signal decides the measuring accuracy and is here of a clock signal with a 1 msec period.

And, the first counter 2 counts the number of an input pulse to be inputted between a measuring time-period (here, 1 second) from the measurement starting time-point to the measurement ending time-point decided by the first signal. At this time, though the counting measurement can be executed by using either the rising or the dropping of the input pulse, the rising of the input pulse is counted here.

And, five pulses are counted in the illustrated example. In this case, since the measuring time-period is one second, the number "5" corresponds to an integer portion of the frequency of this input signal.

However, with such a count of only the number of pulses, as shown in FIG. 2A, a time-period A from a count start time-point to the rising point of the first pulse (pulse 1) is not reflected in the count value. And, as for the fifth pulse (pulse 5), a time-period B from the measurement ending point to the rising point of the next pulse (pulse 6) has been counted. Therefore, the above A and B shall be taken in consideration in order to accurately measure the frequency of the input pulse signal.

That is, a percentage of the time-period A to the period T1 of pulse 0 and a percentage of the time-period B to the period T2 of pulse 5 shall be obtained, and the number of the above pulse shall be corrected so as to obtain an accurate frequency.

For the above purpose, the above second counter 3 of the above frequency measuring apparatus, as shown in FIG. 2D, starts counting the reference clock at the rising edge of the input pulse signal, outputs the count value (N1) at the rising edge of the next input pulse signal, and again starts the count from 0. When the first signal from the above first timer is inputted during the above count, the count value (n1) of that time-point is outputted. With this, the count outputs N1, N2, n1, and n2 corresponding to the respective times T1, T2, t1, and t2 can be obtained. Here, if there is no input of the first signal during the measurement of the period of the above input pulse, the calculated value is thrown away, and the next measurement is carried out.

And, the above arithmetic processing portion 6 executes the calculation based on the next expression (4) so as to get the frequency value f, based on the count value f0 from the above first counter 2 and the count values N1, N2, n1, and n2 from the above second counter 3.

$$f=f0+(1-n1/N1)-(1-n2/N2)=f0-n1/N1+n2/N2 \quad (4)$$

Here, the above measuring time-period (the period of the first signal) can be changed from the above-described 1 second to an optional value according to the measured signal frequency. Using the measuring time-period T second, the frequency value f can be given by the following expression (5):

$$f=(f0-n1/N1+n2/N2)\times(1/T) \quad (5)$$

In the frequency measuring method stated above, when one or more pulses are inputted during the measuring time-period, the frequency can be calculated using the above expression (5). Accordingly, a highly accurate frequency measurement is possible with a measuring time-period not less than the period of the measurement bottom frequency, and therefore the measuring time is not required to be lengthened in enhancing the accuracy differently from the conventional measuring method. For example, the frequency can be accurately measured with the measuring time-period of 1 second in case the measurement bottom frequency being 5 Hz or with the measuring time-period of 0.2 second in case the measurement bottom frequency being 5 Hz.

And, the measuring accuracy at the measurement bottom frequency is decided by the period of the above reference clock. For example, when the period of the above first signal is 1 second (the measurement bottom frequency is 1 Hz), the reference clock is to be 5 msec if the required resolvability is 200 (the accuracy; ±0.5%), or the reference clock is to be 1 msec if the required resolvability is 1000 (the accuracy; ±0.1%). And, because the period is 200 msec if the measurement bottom frequency is 5 Hz, the resolvability 200 is obtained by setting the reference clock to 1 msec.

Like the above, according to the frequency measuring method applied to the present invention, since the period of the input pulse included in the measuring time-period from the measurement starting point to the measurement ending point can be accurately calculated up to the decimal portion, the frequency of the input pulse signal can be accurately calculated regardless of the measuring time-period being short or long.

And, when the measurement is executed repeatedly in succession, since the decimal portion (the decimal portion corresponding to the above time B) at the measurement ending point is set as the decimal portion (the decimal portion corresponding to the above time A) at the measurement starting point of at the next measurement, the arithmetic processing is facilitated, and an accurate frequency data can be obtained every period of the first signal.

Here, though the measurement of the period is started at the rising point of the input pulse in as stated above, the measurement of the period may be started at the dropping point of the input pulse.

And, because the measuring accuracy of 0.5% can be obtained without getting the measurement result of the second counter 3 in case of 200≦f0 as a result of the measurement by the first counter 2, the above decimal portion measuring processing can be omitted.

Figure 3:
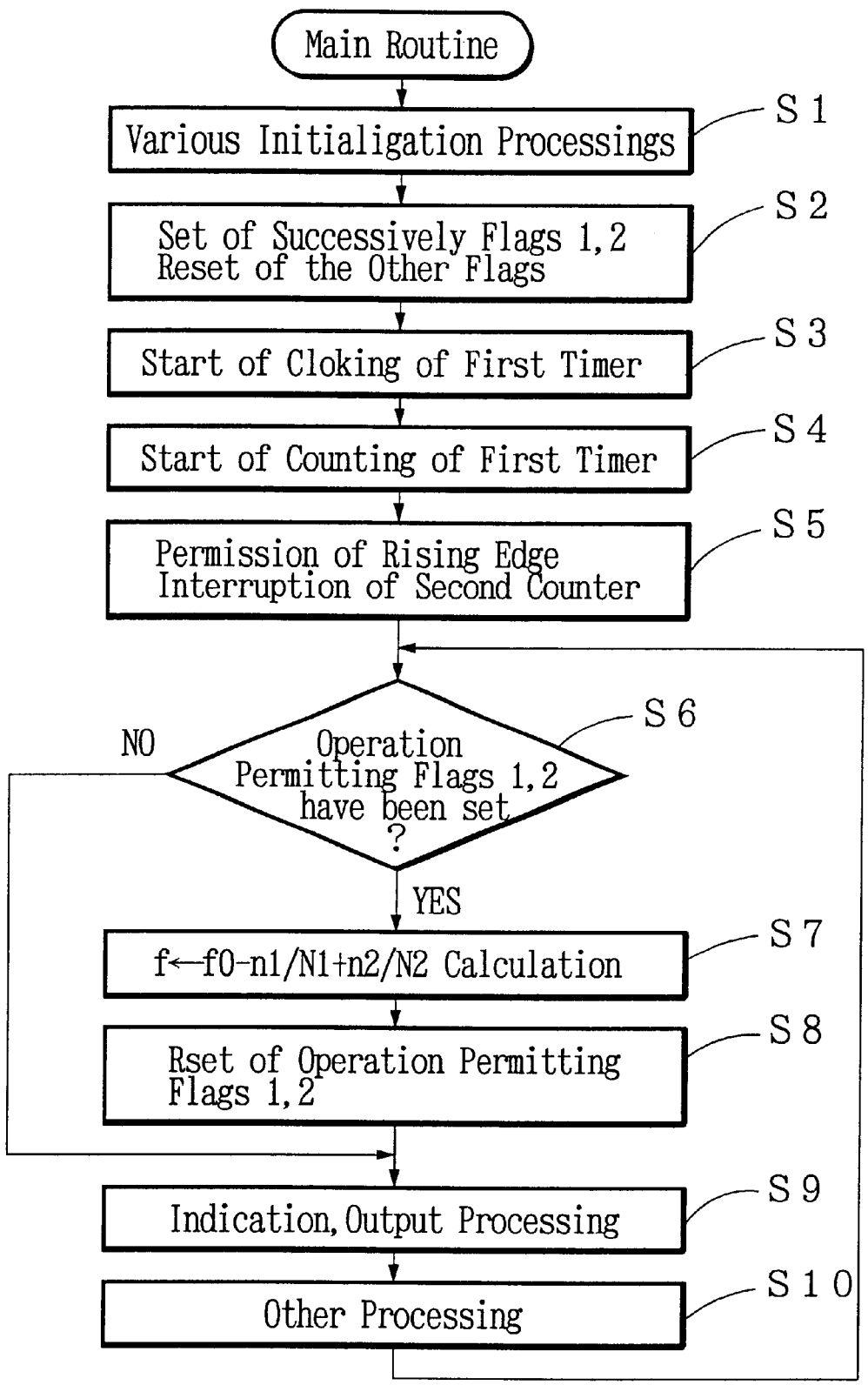
FIG. 3 is a flowchart of a main routine in the frequency measuring apparatus of FIG. 1.

The operation of the frequency measuring apparatus of FIG. 1, which works based on the measuring principle stated above, will be described in detail with reference to the flowcharts of FIGS. 3–5. Here, the first period is set to 1 second for easier explanation.

The portion enclosed with the broken line in FIG. 1 is formed with a single tip microcomputer, wherein a built-in counter of the microcomputer is used for the above first counter 2 and the second counter 3, and a built-in timer of the microcomputer is used for the first timer 4 and the reference clock generating portion 5. And, the above controlling portion 7 calculates the frequency of the input pulse by using the arithmetic processing portion 6 according to a program stored in a non-shown program memory.

Hereinafter, the operation of this frequency measuring apparatus is described referring to flowcharts shown in FIGS. 3–5 and a timing chart of FIG. 6. FIG. 3 is a flowchart of a main routine in the frequency measuring apparatus of FIG. 1. FIG. 4 is a flowchart of a first timer interruption processing routine in the frequency measuring apparatus of FIG. 1. FIG. 5 is a flowchart of a count processing routine of a second counter in the frequency measuring apparatus of FIG. 1, which count processing routine is started by the interruption arison by the rising edge (or, the dropping edge) of the input pulse.

The above controlling portion 7 carries out each processing on the basis of various flags such as successively storing flags 1 and 2, operation permitting flags 1 and 2, and a second counter validating flag. Here, the successively storing flags 1 and 2 are set at the start of the operation. The operation permitting flags 1 and 2 show the timing to execute the calculation of the frequency in the above arithmetic processing portion 6. And, the above second counter validating flag shows a timing to store the count contents of the above second counter 3 in the register.

When this frequency measuring apparatus is activated (the timing of t0 of FIG. 6), the main routine shown in FIG.

3 starts, and first an initialization processing of each portion such as each register is carried out in step S1. And the process goes to step S2, the successively storing flags 1 and 2 are set, and the operation permitting flags 1 and 2 and the second counter validating flag are reset. Next, the clocking of the above first timer 4 is started in step S3. With this, the interruption processing (FIG. 4) from the above first timer 4 is executed after the above first period. In step S4, the count of the above first counter 2 is started next. Following the above, the interruption by the rising edge (or the dropping edge) of the above input pulse is permitted in step S5. With this, with the timing of the rising edge (or the dropping edge) of the input pulse the count processing (FIG. 5) of the second counter 3 is executed.

Next, the process goes to step S6, it is judged whether or not or not both of the operation permitting flags 1 and 2 are set. As described above, since both of the operation permitting flags 1 and 2 have been reset at the time just after the operation start, the result of this judgment shall be NO. Meanwhile, the process goes to step S7 if the result of this judgment is YES. And, the frequency f is calculated based on the above expression (4), and the above operation permitting flags 1 and 2 are reset (step S8). When the judgment result of the above step S6 is NO, or after the processing of the above step S8 has completed, the indication and output processings of step S9 and other processings of step S10 are executed, and the processings after the above step S6 are executed repeatedly again.

Figure 4:
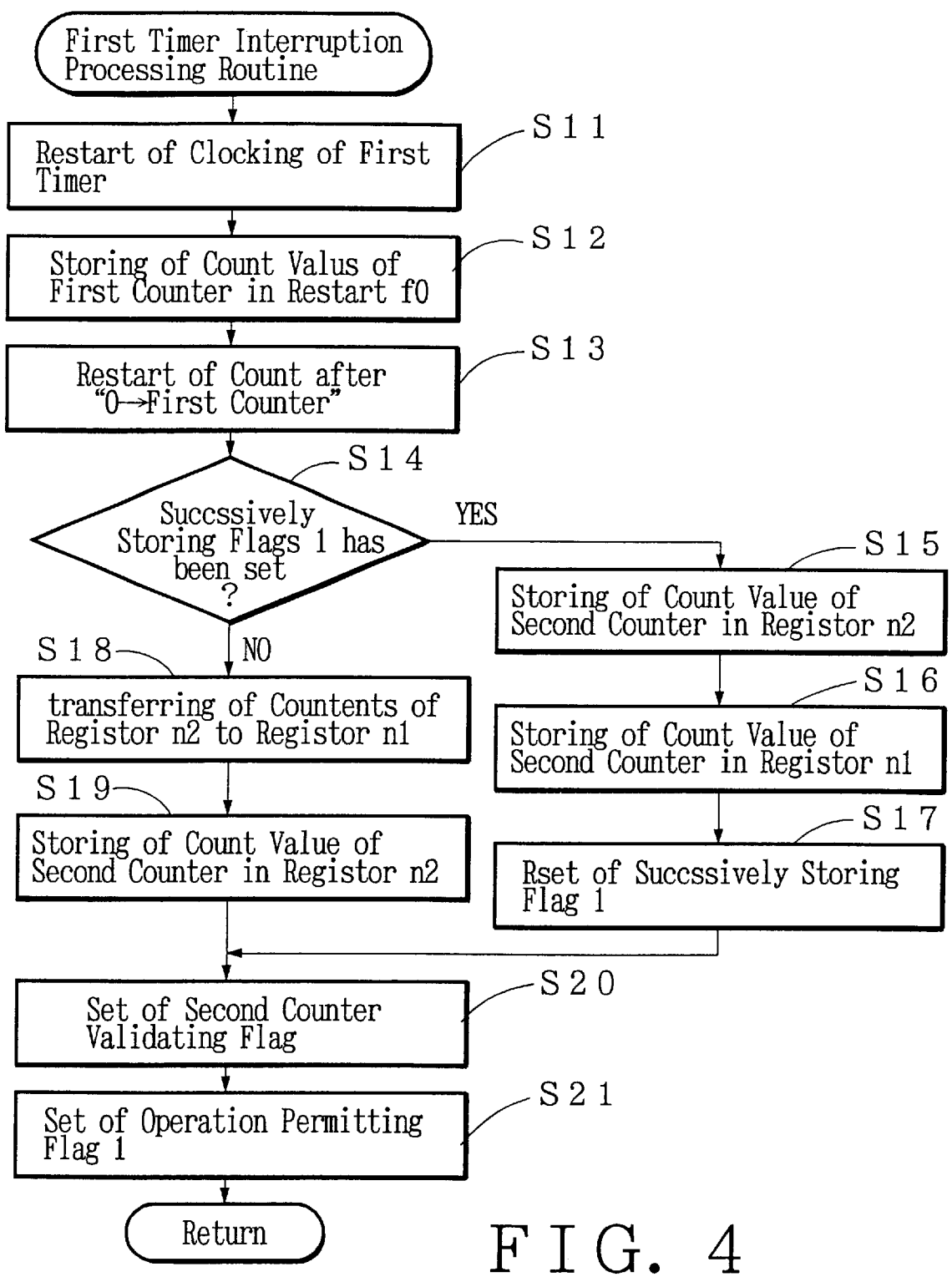
FIG. 4 is a flowchart of a first timer interruption processing routine in the frequency measuring apparatus of FIG. 1.

FIG. 4 is a flowchart of the first timer interruption processing activated by the signal of the first period from the above first timer 4. As described above, when the operation is started at time t0, this processing is started at time t1. First, in step S11, the clocking of the above first timer is restarted. By this, the first timer interruption with a correct timing (t2, t3 . . . ) is secured. Next, in S12 step, the count value of the above first counter at this point is stored in the register f0, the first counter is initialized in step S13, and the count of the first counter is started again. By this, the number of the input pulse of every first period can be stored in the register f0. In this case, the number of pulse inputted in 1 second between t0–t1 is stored in the register f0.

Subsequently the process goes to step S14, whether or not the above successively storing flag 1 is set is judged. As stated above, the successively storing flag 1 has been set at the above step S2 (FIG. 3), and therefore this judgment result comes to YES at the interruption by the first signal of time t1. At this time, the process goes to step S15, and the count value (nt1) of the above second counter at this point is stored in the register n2 and also in the register n1 (step S16). And, in step S17, the above successively storing flag 1 is reset. By this, the count value nt1 of the time period between the rising point of the input pulse just before time t1 and time t1 is stored in the registers n1 and n2.

Meanwhile, in this first timer interruption processing routine after time t2, since the successively storing flag 1 has been reset in the above step S17, the judgment result of the above step S14 comes to NO. In this case, the count value, at the last interruption, of the second counter having been stored in the above register n2 is transferred to the register n1 in step S18, and the count value of the second counter at this point is stored in the above register n2. That is, the count value nt1 at time t1 is forwarded to the register n1 at the point of the interruption at time t2, and the count value nt2 of the second counter at time t2 is forwarded to the register n2. After the above step S17 or S19 has been executed, the above second counter validating flag is set in step S20, the above operation permitting flag 1 is set in step S21, and this first timer interruption processing routine is closed.

Figure 5:
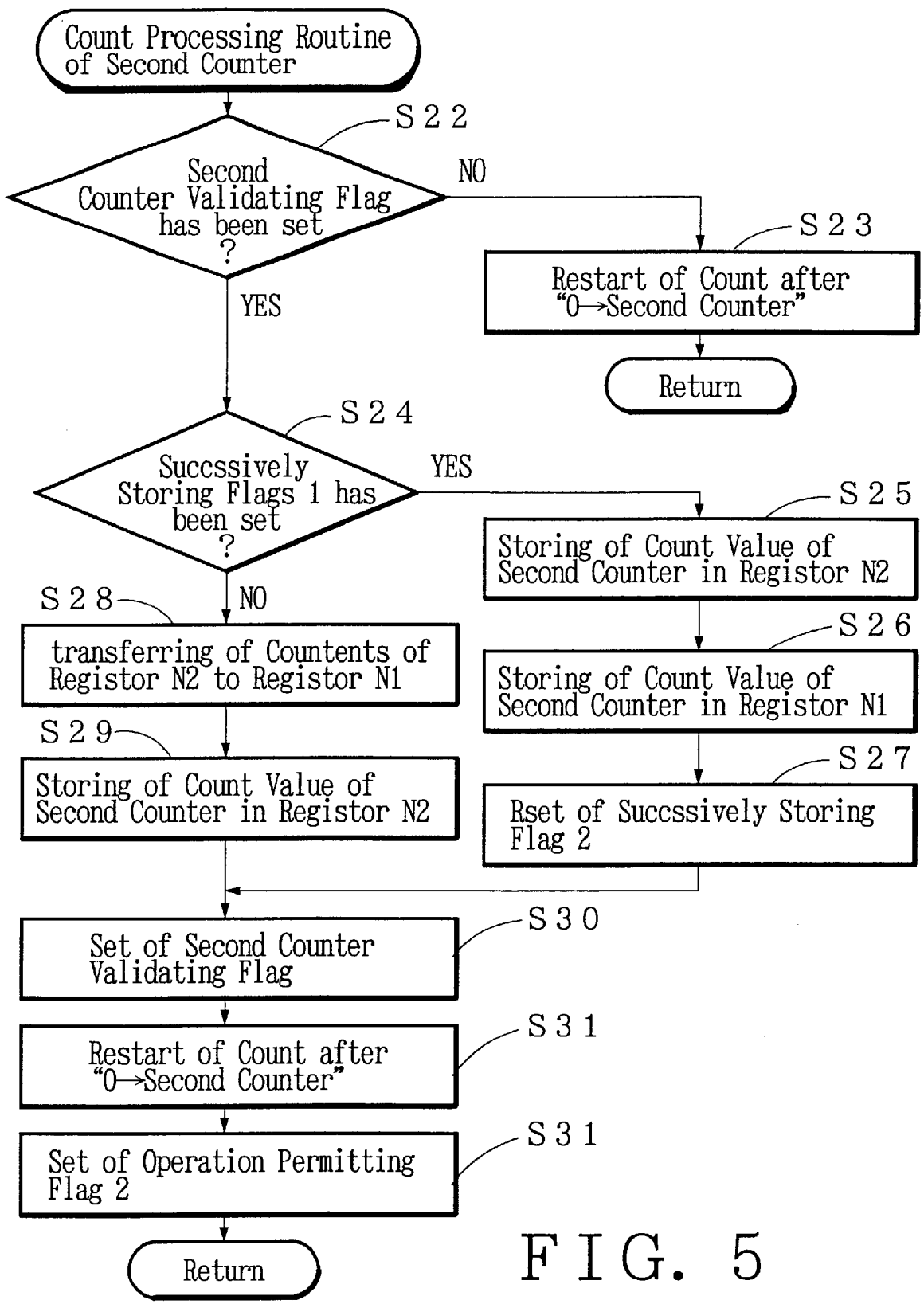
FIG. 5 is a flowchart of a count processing routine of a second counter in the frequency measuring apparatus of FIG. 1.

FIG. 5 is a flowchart of a count processing routine of the above second counter. As described above, this routine is activated by the rising (or, dropping) edge of the above input pulse. When the interruption is arisen by the rising of the input pulse, whether or not the above second counter validating flag is set is judged first (step S22). As described above, the above second counter validating flag is reset at the starting point (step S2) of the main routine and set in step S20 of the above first timer interruption processing routine. Accordingly, the second counter validating flag is in a reset state before time t1 shown in FIG. 6. Accordingly, in this interruption processing routine activated by the rising of the pulse inputted by this point of time, since the judgment result of the above step S22 comes to NO, the process goes to step S23, wherein the above second counter is reset in 0, and the measurement of the period of the input pulse is restarted. Here, as described later, since the judgment result of this step S22 is NO until the timing (t2, t3 . . . ) of generating the above first signal after the operation permitting flags 1 and 2 have been reset (step S8) by executing the frequency calculation processing (step S7) in the above main routine, the second counter merely repeats the measurement of the period of the input pulse.

Figure 6:
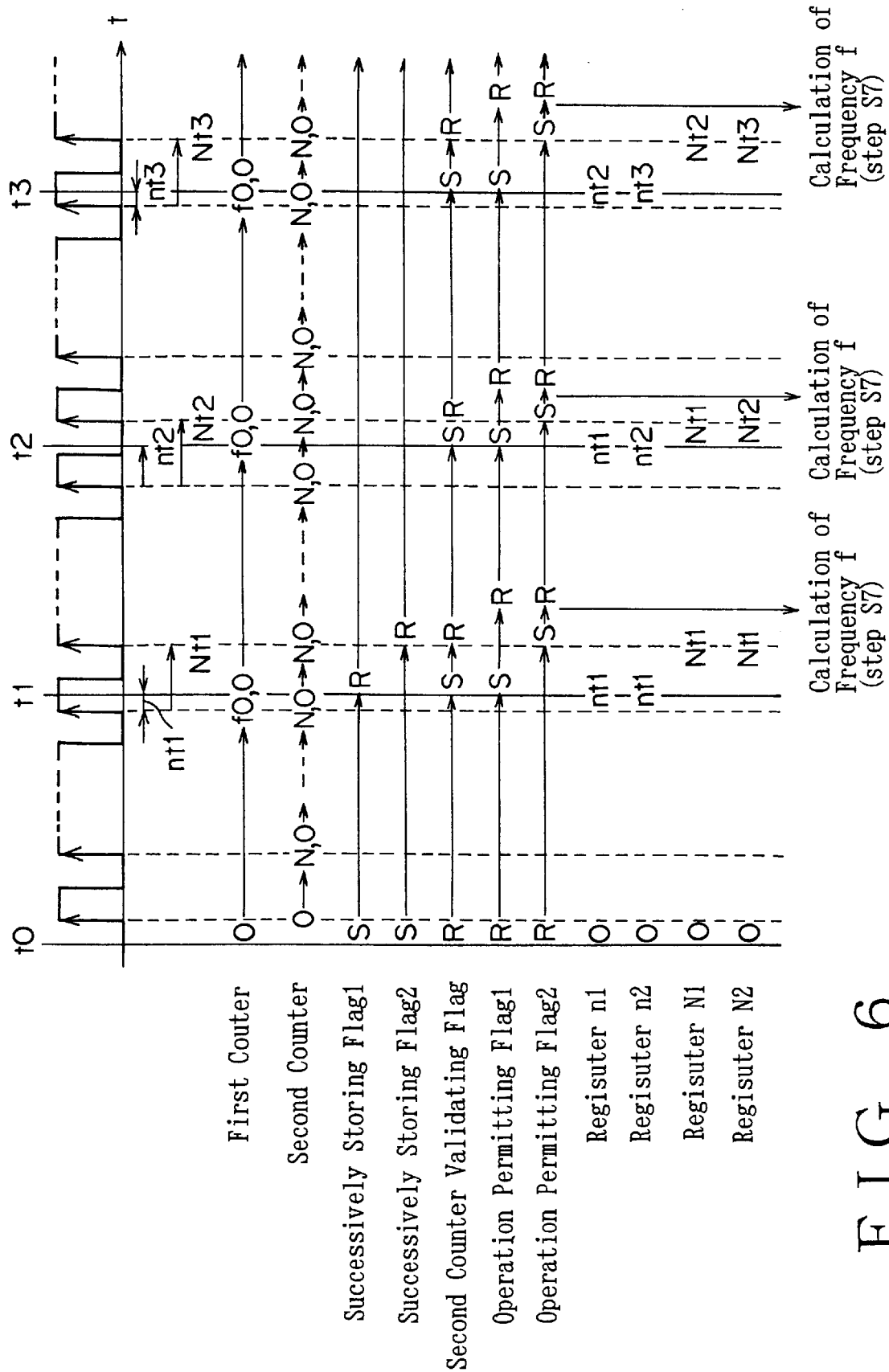
FIG. 6 is a timing chart showing an operation of the frequency measuring apparatus of FIG. 1.

Meanwhile, in this interruption processing routine (the count processing routine of the second counter by the rising edge of the input pulse generated right after the time t1, t2, t3 . . . in FIG. 6) right after the execution of step S20 (FIG. 4) at the above first timer interruption processing routine, since the above second counter validating flag is in a set state, the judgment result of this step S22 comes to YES. At this time, the process goes to step S24, and whether or not the successively storing flag 2 is set is judged. As described above, since the successively storing flag 2 is set in step S2 of the above main routine right after the start of the operation, the judgment result of this step S24 comes to YES in this interruption processing routine by the rising edge of the input pulse right after time t1 shown in FIG. 6. Accordingly, the process goes to S25 step at this time, and the time (Nt1 in FIG. 6) is stored in the register N2 and in the register N1 (step S26). And, in step S27, the above successively storing flag 2 is reset. By this, the period Nt1 of the input pulse, which period includes the first signal at the above time t1 therein, is stored in the registers N2 and N1.

Meanwhile, after the above time t2, since the above successively storing flag 2 is reset in the above step S27, the judgment result of the above step S24 comes to NO. At this time, the count value (the above Nt1 in the interruption processing right after time t1), of the above second counter, stored in the above register N2 is forwarded to the above register N1 in step S28, and the count value (Nt2 in the interruption processing right after time t2) of the second counter at this point is stored in the above register N2 (step S29). By this, the period of the input pulse including the generation timing of the first signal therein can be stored in the above register N2, and the period of the input pulse including the generation timing of the last first signal, i.e. the first signal just before the above first signal, therein can be stored in the above register N1.

After the above step S27 or S29 has been executed, the process goes to step S30, and the above second counter validating flag 2 is reset. And, the process goes to step S31, after having initialized the above second counter in 0, the count of the period of the input pulse is restarted. And, in step S32 the above operation permitting flag 2 is set, and this interruption processing routine is closed.

Like the above, the above second counter validating flag is being set during the time period from the storage of the time nt2 (nt1), which is the time period until the generation timing of the first signal in the input pulse including the first signal in the period thereof, in the register (step S20) until the storage of the period Nt2 (Nt1) of the above input pulse in the register (step S30). By this, with respect to the input pulse including the generation timing of the above first signal in its period, the time period until the generation timing of the first signal and the period of the input pulse can be securely stored in the register.

And, since the above successively storing flags 1 and 2 are provided for storing the count value of the second counter corresponding to the very first signal of the first signal in the above registers n1, n2 and N1, N2 at the start of the operation, the successively storing flags 1 and 2 are reset after that.

Further, in the above first timer interruption processing routine (FIG. 4) executed when the above first signal has been generated, the above operation permitting flag 1 is set when the count value of the second counter at the generation timing of the first signal, that is, the data corresponding to the position of the above first signal in the input pulse including the above first signal in the period thereof, has been stored in the above registers n1 and n2.

Still further, the above operation permitting flag 2 is set when the count value, that is, the period of the input pulse (and the period of the last input pulse) including the above first signal in its period, of the above second counter at the time of the rising edge being detected during the above second counter validating flag being set is stored in the above registers N2 (and N1).

And, the above main routine carries out the calculation of the above expression (4) (the expression (5), if the period of the first signal is other than 1 second) when both of the above operation permitting flags 1 and 2 are set (step S7, FIG. 3) and resets the above first operation permitting flags 1 and 2.

Accordingly, as shown in FIG. 6, the judgment result of step S6 of the main routine becomes YES after the rising point of the first input pulse after time t1, and the first frequency calculation processing (step S7) is executed. In this case, however, since Nt1 is stored in both the above registers n1 and n2 and also Nt1 is stored in both the above registers N1 and N2 as described above, the result of the frequency calculation of this time is of the count value f0 of the above first counter. When step S7 of the main routine is executed after the rising point of the first input pulse after time t2, an accurate frequency can be obtained based on the above expression (4).

In this way, according to the frequency measuring apparatus applied to the present invention, an accurate frequency can be calculated up to a decimal portion every period of the above first signal (the first period). Accordingly, a highly accurate frequency measurement can be carried out in a short time.

And, since the count values (nt1, Nt1) of the second counter at the last measuring period are applied to the calculation of the frequency at the next (i.e. present) measuring period, the frequency measurement can be carried out efficiently.

Figure 7:
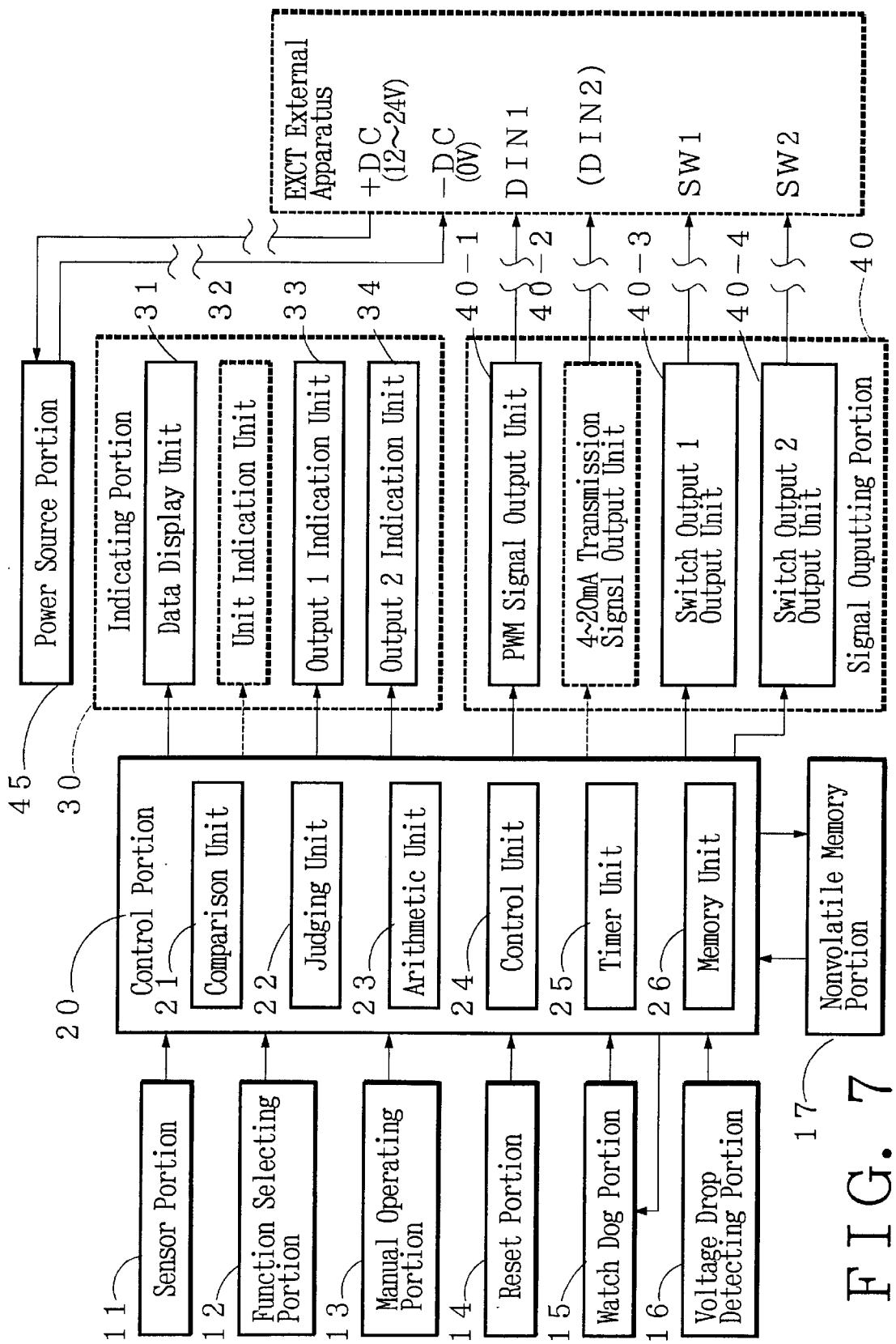
FIG. 7 is a block diagram showing an example of a basic structure of a first embodiment of a flowmeter of the present invention.

Next, a flowmeter, to which the frequency measuring method is applied, is described hereafter. FIG. 7 is a block diagram showing an example of a basic structure of a first embodiment of a flowmeter of the present invention.

As shown, the flowmeter has a sensor portion 11 to output a pulse signal with the frequency corresponding to a flow rate of fluid, a function selecting portion 12 to select the function of this flowmeter, a manual operating portion 13 to manually input various data and various directions, a reset signal output portion 14 to detect the on/off of the power source and to output a reset signal, a watch dog timer portion 15 to judge whether or not the control portion 20 operates normally and to output an interruption signal at an abnormal state, a voltage drop detecting portion 16 to monitor the power source voltage and to output an interruption signal when a drop of the power source voltage is detected, a control portion 20 to carry out the control of the whole flowmeter, a nonvolatile memory portion 17 to hold various data, a indicating portion 30 to indicate the measured flow rate value and so on, a signal outputting portion 40 to output signals to an external apparatus EXCT such as a concentrated monitor, and a power source portion 45.

Here, the above control portion 20 has a comparison unit 21 to carry out comparison, a judging unit 22 to carry out judgment based on the comparison result at the comparison unit 21, an arithmetic unit 23 to carry out various operations, a control unit 24 to control the whole control portion 20, a timer unit 25 to be used for bring about various timer interruptions, and a memory unit 26 composed of a ROM, a RAM and so on to memorize the control program and various data. Here, the control portion 20 is formed of a single tip microcomputer, for example.

And, the above indicating portion 30 has a data display unit 31 to indicate a measured flow rate value, a unit indication unit 32 to indicate the unit of the flow rate indicated by the data display unit 31, an output 1 indication unit 33 to be lighting-controlled at the time of a later-described signal output or the like, and an output 2 indication unit 34. Here, when the unit of the flow rate is fixed, the above unit indication unit 32 may not be provided.

Further, the above signal outputting portion 40 has a PWM signal output unit 40-1 to convert the measured flow rate value into a PWM (pulse-width modulation) signal and to output it to a first data input terminal DIN1 of an external apparatus EXCT such as a concentrated monitor, a switch output 1 output unit 40-3 to output an output 1 showing a state that the measured flow rate value has come not more than (or not less than) a first specified value to a switch 1 input SW1 of the external apparatus EXCT, and a switch output 2 output unit 40-4 to output an output 2 showing that the measured flow rate value has come not less than (or not more than) a second specified value to a switch 2 input SW2 of the external apparatus EXCT.

Here, a 4–20 mA transmission signal output unit 40-2 (shown with a broken line) to output an analogue flow rate signal having a current range of 4–20 [mA] and corresponding to the measured flow rate value to an analog input terminal of the above external apparatus EXCT may be added or provided in place of the above PWM signal output unit 40-1.

And, 45 designate a power source portion, which converts, for example, a 12–24[V] direct current power source supplied from the above external apparatus EXCT into the operation voltage of this flowmeter and supplies it thereto. Or, a battery may be used as the power source.

The summary of the operation of the above flowmeter will be described hereinafter.

Upon the activation of the flowmeter the above control unit 24 first carries out the initialization of the flowmeter. And, the set state of the above function selecting portion 12 is read in, and the operation mode of the flowmeter is judged. Here, it is assumed that an instantaneous flowmeter mode has been set.

Next, various preset data such as a diameter and material of the flow-channel and a version of the control program which are preset by the above function selecting portion 12 are indicated on the above indicating portion 30, and measurement of the frequency of a pulse signal having the frequency corresponding to the measured flow rate inputted from the above sensor portion 11 is started.

As stated above, in this measurement an integer portion of the measured frequency is measured by counting the number of pulses of the above input signal according to an output of the first timer (one second timer), and also a decimal portion of the measured frequency is measured by counting the period of the input pulse and the output timing of the above first timer by the above reference clock with a 1 msec period.

And, the frequency is calculated by using the above comparison unit 21, the judging unit 22 and the arithmetic unit 23 based on the above expression (4), and the instantaneous flow rate is calculated from the calculated frequency with the above expression (2) or (3). And, the calculated instantaneous flow rate value is indicated on the above indicating portion 30 and outputted to the external apparatus EXCT from the above signal outputting portion 40. And, the measured instantaneous flow rate is compared with the preset flow rate value by the above comparison unit 21 and the above judging unit 22, and according to the comparison result the switch output is outputted from the above switch output unit 40-3 or 40-4 to the above external apparatus EXCT. Further, an integrated flow rate value which is obtained by integrating (i.e. totalizing) the above calculated instantaneous flow rate value is calculated. This integrated flow rate value is indicated according to the operation of the above manual operating portion 13 on the above indicating portion 30.

Next, the flowmeter (the instantaneous flowmeter) will be described in further detail. Here, in this further specified embodiment, it is assumed that the control program common to both of the instantaneous flowmeter and the integrating batch flowmeter is used so that the present flowmeter can be available to the both.

Figure 8A:
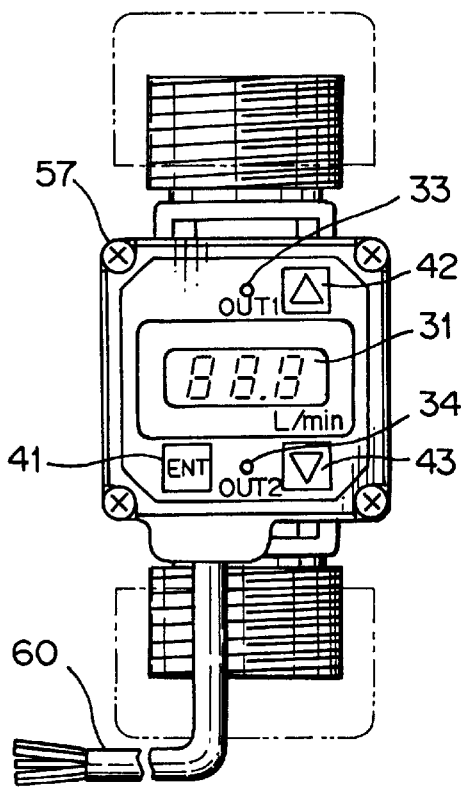
FIGS. 8A to 8C show a structure of an embodiment of the flowmeter of the present invention.
Figure 8B:
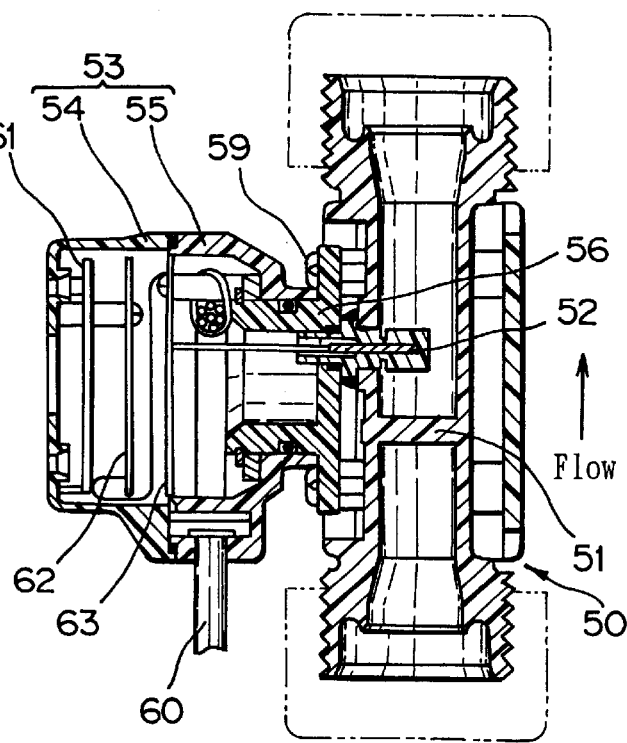
Figure 8C:
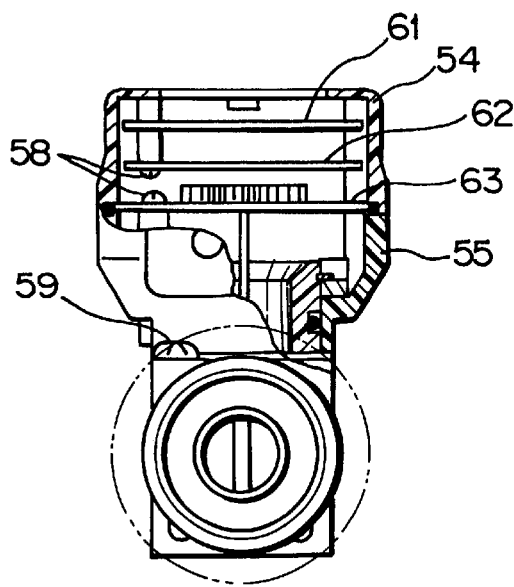

FIGS. 8A–8C show a structure of the embodiment of the flowmeter of the present invention; FIG. 8A is a top view showing an indication and operating panel; FIG. 8B is a sectional view showing the internal structure of the flowmeter; and FIG. 8C is a cutaway side view of the flowmeter. The instantaneous flowmeter consists of a metering section body 50 connected on a portion of the flow-channel in which the fluid to be measured flows, and a measurement indicating portion installed at an upper portion of the metering section body 50, which measurement indicating portion can be positioned every 90°. Here, the above metering section body 50 meets the size of the pipe to which the above metering section body 50 is connected, and the above measurement indicating portion is designed commonly to many kinds (for example, 64 kinds) of diameters or materials of the pipes. That is, as described later, the diameter or material of the pipe can be selected by the operation of the manual operating portion (the key input portion).

The inlet of the above metering section body 50 is connected with the upstream, and the outlet thereof is connected to the downstream. The above metering section body 50 is of a Karman vortex type which makes use of the frequency of the Karman vortex, formed in the downstream of a pillar shape object 51 put in the flow, being in proportion to the flow velocity in wide Reynolds number, whereby the flow velocity or the flow rate can be measured according to the vortex frequency. This Karman vortex type one has a simple structure without a slide portion and is superior in reliability and durability. And, since it has only a vortex generation body and a vortex detector in the flow-channel, the throttling of the flow-channel is small, thereby reducing a pressure drop.

And, the above metering section body 50 is provided with a pressure-electricity element 52 as a sensor inside a holder so as to detect a pressure in the flow-channel, which pressure varies due to generation of the vortex. The pressure-electricity element 52 outputs a flow rate signal which varies correspondingly to the vortex frequency, and this signal is supplied to an electronic circuit provided in the measurement indicating portion through a lead wire.

The measurement indicating portion has a casing 53 consisting of an upper casing 54 and a lower casing 55 coupled with the upper casing 54 through a waterproof packing, a first printed circuit board (an indication board) 61 accommodated in the casing 53, a second printed circuit board (a CPU board) 62, a third printed circuit board (a sensor board) 63, LEDs 33,34 arranged on the upper casing 54, a data display unit 31 formed of, for example, three FIG. 7 segment LED indicator, and operation keys 41,42 and 43. And, in the measurement indicating portion, a hollow shaft 56 fixed by screws 59 on the metering section body 50 rotatably meets a hole on the bottom of the lower casing 55 through the waterproof packing thereby to be positioned every 90° against the metering section body 50. The lead wire from the above pressure-electricity element 52 goes to the electronic circuit formed on the sensor board 63 through the hollow portion of the shaft 56. Here, 60 is a shielded signal line to be connected to the external apparatus.

And, the above indication board 61 and the CPU board 62 are attached to the above upper casing 54 through a metal spacer by mounting screws 58, and the above sensor board 63 is attached to the lower casing 55 through a metal spacer by mounting screws 58. Here, the above upper casing 54 and the lower casing 55 are, for example, made of resin on which a conductive shielding material is coated, and the electric connection between the above casing 53 and the printed circuit boards 61–63 is obtained through the metal portion provided on points where the screws 58 abut the metal spacer on the above printed circuit boards 61–63.

And, the above upper casing 54 is attached to the lower casing 55 by screws 57 so that the upper casing 54 can be opened when setting operations are carried out.

Figure 9:
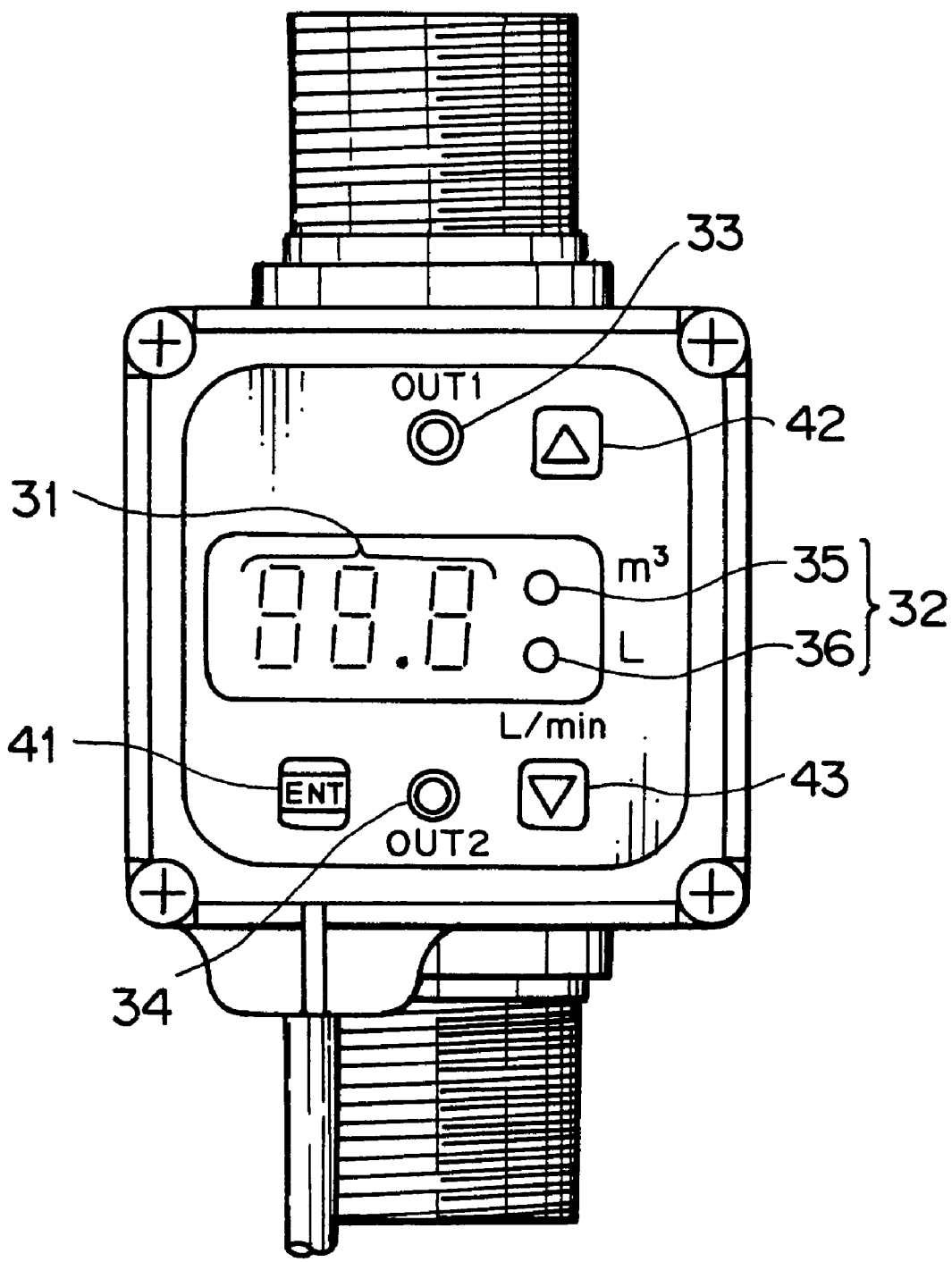
FIG. 9 shows another embodiment of an indicating portion of the flowmeter of the present invention.

Here, in the example stated above, though two LEDs 33,34 and the three FIG. 7 segment indicator 31 as the above data display unit are provided as the indicating portion on the above upper casing 54, the structure is not limited thereto. FIG. 9 shows another embodiment of the indicating portion of the flowmeter of the present invention. As shown, the indicating portion has two LEDs 35,36, which indicate indicating units, in addition to the above LEDs 33,35 and the indicator 31. That is, an indication of "$m^3$" is carried out on the right side of the LED 35, and an indication of "L" is carried out on the right side of the LED 36. By this, when the LED 35 is lighted, the unit of the numerical value indicated on the above indicator 31 is the cubic meter can be shown, and when the LED 36 is lighted, the unit of the numerical value indicated on the indicator 31 is the little can be shown. That is, in this embodiment, the above LEDs 35,36 constitute the above unit indication unit 32.

And, the above LEDs 33 and 34 are lighted when the first and second outputs are being outputted to the external apparatus as described later. Here, the color of the LEDs may be different; for example, the LED 33 is in red, and the LED 34 is in green.

FIGS. 10A–10E show an example of an arrangement of a printed circuit board and a parts arrangement on the printed circuit board in the flowmeter of the present invention. That is, circuit parts are arranged on the indication board 61, the CPU board 62 and the sensor board 63. Here, FIG. 10A shows a state that the above printed circuit boards 61–63 are assembled in the above casing 53; FIG. 10B is a front view of the indication board 61; FIG. 10C is a back view of the CPU board 62; FIG. 10D is a front view of the above sensor board 63; and FIG. 10E is a back view of the sensor board 63.

As shown in FIG. 10A, the above indication board 61 is electrically connected to the above CPU board 62 through connector 64, and the above CPU board 62 and the sensor board 63 are electrically connected to each other through a flat cable 65. And, a microcomputer 20 to work as the above control portion is provided on the above CPU board 62, and an EEPROM to work as the above nonvolatile storage cell 17 is provided on the back of the CPU board 62.

And, as shown in FIG. 10B, a test mode set pin 18 consisting of two pins is provided on the face of the above indication board 61 so that a later-described test mode is obtained by short-circuiting the test mode set pin 18.

Further, as shown in FIG. 10C, function selection pins consisting of two sets of jumper pins J1,J2 constituting the above function selecting portion 12 are provided on the back of the above CPU board 62. The jumper pin J1 is used for selecting either this flowmeter is used as the instantaneous flowmeter or used as the integrating batch flowmeter. When the jumper pin J1 is short-circuited with a jumper line, this flowmeter works as the instantaneous flowmeter, while the jumper pin J1 is opened, the flowmeter works as the integrating batch flowmeter. And, the jumper pin J2 is used to select either the measured data by this flowmeter is transmitted to the external apparatus by a 4–20 mA transmission system or it is transmitted thereto with the PWM signal. When the jumper pin J2 is short-circuited with a jumper line, the 4–20 mA transmission system is selected, while the jumper pin J2 is opened, the PWM signal is selected.

As shown in FIG. 10D, terminals S+ and S− to which the lead wires from the above pressure-electricity element 52 are connected are provided on the face of the above sensor board 63. Further, various electronic parts such as a trimmer VR for adjustment, various operational amplifiers, diodes, a varister, and a condenser are arranged on the above sensor board 63. And, 66 is a terminal to which a connection cable 60 from the external apparatus is connected. Further, as shown in FIG. 10E, various output transistors like a later-described PWM output transistor 76 and various electronic parts such as three terminal stabilization power source circuit 78 to work as the above power source portion 45 are provided on the back of the above sensor board 63.

An example of a circuit structure of this flowmeter will be described referring to the block diagrams of FIGS. 11, 12.

Figure 11:
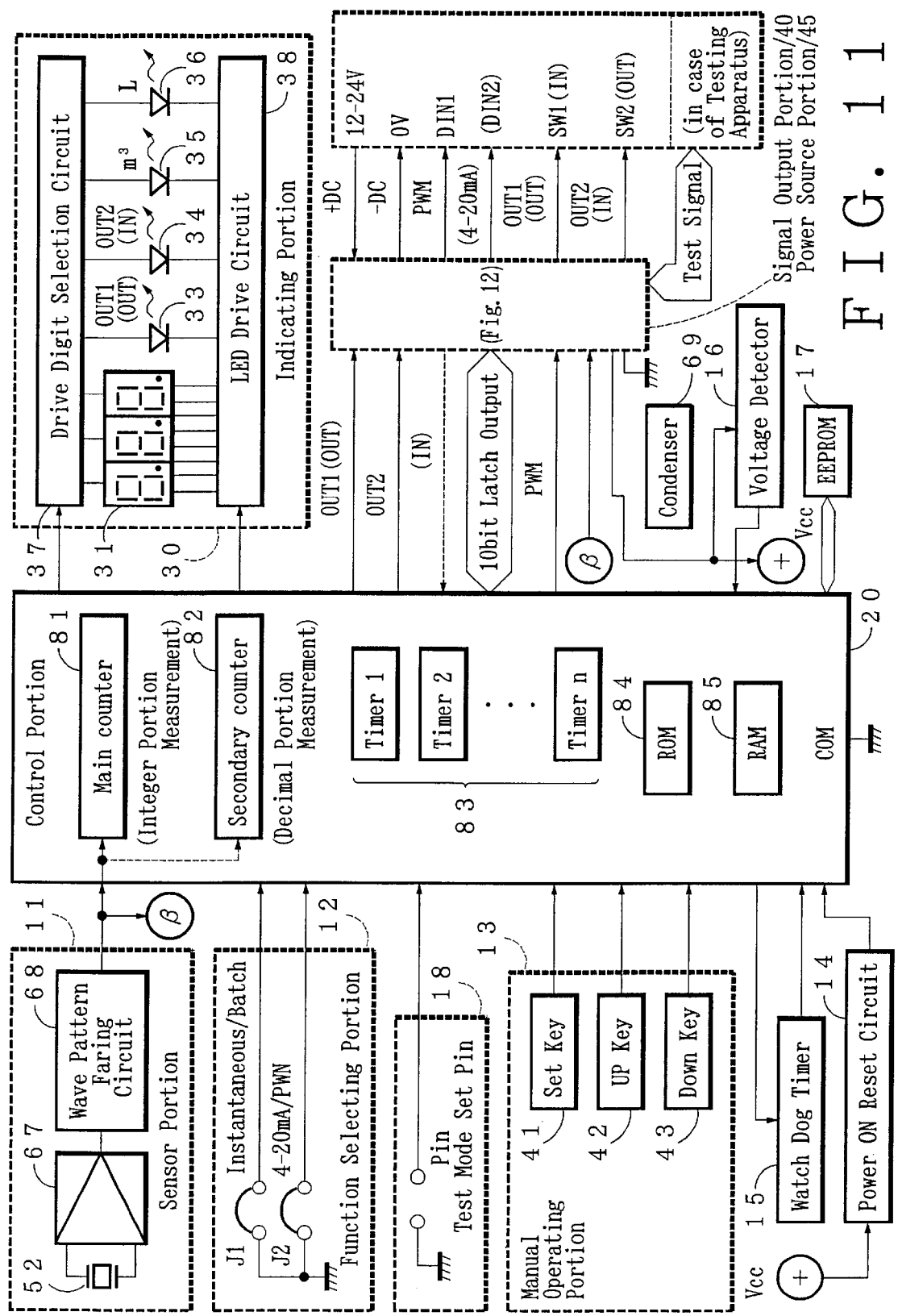
FIG. 11 is a block diagram showing a circuit structure of the flowmeter of the present invention.

In FIG. 11, 20 is the microcomputer to carry out the total control of the flowmeter. Inside the microcomputer 20 provided is a first counter (a main counter) 81, a second counter (a secondary counter) 82, timer registers 83 consisting of timers 1–n, a ROM 84 to store the control program, a later-described arithmetic coefficient table and the like, a RAM 85 used as a data areas for storing various data and as a work area, a indication driver to drive the indicating portion 30, a PWM output function portion to output a PWM signal from an output port, and so on. This PWM output function portion has a resolvability of, for example, 10-bit and has a PWM prescaler to set the PWM period, a PWM register to set a time-period of "H" level of an output pulse, and so on.

Here, in the above timer registers 83 included are a first period timer (1 second timer) which corresponds to the above first timer, a timer to generate a reference clock of 1 msec, a second period timer (0.2 second timer), and so on.

Here, the above second period timer synchronizes with an output signal of the above first period timer and outputs a signal having a second period which is obtained by dividing an output signal period of the above first period timer by the measurement bottom frequency. In this example, the signal has the period of 0.2 second obtained by dividing the period of 1 second of the first timer output by 5 Hz of the measurement bottom frequency. And, as described later, the timing of the arithmetic operation of the arithmetic portion is to be controlled according to the output signal of this second period timer. And, though the above first period timer and the second period timer may be provided separately, the first period timer output is here given based on the output of the second period timer. For example, the output of the above second period timer is counted, and the above first period timer output is outputted every 5 counts.

Further, the above main counter 81 and the secondary counter 82 are connected to the input port (a count signal input port) to which the input signal from the above sensor portion 11 is applied. The above main counter 81 counts the number of the input pulse inputted for 1 second (the period of the first period timer output signal), and the above secondary counter 82 measures the period of the above input pulse every 1 msec.

11 is a sensor portion consisting of the above pressure-electricity element 52, an amplifier 67 to amplify the electric signal from the pressure-electricity element 52, and a wave pattern fairing circuit 68 to fair the output signal of the amplifier 67 and to output a pulse signal. The output β of the sensor portion 11 is inputted to a count signal input port of the above microcomputer 20 and is also applied to the signal outputting portion shown in FIG. 12. The output β of the sensor portion 11 can be outputted directly to an external apparatus EXCT such as an adjustment test unit through the transistor 77.

12 is the function selecting portion, which, as described above, has the jumper pins J1,J2. The output of each of the jumper pins J1 and J2 is connected to the input port of the above microcomputer 20.

And, 18 is a test mode set pin, and, as described above, the flowmeter is set to the test mode by short-circuiting the test mode set pin 18. As described later, the flowmeter can be tested in the test mode by being connected to the adjustment test unit as the above external apparatus EXCT before shipment.

13 is the manual operating portion (the key input portion), which, as described above, has three operation keys of a set key (an the ENT key) 41, an up key (a Δ key) 42, and a down key (a ∇ key) 43. These keys are connected to the input port of the microcomputer 20.

15 is a watch dog timer, which outputs an interruption signal to the microcomputer 20 when no signal from the output port of the microcomputer 20 is inputted thereto for a fixed time. The microcomputer 20 starts a later-described second start processing by this interruption input. Here, The periodical output to the watch dog timer is executed by means of, for example, a timer interruption processing routine which is carried out every fixed period.

Further, 14 is a power ON reset circuit, which detects a power source voltage Vcc, when applied, and applies a pulse signal to a reset terminal of the above microcomputer 20. By this, the microcomputer 20 executes a later-described first start processing.

30 is the above indicating portion, which has a 7 segment LED indicator 31, of three columns, as the data display unit, an OUT1LED 33 lighted at the output of the first output OUT1 (an output signal OUT when used as the integrating batch flowmeter), an OUT2 (IN) LED 34 lighted at the output (input) of the second output OUT2 (an input IN when used as the integrating batch flowmeter), a drive digit selection circuit 37, and a LED drive circuit 38. And, in case of the embodiment having the unit indicating portion 32 shown in FIG. 9, the above indicating portion 30 further has a LED 35 which indicates that the numerical value at the above indicator 31 is in "$m^3$" and a LED 36 which indicates the unit "L" (little). And, the data for the indications on the above drive digit selection circuit 37 and a LED drive circuit 38 are outputted from the indication drive circuit built in the above microcomputer 20 through the output port.

Here, other indication element such as a liquid crystal display (LCD) than the above LED can be used, not limited thereto.

And, the number of figure of the above indicator 31 may be, for example, 8 figures, not limited to 3 figures.

The above nonvolatile storage device 17 is of EEPROM (Electrically Erasable Programmable ROM), in which the integrated flow rate value data, various preset numbers, a linear expression gradient data revised at a later-described adjustment test, and intercept data are stored. By this, the disappearance of data at a power source voltage drop can be prevented.

And, 69 is a large capacity condenser connected to the power source terminal in parallel, which large capacity condenser is used as a back-up power source at a temporary power source voltage drop.

Further, 16 is a voltage detector to check the power source voltage and to make a power source voltage check interruption when the power source voltage has dropped below the fixed voltage.

The first output OUT1 and the second output OUT2 are supplied to an signal outputting portion 40 shown in FIG. 12 from the output port of the above microcomputer 20. Here, the first output OUT1 is a signal which is outputted when a measured instantaneous flow rate value is smaller than the first preset flow rate value (for example, the bottom flow rate value) QL, and the second output OUT2 is a signal which is outputted when a measured instantaneous flow rate value is greater than the second preset flow rate value (for example, the ceiling flow rate value) QU. As stated above, the quick control of the external apparatus can be done by outputting the first output OUT1 and the second output OUT2 to the external apparatus without delay.

Here, when this flowmeter is used as the integrating batch flowmeter, the above first output OUT1 (OUT) is outputted, and, in place of the above second output OUT2, an input IN shown with a dotted line is inputted in the input port of the microcomputer 20 from the external apparatus EXCT through the signal outputting portion 40/the power source portion 45. Further description is omitted here.

In FIG. 12, 70 is an output transistor to which gate the first output OUT1, which is the above first comparison result, is applied, and 71 is an output transistor to which gate the second output OUT2, which is the above second comparison result, is applied. The drains of the output transistors 70,71 are outputted to the external apparatus from the respective output terminals. By this, quick switch control and so on can be done using these outputs OUT1,OUT2 at the external apparatus side. As shown, a Zener diode ZD for protection is provided on a portion between each output terminal and the ground.

Here, as described above, when used as the integrating batch flowmeter, the input signal IN from the external apparatus EXCT is faired by a threshold value circuit 72 and inputted. Between the threshold value circuit 72 and the input signal IN, a resistance R for protection and a diode D for protection are connected.

And, though the transistors 70,71 are provided for the first comparison result output OUT1 and the second comparison result output OUT2, respectively, "conductive/non-conductive" of the transistor 70 may be controlled by an logical sum output from an OR-circuit OR of the above first output OUT1 and the second output OUT2, as shown as another example at the lower portion of FIG. 12. In this case, a large number of comparison results can be outputted with a smaller number of transistors. However, it shall be judged, from the measuring output data, that from which of the first and second comparison results the transistor has got "conductive" or "non-conductive" at the external apparatus side. And, more than two comparison results may be outputted.

Further, the measured output data of 10-bit is supplied to the above signal outputting portion 40 from the output port, with an output latch, of the above microcomputer 20. The measured data of 10-bit is inputted to a digital analogue (D/A) conversion portion 73 at the signal outputting portion 40 shown in FIG. 12 and is supplied to the test signal output terminal to which the adjustment test unit is connected at the test mode. The measured data converted into an analog signal at the D/A conversion portion 73 is inputted to the 4–20 mA transmission signal outputting portion 75 through the voltage current conversion portion (a V/I conversion portion) 74 and is outputted as an 4–20 mA transmission signal to the above external apparatus EXCT. Between the ground and the output of the 4–20 mA transmission signal outputting portion 75 connected in parallel are a condenser C and a varister so as to absorb the noise or surge.

Still further, the PWM signal, having a resolvability of 10-bit, corresponding to the measured flow rate value is outputted from the output port of the above microcomputer 20, which PWM signal is applied to the gate of the output transistor 76 shown in FIG. 12 and is outputted through the PWM output terminal to the external apparatus EXCT. Here, the Zener diode ZD for protection is connected between the above PWM output terminal and the ground.

Like this, in the present invention, since the above 4–20 mA transmission signal or the above PWM signal each are generated based on the measured data having a resolvability of 10-bit, an signal with no error propagation can be outputted to the external apparatus. Further, since the measured pulse signal β from the wave pattern fairing portion 68 of the above sensor portion 11 is applied to the gate of the output transistor 77 of the above signal outputting portion 40, the drain of this transistor 77 is connected to the adjustment test unit through the test signal output terminal of the signal outputting portion 40, which adjustment test unit is connected at the test mode.

Here, in FIG. 12, though a MOS (Metal Oxide Semiconductor) transistor is used as each output transistor, a bipolar transistor may be used. In this case, the outputs OUT1 and OUT2 are applied to the respective bases of the bipolar transistors, their collectors are connected to the above output terminals.

And, 78 is a direct current stabilization power source circuit, which, in this embodiment, receives DC 12–24V supplied from the above external apparatus EXCT and converts it to an drive voltage of this flowmeter. And, as shown in FIG. 12, a varister V for surge prevention and a condenser C for noise elimination are connected in parallel on each power source line (+DC, −DC and GND) from the above external apparatus. And, the diode D, which is provided between the power source line +DC and the direct current stabilization power source 78, prevents the circuit from a reverse connection of the power source line.

Various data to be stored in the above ROM 84, RAM 85 and EEPROM 17 will be described.

Figure 13:
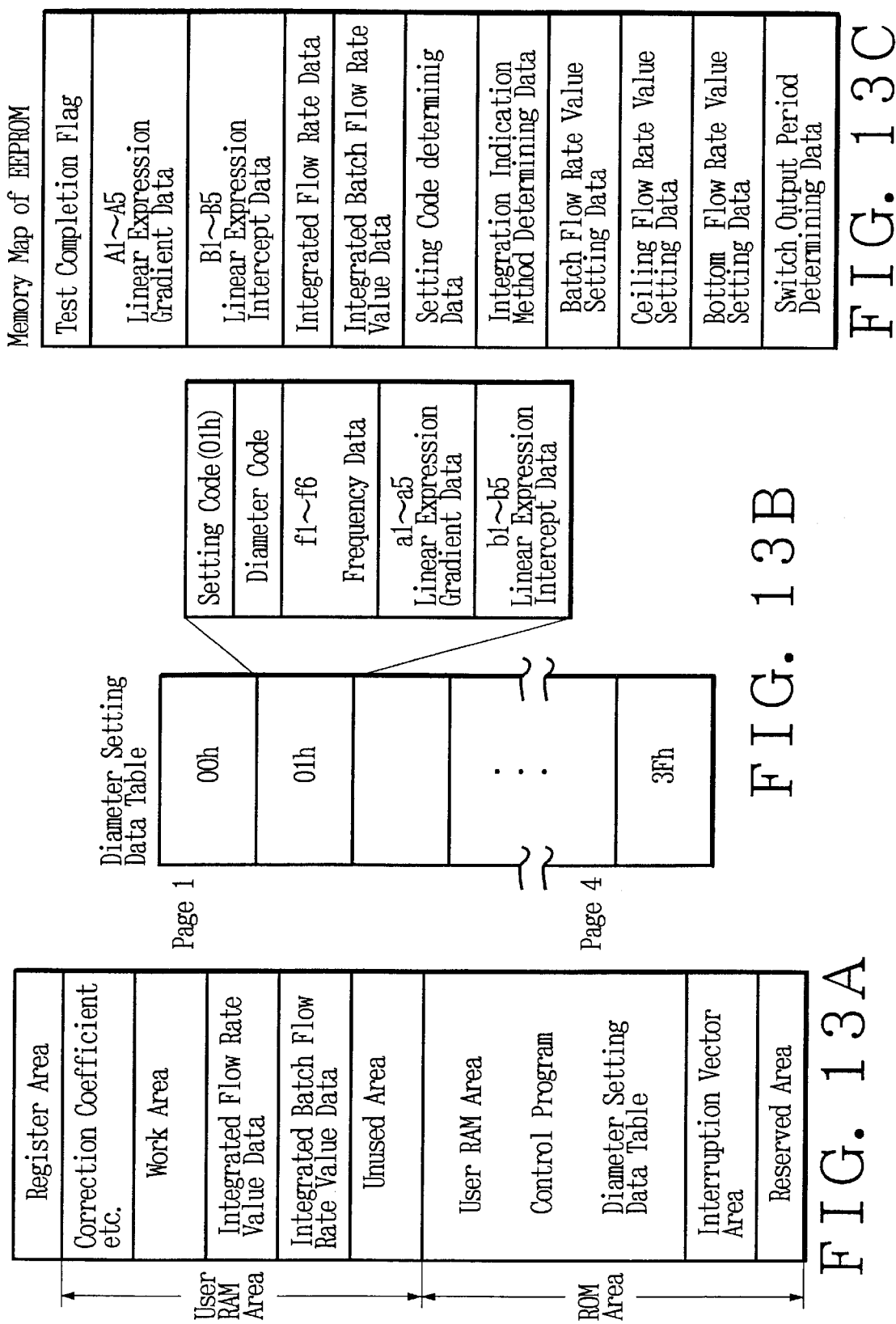
FIGS. 13A to 13C show examples of memory maps of a ROM, a RAM, and an EEPROM in the flowmeter of the present invention.

FIG. 13A shows an example of a memory map of the above ROM 84 and the RAM 85. As shown, various register areas, an area to store a later-described correction coefficient or various flags, a work area, an area to store the integrated flow rate value data, and an areas to store the integrated batch flow rate value are provided in the area of the above RAM 85. And, the control program, diameter setting data table, interruption vector, and so on are stored in the area of the ROM 84. Here, the diameter setting data table has coefficient data (the gradient data ai and the intercept data bi at the above expression (2)) corresponding to the diameter and material of the above pipe, and the data corresponding to, for example, 64 kinds of objects (the diameter and material) are stored.

FIG. 13B shows a structure of the diameter setting data table. As shown, the diameter setting data table is made up of 4 pages each having 16 kinds of the setting data. And, stored as the setting data are a setting code to distinguish the corresponding setting data (an object setting code), a code to designate a diameter, a material code to designate body material, frequency data f1–f6 to section the frequency range between the flow occurrence frequency f1 and the frequency f6 corresponding to the instantaneous flow rate value of the 110% rated flow, linear expression gradient data a1–a5 obtained when the relation between the frequency and the flow rate is approximated with a polygonal line corresponding to the above 5 sections, and intercept data b1–b5. Here, the above flow occurrence frequency f1 is the measurement bottom frequency to be decided by the diameter and material of the object, i.e. the above metering section body 50 (FIG. 8B), and is a value of around 5 Hz, for example.

Here, since these data a1–a5 and b1–b5 are the average of dispersion of instrumental error, a highly accurate measurement result cannot be expected with these data. Here, in the present invention, corrected linear expression gradient data A1–A5 and corrected linear expression intercept data B1–B5 (hereinafter "correction coefficient") corrected at each object are obtained at a later-described adjustment test process, and the flow rate is calculated using these correction coefficients with the above expression (3). By this, a highly accurate measurement can be carried out.

FIG. 13C shows an example of a memory map of the above EEPROM 17. As shown, stored in the EEPROM 17 are a test completion flag, the above corrected linear expression gradient data A1–A5, the above corrected linear expression intercept data B1–B5, the integrated flow rate data, the integrated batch flow rate value data, the object setting code determining data, the integration indication method determining data, the batch flow rate value setting data, the ceiling flow rate value setting data, the bottom flow rate value setting data, and the switch output period determining data. The details of these data will be described with reference to a later-described corresponding flowchart.

Next, the operation of this flowmeter (the instantaneous flowmeter) will be described in detail. Here, as described above, though this flowmeter can work as either the instantaneous flowmeter or the integrating batch flowmeter, a case of the instantaneous flowmeter is described here.

This flowmeter operates by means of a main routine for the flowmeter and three kinds of interruption processings such as a frequency measurement interruption processing, a 1 msec clock count interruption processing, and a power source voltage check interruption processing.

Here, the measurement of the integer portion of the frequency of a measured signal by the above main counter according to the above frequency measuring method and a processing related to the measurement of the decimal portion by the above secondary counter are executed by means of the above frequency measurement interruption processing and the 1 msec clock count interruption processing, wherein various processings such as an calculation of the frequency by using the expression (4) or (5) by means of the above main routine (4), an calculation of the instantaneous flow rate value on the basis of the above frequency and its indication, the output to the external apparatus, and the output of the switch output signal are executed.

Figure 14:
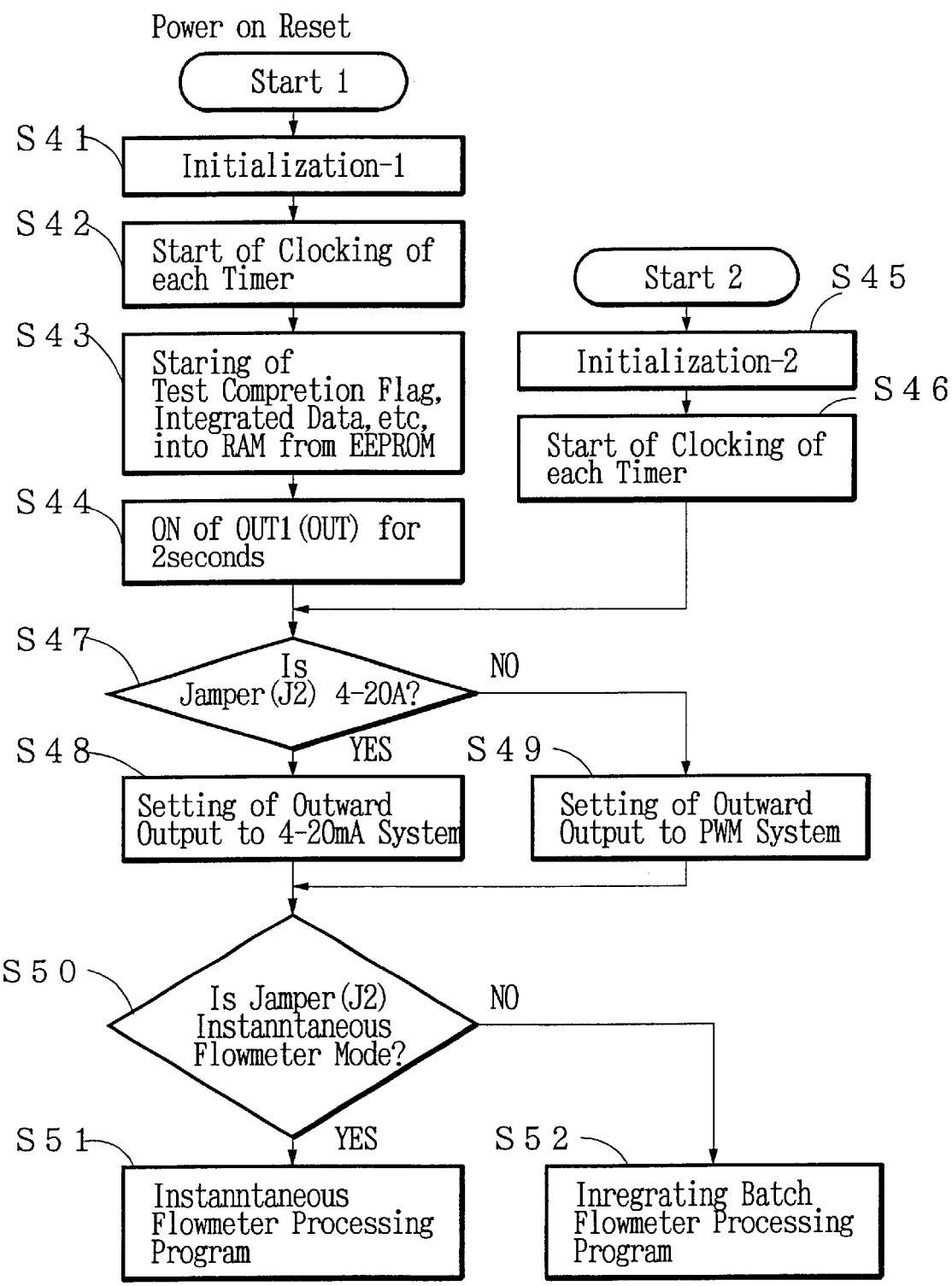
FIG. 14 is a flowchart of a main routine of the flowmeter of the present invention.

FIG. 14 shows an processing flow of the main routine. As shown, the main routine includes two start positions of a first start (start 1) and a second start. Here, when the reset signal from the above power ON reset circuit 14 has been inputted, the operation starts from the above start 1, and when there has been an interruption input from the above watch dog timer 15, the operation starts from the above start 2.

And, when the power source supply from the above direct current stabilization power source circuit 78 starts by, for example, connecting the flowmeter with the above external apparatus EXCT, the above power ON reset circuit 14 detects the this state and the power ON reset pulse is applied to the microcomputer 20. By this, the processing starts from start 1, and first the first initialization processing of step S41 is executed. With the first initialization processing on the basis of this power ON reset the determined initialization processing of the instantaneous flowmeter is executed, and all the contents of the above RAM 85 is reset. Next, the process goes to step S42, the clock operation each timer of the above timer group 83. However, the timer to generate the above 1 msec reference clock and the above second period timer (0.2 second timer) do not start here, and accordingly the signal from the first period timer is not outputted as described above.

Following the above, the above test completion flag, the integrated flow rate data, the integrated batch flow rate value data, and so on are read out from the above EEPROM 17, and they are stored in a fixed area of the above RAM 85 (step S43). In the state that the flowmeter is connected to the adjustment test unit as the external apparatus EXCT before shipment, the above test completion flag, the integrated flow rate data, and the integrated batch flow rate value data are set to the initial value 0. Next, the above first output OUT1 (OUT) is turned into an ON state for only two seconds (step S44). By this, the start (start 1) of this instantaneous flowmeter by the power ON reset can be informed to the above external apparatus EXCT. Simultaneously, the above OUT1LED 33 is also lighted for only two seconds.

Meanwhile, when the signal to the above watch dog timer 15 was not outputted in the fixed time-period because of a control program runaway or the like, an interruption signal is inputted from the above watch dog timer 15. And then, the process starts from the above start 2, and the second initialization processing of step S45 is executed. In this second initialization processing, though the fixed initialization processing of the instantaneous flowmeter is executed, the correction coefficient, the integrated flow rate value data, and the integrating batch data all stored in the above RAM 85 are not cleared differently from the above first initialization processing. And, similarly to the above step S42, the clock operation of each timer except for the above second period timer (0.2 second timer) and the 1 msec reference clock timer is started (step S46). After the above step S44 or step S46 has been executed, the process goes to step S47, wherein whether or not the 4–20 mA transmission system is set by means of the jumper pin J2 at the above function selecting portion 12 is judged. The process goes to S48 when the judgment result is YES, the D/A conversion portion 73 of the above signal outputting portion 40, the V/I conversion portion 74, and the 4–20 mA transmission signal outputting portion 75 can be operated, whereby the outward output is set to the 4–20 mA transmission system. And, the process goes to S49 when the judgment result of the above step S47 is NO, wherein the above PWM output function portion built in the microcomputer 20 is set to be ready for operation, whereby the outward output is set to the PWM system.

Next, the process goes to step S50, and whether or not the above jumper pin J1 is set to the instantaneous flowmeter mode. When the above jumper pin J1 is in the instantaneous flowmeter mode with the short-circuited jumper pin J1, this judgment result comes to YES, and the instantaneous flowmeter processing program of step S51 is executed. Meanwhile, when the above jumper pin J1 is opened, the integrating batch flowmeter processing program of step S52 is executed. Hereinafter, the instantaneous flowmeter processing program (step S51) in the case of the judgment result in the above step S50 being YES will be described in detail.

Figure 15:
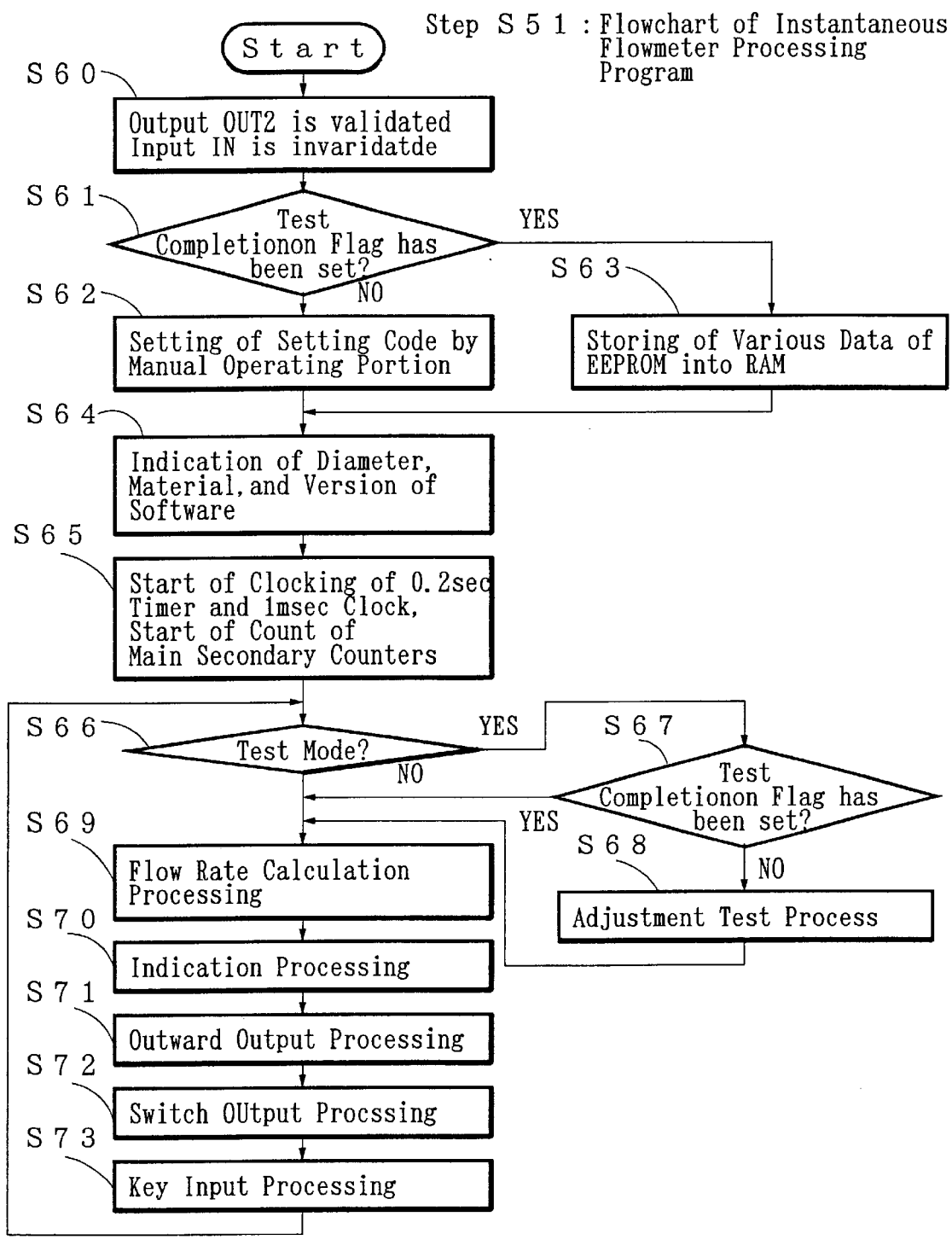
FIG. 15 is a flowchart of an instantaneous flowmeter processing program of the flowmeter of the present invention.

FIG. 15 is a flowchart to describe the operation of the instantaneous flowmeter processing program in step S51.

Upon the start of this instantaneous flowmeter processing program, first, in step S60, the above second output OUT2 comes valid, and the input IN comes invalid.

Next, the process goes to step S61, and whether or not the test completion flag is set is judged. This test completion flag is the one to be set when the correction processing of the test data and the coefficient data of this instantaneous flowmeter have been done in a later-described adjustment test process. In an initial state, this test completion flag is not set, and the judgment result of this step S61 comes to NO. The process goes to S62 step at this time, and the object setting code of the instantaneous flowmeter is set by using the manual operating portion 13, namely, the above set key 41, the up key 42, and the down key 43. By this, the diameter and material of the flow-channel to which the instantaneous flowmeter is applied are set. Here, as stated above, since this step S62 is executed when the test completion flag is not set, this is actually executed by its manufacturer.

Meanwhile, when the test completion flag has been set, the process goes to step S63, wherein the various data (the above linear expression corrected gradient data A1–A5 and the linear expression corrected intercept data B1–B5, and the like) stored in the above EEPROM 17 are read out and stored in the fixed area of the above RAM 85.

Here, in case that the adjustment test process has not been carried out, the linear expression gradient data a1–a5 and the linear expression intercept data b1–b5 stored in the above ROM 84 are used for the calculation of the flow rate.

After the above step S62 or step S63 has been executed, the process goes to step S64, wherein, based on the above setting code and the information having been read out from the above EEPROM 11, the diameter and material of the flow-channel and the version information of the control program are indicated on the above indicating portion 30 in turn by the fixed time.

Figure 16:
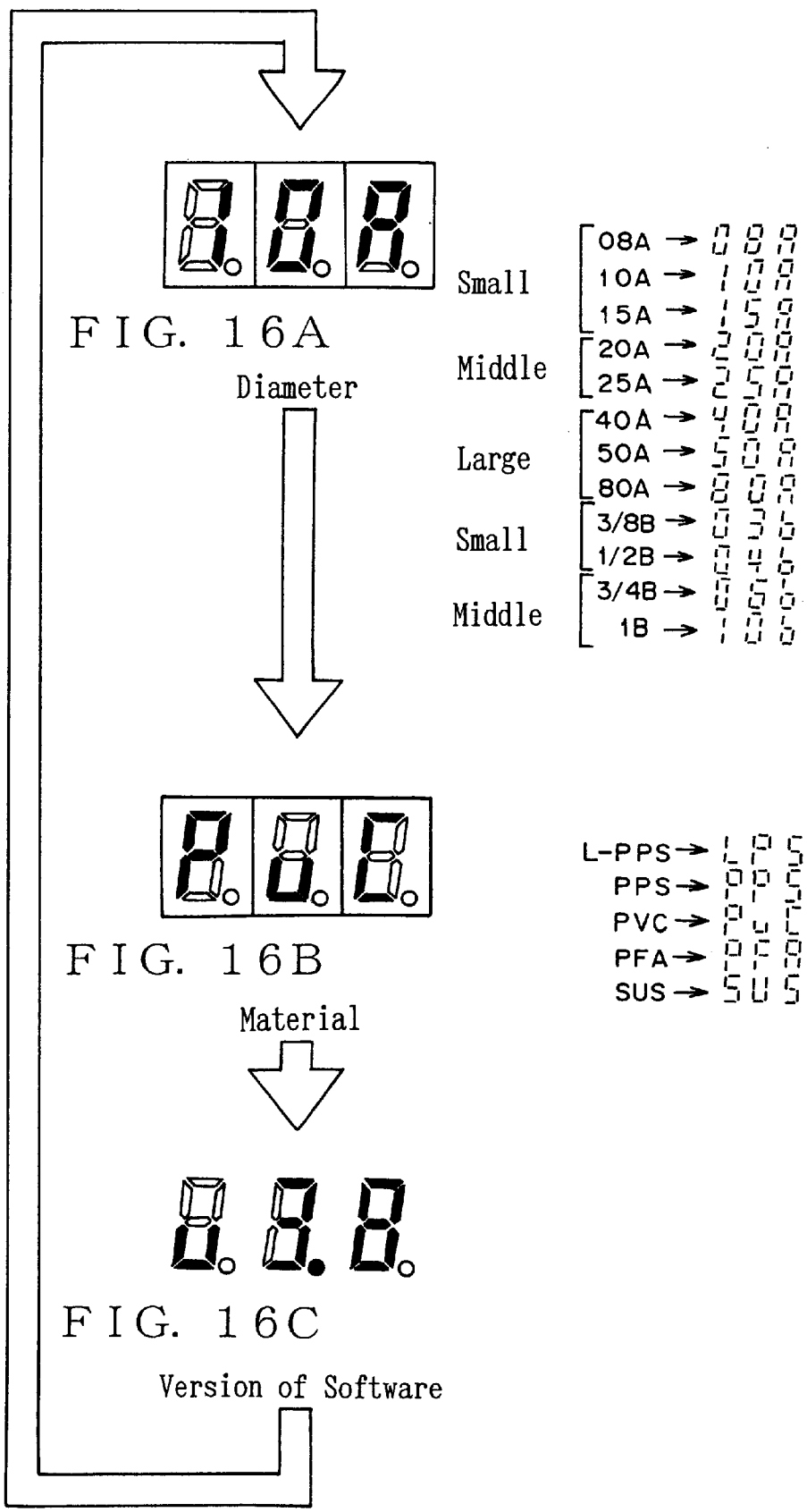
FIGS. 16A to 16C are schemata showing indication forms by step S64 in FIG. 15.

FIGS. 16A–16C are schemata showing indication forms on the indicating portion 30 at step S64. FIG. 16A is an example of the indication form of the diameter, FIG. 16B is an example of the indication form of the material, and FIG. 16C is an example of the indication of the version of software, and the indication is carried out in order of FIG. 16A→FIG. 16B FIG.→16C→FIG. 16A in turn repeatedly for a fixed time (for example, for 1 second).

Here, the diameter is indicated on "mm" ("A" is attached to the value) and "inch" ("B" is attached to the value) and indicated by using the three-figure data indicator 31 as shown in FIG. 16A. In the example shown in FIG. 16A, "10A" is indicated. Here, in FIG. 16A, "large", "middle", and "small" indicated on the left of each diameter show the classification of the diameter.

And, as for the material, L-PPS, PPS (polyphenylene sulfide), PVC (polyvinyl chloride), PFA, and SUS (stainless steel) would be possible, which are indicated on the above data indicator 31 in a form shown in FIG. 16B. In the illustrated example, the material is PVC.

Further, FIG. 16C shows an indication example of a version of the control program, wherein the version of V3.8 is shown.

In this way, in the instantaneous flowmeter of the present invention, since the version of the corresponding control program is indicated at the start of the operation on the indicator 31 for indicating the measurement data, the maintenance becomes very easy.

After having executed the indication (step S64) of the diameter, material, and version of the program, the process goes to step S65, wherein the clock processing of the above 0.2 second timer and the above 1 msec clock are started, and the count processing of the above main/secondary counter is started. And, the register to store a value j showing a position of the 0.2 second interruption within the 1 second is set to 0. The contents of the register j shows that a position of the second signal having a 0.2 second period within the above first signal having a 1 second period. The value j is counted as 1 at the same timing as the first signal (1 second timer) and then counted as 2, 3, and 4. And, when j=5, the value j is converted to 0 and is again counted from 1.

Here, as stated above, in this embodiment though the output of the above first period timer is generated from the output of this second period timer (0.2 second timer), the first period timer (1 second timer) and the second period timer (0.2 second timer) may be separately provided thereby to generate the respective first and second signals.

Next, the process goes to S66 step, and whether or not the mode is of the test mode is judged. This judgment is carried out by receiving a signal from the input port to which the above test mode set pin 18 is connected and by judging whether or not the above test mode set pin 18 is short-circuited. When the above test mode set pin 18 is short-circuited and the test mode is set, the process goes to step S67, and whether or not the test completion flag is set is judged. And, when the test completion flag is not set, the test process of a later-described step S68 is executed, and next the flow rate calculation processing of step S69 is executed.

Meanwhile, when the test mode is not set or when the judgment result of the above step S67 is YES, the flow rate calculation processing of step S69 is just reached. Following the above, the indication processing of step S70, the outward output processing of step S71, the switch output processing of step S72 and the key input processing of step S73 are executed in turn. And, the process returns to the above step S66 after the key input processing of the above step S73 has been executed, and the processings of the above steps S66–S73 are executed repeatedly. Here, the details of each processing of steps S69–S73 will be describe later.

The above is the summary of the instantaneous flowmeter processing program.

Figure 17:
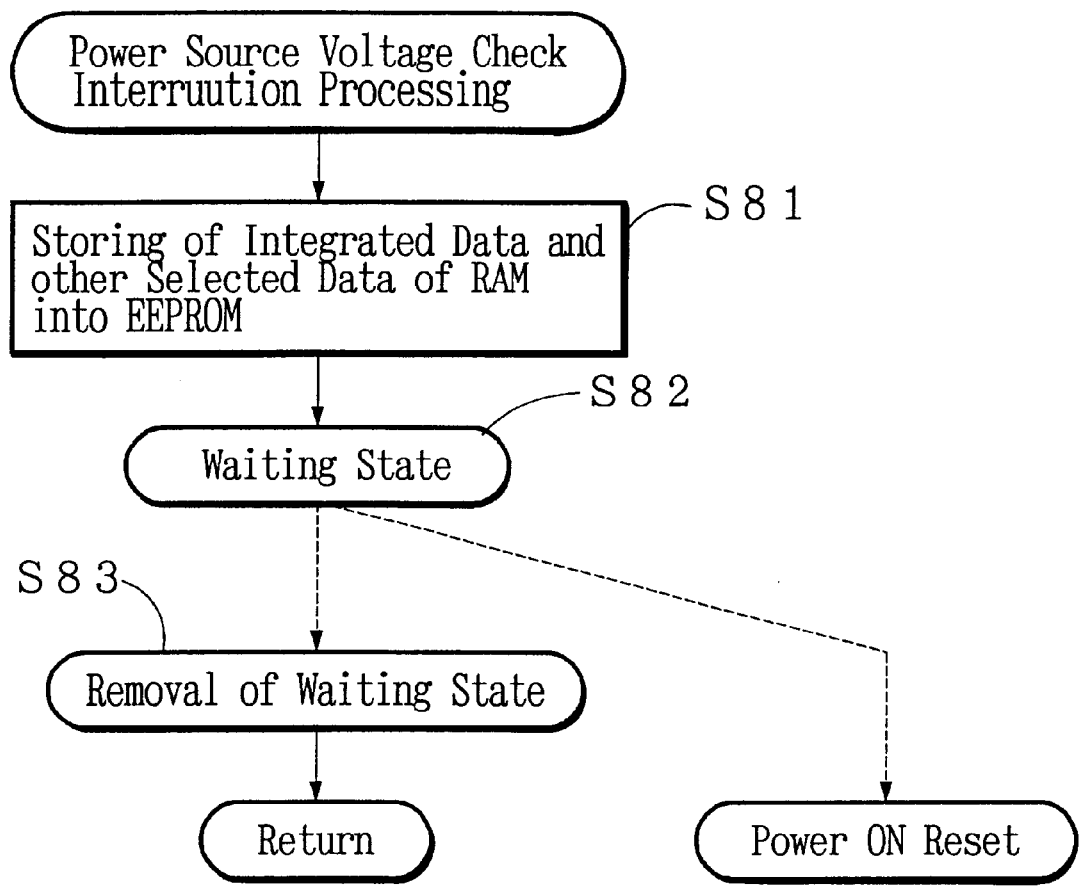
FIG. 17 is a flowchart of a power source voltage check interruption processing of the flowmeter of the present invention.

FIG. 17 is a flowchart showing the operation of the above power source voltage check interruption processing. The above voltage detector 16 judges whether or not the power source voltage Vcc is not less than the fixed voltage, and the power source voltage check interruption is executed against the above microcomputer 20 when the power source voltage Vcc has been detected to be lower than the first fixed voltage. By this, this power source voltage check interruption processing starts. On starting the power source voltage check interruption processing, in the EEPROM 17 stored at step S81 are selected fixed data such as the integrated data in the above RAM 85, the above diameter and material data, the data to designate the above integration indication method, the above ceiling flow rate value setting data, the above bottom flow rate value setting data, and the above switch output period determining data. By this, an disappearance of these data can be prevented.

After having stored the necessary data in the EEPROM 17 at the above step S81, the above microcomputer 20 comes to a waiting state (step S82). And, when the power source voltage Vcc has returned to a voltage higher than the above first fixed voltage without reaching the second fixed voltage lower than the above first fixed voltage, the above waiting state is removed (step S83), and the process goes to the main routine again. In this case, because the power source voltage Vcc has not dropped equal to or lower than the above second fixed voltage, it is considered that the data in the above RAM 85 are not lost.

Meanwhile, when the power source voltage Vcc has dropped equal to or lower than the above second fixed voltage, because the data in the above RAM 85 are considered to be lost. Therefore, when the power source voltage Vcc has returned, the above power ON reset circuit 14 works, the processing is started again from the above first start position (the main routine of FIG. 14).

Next, the adjustment test process of the above step S68 (FIG. 15) will be described referring to FIGS. 18, 19.

This adjustment test process is executed in a state that the adjustment test unit as the above external apparatus EXCT is connected to the flowmeter. Here, as shown in FIGS. 11, 12, though the signal outputting portion 40/power source portion 45 are connected to the adjustment test unit EXCT which is the external apparatus in this case, an offset adjustment and a span adjustment of a signal corresponding to the instantaneous flow rate of the 4–20 mA transmission signal or of the PWM signal in this adjustment test process are omitted in FIG. 18.

Figure 18:
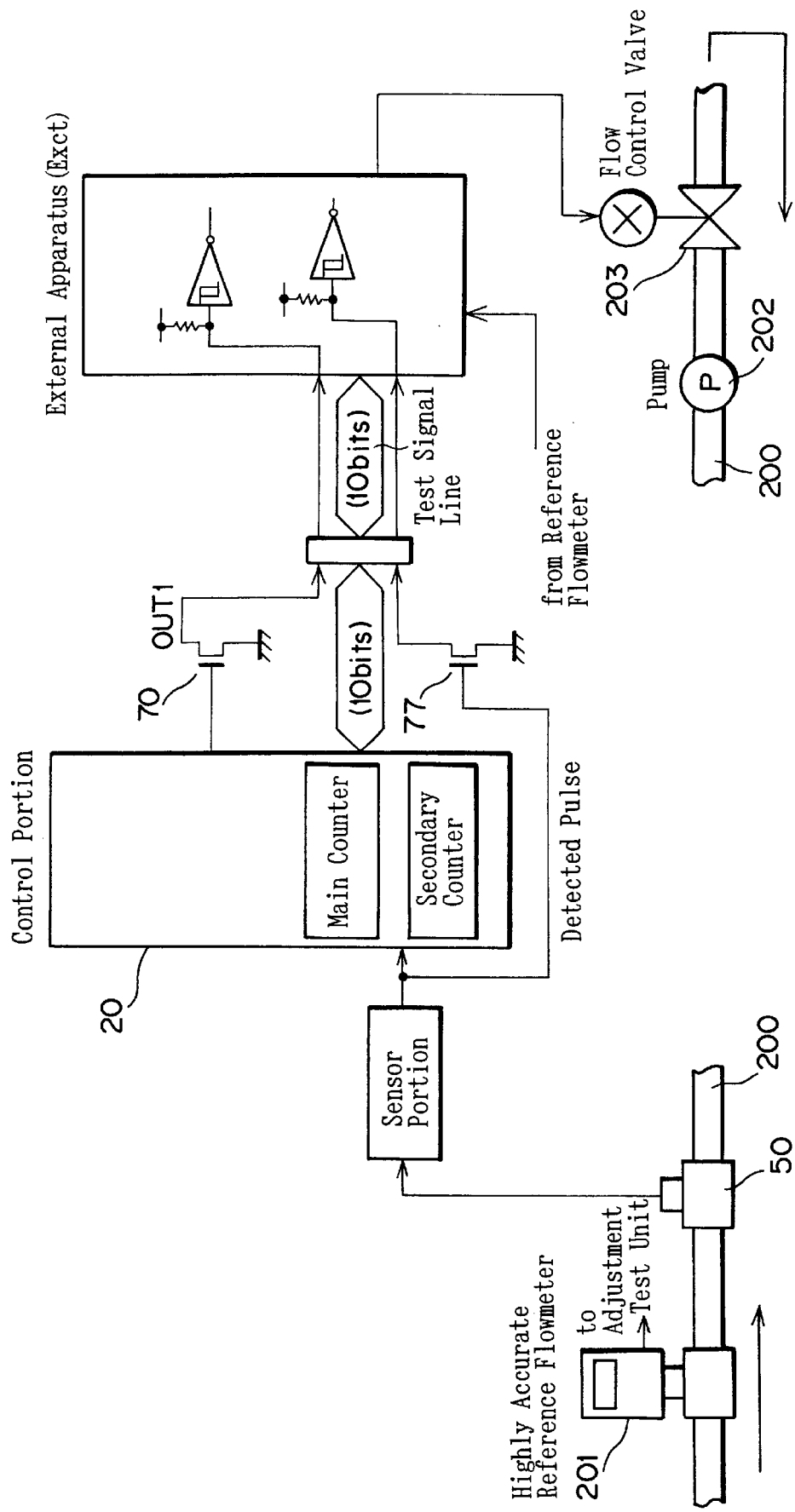
FIG. 18 is a diagram showing a connection state at an adjustment test process of the flowmeter of the present invention.
Figure 19:
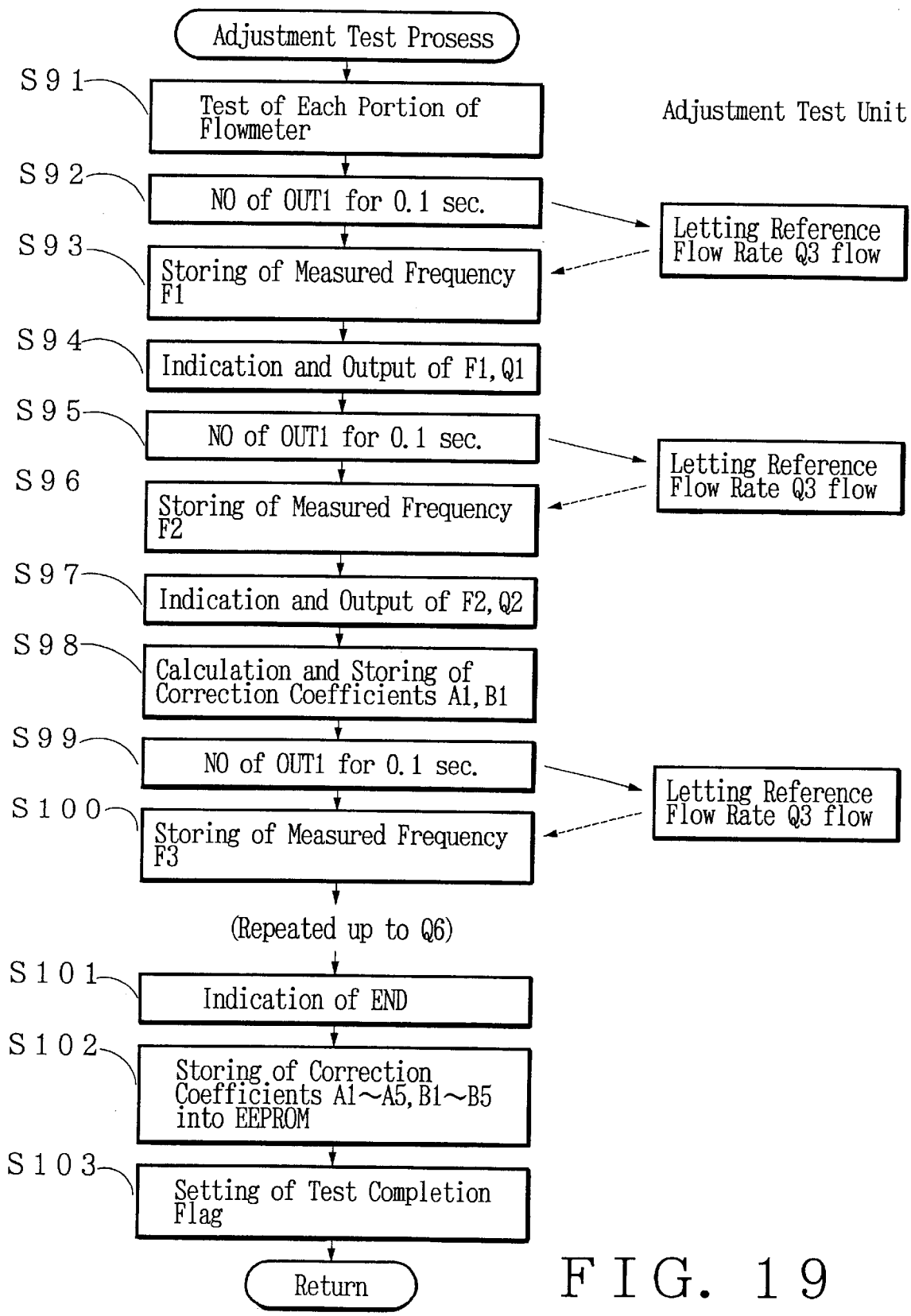
FIG. 19 is a flowchart of an adjustment test process of the flowmeter of the present invention.

As shown in FIG. 18, provided on the pipe 200 are a highly accurate reference flowmeter 201, the metering section body 50 of the instantaneous flowmeter of the present invention, a pump 202, and a flow control valve 203. And, as described above, the output OUT1 of the transistor 70 at the above signal outputting portion 40, the measured data output of 10-bit, and the output of the above sensor portion 11 through the above output transistor 77 are inputted in the above adjustment test unit through connectors. And, the output of the above highly accurate reference flowmeter 201 is inputted in the above adjustment test unit. And, a control signal for the above flow control valve 203 is outputted from the above adjustment test unit so as to control to flow the fixed flow rate in-the above pipe 200 according to the predetermined test step shown in FIG. 19.

Here, as shown in FIG. 11, a power source line, an input signal line, and an output signal line actually connected are omitted from FIG. 18.

The above adjustment test process S68 is executed with the above structure. As shown in a flowchart of FIG. 19, first in step S91 the test of each portion of the flowmeter is executed in the predetermined procedure. Next, the process goes to step S92, wherein the above output OUT1 comes to an ON state for only the fixed time (for example, for 0.1 second) and then comes to an OFF state, whereby it is informed to the above adjustment test unit that the first step of the adjustment test process has started. By this, the above adjustment test unit controls the flow in the pipe by means of the above flow control valve 203, while measuring the reference flow rates Q1–Q6 corresponding to the respective frequencies f1–f6 stored in the above ROM 84 correspondingly to the selected object (type). Here, first the above flow control valve 203 is controlled so that the first reference flow rate Q1 flows in the above pipe 200. At this time, the flowmeter calculates the frequency by using the above-described method based on the input signal from the above sensor portion 11 and stores it (step S93). The frequency at this time is designated as F1. And, the flow rate Q1 and the frequency F1 are indicated on the above indicator 31, the frequency value F1 is outputted to the above adjustment test unit through the above signal outputting portion 40 (step S94).

Next, the process goes to step S95, and makes the above output OUT1 be ON, and informs of the proceeding of the step to the above adjustment test unit. By this, the above adjustment test unit controls the second reference flow rate Q2 to be flown in the above pipe 200. And, the above control portion 20 calculates the frequency F2 based on the input from the sensor portion 11 and stores it (step S96), indicates the measured frequency value F2 and the reference flow rate Q2, and outputs the frequency F2 to the above adjustment test unit (step S97). And, the process goes to step S98, the linear expression corrected gradient data A1 and the corrected intercept data B1 are calculated based on the measured frequency F1 of the above step S93 and the measured frequency F2 of the above step S96. These correction coefficients A1 and B1 are given from the following expressions (6) and (7).

$$A1=(Q2-Q1)/(F2-F1) \qquad (6)$$

$$B1=(Q1 \times F2 - Q2 \times F1)/(F2-F1) \qquad (7)$$

And, the calculated correction coefficients A1 and B1 are stored in the fixed area of the above RAM 85. And, the process goes to step S99, makes the above output OUT1 be ON for only the fixed time-period, and informs of the end of this processing to the above adjustment test unit.

Similarly to the above, correction coefficients A2–A5 and B2–B5 are calculated by using the frequency values F3–F6 measured by letting the reference flow rates Q3–Q6 flow in turn and stored in the RAM 85. And, the completion of the test process is indicated on the indicator 31 in step S101, the coefficients A1–A5 and B1–B5 stored in the above RAM 85 in step S102 are stored in the above EEPROM 17, and the above test completion flag is set in step S103 thereby to close this test process.

Here, in the steps such as S94, S97, the frequency data F1–F6 outputted to the adjustment test unit are saved as the test record in the above adjustment test unit. And, also in the steps such as S94, S97, the measured frequency value Fi and the reference flow rate Qi are indicated on the indicator 31 for the fixed time-period (for example, for 0.5 second) in turn, while flashing on and off.

Next, the above frequency measurement interruption processing and the 1 msec clock count interruption processing will be described referring to FIGS. 20, 21.

Figure 20:
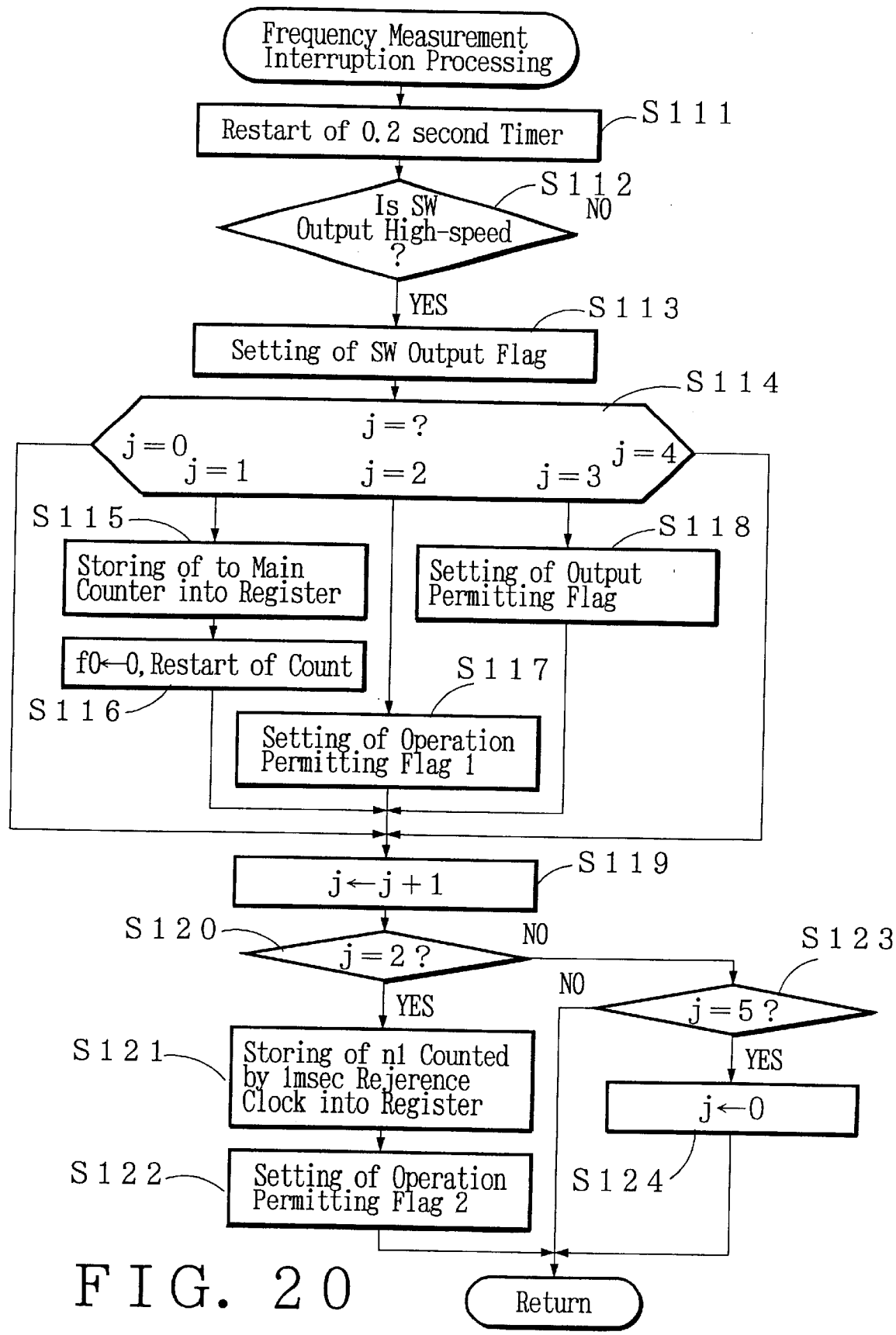
FIG. 20 is a flowchart of a frequency measurement interruption processing of the flowmeter of the present invention.

FIG. 20 is a flowchart of the above frequency measurement interruption processing. This frequency measurement interruption processing is stated by the output of the above second period timer (0.2 second timer) generated every 0.2 second. Upon starting this processing, first in step Sill the above 0.2 second timer is restarted. By this, an interruption at each 0.2 second can be secured each time. And, as described above, since the above first period timer is generated based on the output of this 0.2 second timer in this embodiment, an accuracy of the output of the first period timer (1 second timer) is also secured.

Next, the process goes to step S112, and whether or not the switch output is set for "high-speed" is judged, while referring the above switch output period determining data. As stated above, there would be a case that "high-speed" (for example, within 1 second) switch output is required when the measured flow rate value has exceeded the preset bottom flow rate value or the preset ceiling flow rate value. For coping with this, in the present invention, it can be selected whether or not the switch output shall be "high-speed" based on the above switch output period determining data. The setting of this switch output period determining data can be carried out by using the key switches 41–43 of the above manual operating portion 13 in a later-described key input processing routine (step S73).

When judged as the high-speed output as the judgment result at step S112, the switch output flag is set in step S113, and step S114 is reached. On the other hand, the process goes to step S114 when not judged as the high-speed output. In step S114, the contents, i.e. any one of 0–4, of the above register j is checked. And, at j=0 or j=4, step S119 is just reached. And, at the time of j=1, the count contents f0 of the main counter 81 is stored in the register in step S115, the count contents of the main counter 81 is reset in 0 in step S116, the count of the input pulse signal by the main counter 81 is restarted, and step S119 is reached.

Figure 22:
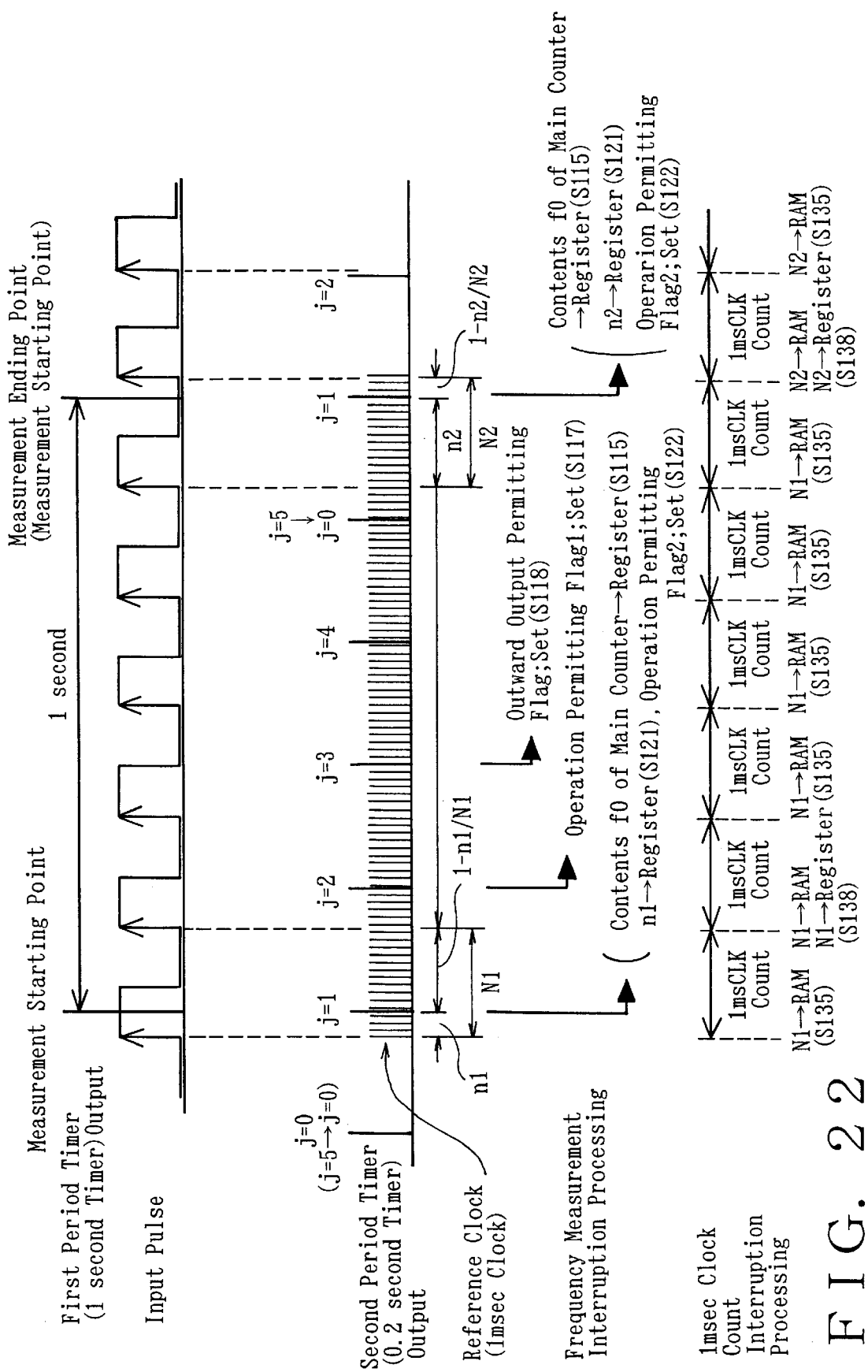
FIG. 22 is a timing chart showing the frequency measurement interruption processing and the 1 msec clock count processing.

By this, as shown in FIG. 22, at the time of j=1, the count value f0 of the main counter is stored in the register at the measurement starting (ending) point of the above first period timer. Accordingly, the number f0 of the input signal pulse inputted during 1 second, namely the integer portion of the frequency of the input signal pulse, is stored in the register.

And, at the time of j=2, the operation permitting flag 1 is set at step S117, and step S119 is reached. Further, at the time of j=3, the outward output permitting flag is set at step S118, and step S119 is reached.

As described above, at the time of J=0 or 4 in step S114 or after steps S116, S117, or S118 is executed, step S119 is executed, and the contents of the above register j is increased. And, in step S120 it is judged whether or not the contents of the above register j is 2. At the time of j=2, step S121 is reached. As described later, the above secondary counter 82 counts the above 1 msec reference clock from the rising to the dropping of the input pulse from the above sensor portion 11, the count value n1 of the above secondary counter 82 at this point is stored in the register in this step S121. And, the operation permitting flag 2 is set (step S122), and the frequency measurement interruption processing of this time is closed.

That is, as shown in FIG. 22, by the above step S121, the time n1, from the rising edge of the input pulse signal just before the above measurement starting point or the measurement ending point to the measurement starting point of this time, counted by means of the 1 msec reference clock is obtained in the register.

Meanwhile, the process goes to S123 when the judgment result of the above step S120 is NO, whether or not j=5 is judged. And, at the time of j=5 the contents of the register j is set in 0, and at the time of j≠5, this frequency measurement interruption processing is just closed.

Figure 21:
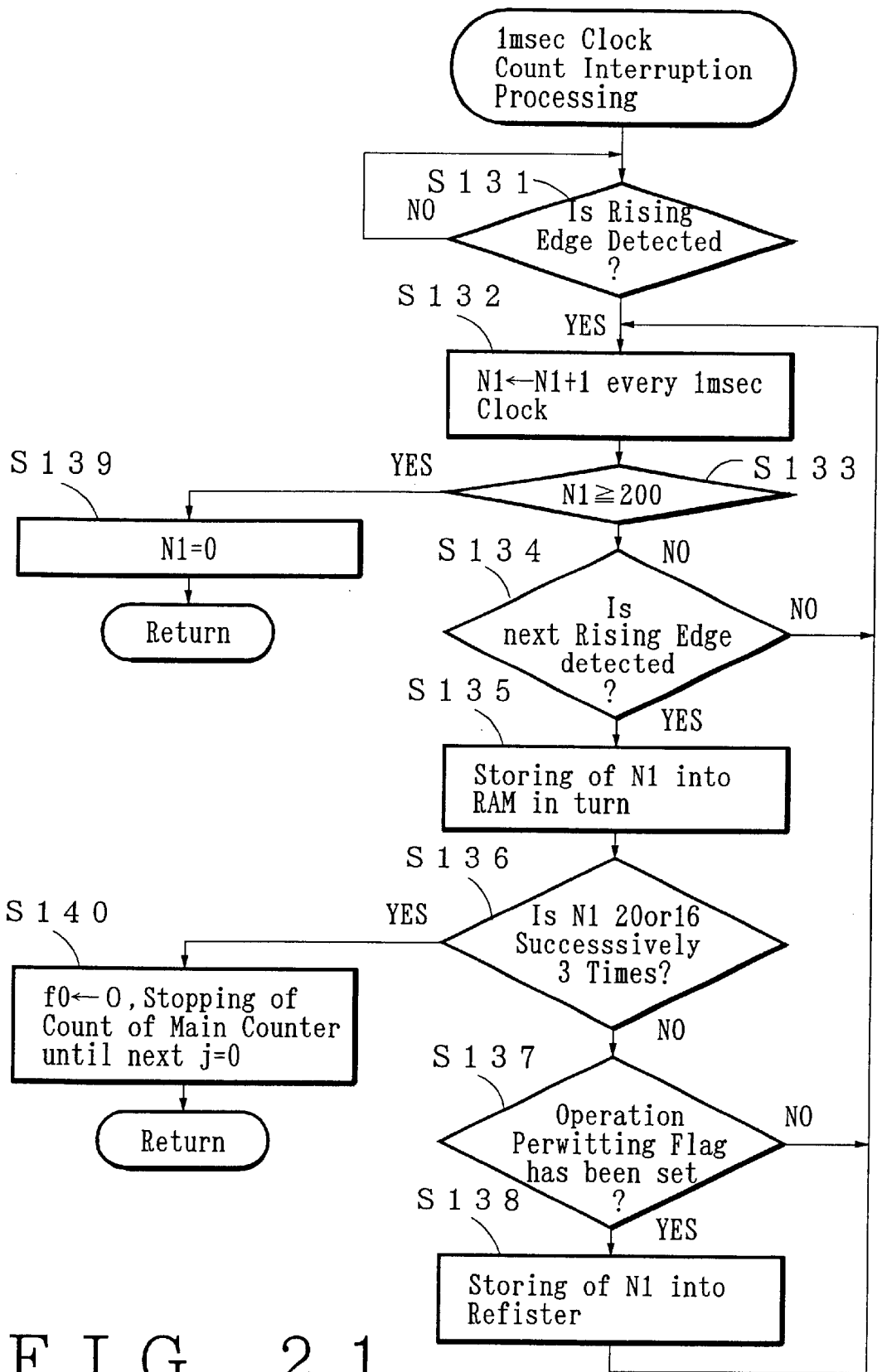
FIG. 21 is a flowchart of a 1 msec clock count processing of the flowmeter of the present invention.

FIG. 21 is a flowchart showing the above 1 msec clock count interruption processing.

When the rising edge of the above input pulse signal has been detected, this 1 msec clock count interruption processing is started (step S131), and the count of the 1 msec clock is started (step S132). Here, this count processing is actually executed in the above secondary counter 82. And, it is judged whether or not the count value N1 is not less than 200 (namely, not less than 1 msec×200=0.2 sec) (step S133), the above second counter is reset when not less than 200, and the detection of the rising edge of the next input pulse signal is waited (step S139). As described above, since the measurement bottom frequency is 5 Hz in this example, the measurement bottom frequency is not more than 5 Hz when the period of the input pulse is not less than 0.2 sec, the next input pulse is waited. That is, if the flow occurrence frequency is 5 Hz, no pulse is inputted because there is no measurable flow; that is, the input pulse measurement is not necessary.

Meanwhile, the process goes to S134 when the judgment result of the above step S133 is NO, the count is repeated till the next rising edge is detected (NO of step S134). And, the count value N1 of the secondary counter 82 is stored in the fixed area of the above RAM 85 when the next rising edge has been detected (step S135). That is, as shown in FIG. 22, the period of the above input pulse is measured by the 1 msec clock in turn, and the calculated value is stored in the RAM 85 in turn. Here, the count value of this time is stored in an area of the RAM 85 other than the previous area for the last count value. That is, at least, for example, three areas for storing the count values are prepared as the area for storing the count value N1 of the secondary counter 82 of the RAM 85, and just previous three count values N1 are stored therein in turn.

Next, the process goes to S136 step, it is judged whether or not the count value N1 stored in the above RAM 85 is 20 or 16 successively three times in order to prevent an false measurement caused by a noise due to the induction voltage of the alternating current power supply (50 Hz or 60 Hz). The process goes to S140 when the judgment result of this step S136 is YES, resets the count value f0 of the above main counter in 0, and stops the count operation of the above main counter 81 until the next count start time-point, namely until j=0.

Here, the same frequencies could not be detected in succession normally because the flow rate value generally fluctuates slightly, an induction noise of the commercial alternating current power supply can be eliminated by means of such a technique.

On the other hand, the process goes to step S137 when the judgment result of the above step S136 is NO, whether or not the above operation permitting flag 2 is set is judged. When the judgment result is NO, the process returns to the above step S132, the above measurement of the period of the input pulse signal is continued. Meanwhile, since the operation permitting flag 2 is set, the count value N1 of this time is read out of the above RAM 85 and stored in the above register. And, the processings after the above step S132 are repeated. That is, like the above, the above operation permitting flag 2 has been set at the timing corresponding to j=1 (step S122 in the above frequency measurement interruption processing), and then the above count value N1 is stored in the register at the rising point of the first input pulse after the measurement starting point as shown in FIG. 22. By this, the period N1, over the time of j=1, of the input pulse signal can be obtained in the register by means of the 1 msec clock count interruption processing.

In this way, the count contents f0 of the main counter 81 and the count contents N1 and N1 of the secondary counter 82 are written in the register by means of the above frequency measurement interruption processing and the 1 msec clock count interruption processing. After the above flow rate calculation processing of step S69 (FIG. 15), the flow rate value is calculated using these count values, these are indicated and outputted outside, and the processing of carrying out the switch output toward the outside is performed.

These processings will be described in detail hereinafter.

Figure 23:
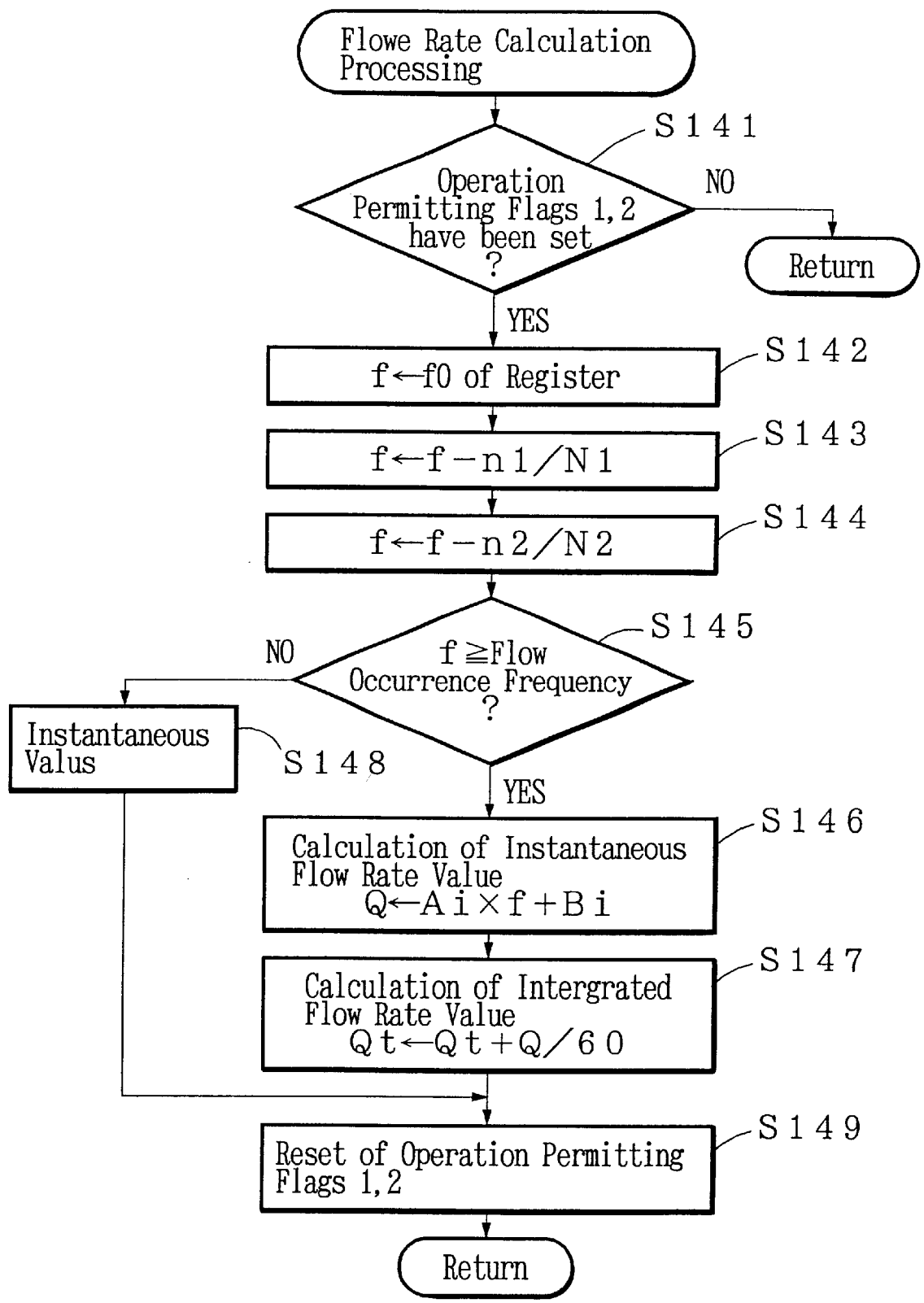
FIG. 23 is a flowchart of a flow rate calculation processing of the flowmeter of the present invention.

FIG. 23 is a flowchart showing the flow rate calculation processing of the above step S69. Upon starting this processing, first it is judged whether or not the above operation permitting flags 1,2 both have been set (step S141). Here, when the above operation permitting flags 1,2 are not set, since the count value f0 of the main counter and the count values N1,n1 of the above secondary counter have not been prepared in the above register, it is not the timing to execute the calculation of the instantaneous flow rate value and the integrated flow rate value; therefore this flow rate calculation processing is closed.

Meanwhile, when both the above operation permitting flags 1,2 are set (that is, at the time of j=2 and over as shown in FIG. 22), the process goes to step S142, and the number f0 of the input pulse signal counted by the above main counter 81 for 1 second is stored in the register f. Next, the process goes to step S143, and a subtraction of the decimal portion at the measurement starting point is carried out. That is, as stated above, an operation of the front portion "f−n1/N1" of the above expression (4) is carried out by using values of N1 and n1 having been counted by the above secondary counter 82 and having been stored in the register and the result is stored in the above register f. Following the above, the process goes to step S144, and the addition of the decimal portion at the above measurement ending point is carried out. That is, an operation of the rear portion "f+n2/N2" of the above expression (4) is carried out by using values of N2 and n2 having been counted by the above secondary counter 82 and having been stored in the register and the result is stored in the above register f. That is, by the above steps S142, S143 and S144 the operation of the expression (4) is executed, the frequency f of the input pulse signal in 1 second is calculated highly accurately.

Next, the process goes to step S145 and judges whether or not the calculated frequency f is not less than the above flow occurrence frequency F1. When the result is NO, that is, not more than the measurement bottom frequency, the process goes to step S148 and stores 0 in the register Q storing the instantaneous value. Meanwhile, the process goes to S146 when the above frequency f is not less than the flow occurrence frequency F1, the instantaneous flow rate value Q (=Ai×f+Bi) is calculated based on the above expression (3). Here, the correction coefficients Ai and Bi are the ones having been read out from the above EEPROM 17 in the above step S63 (FIG. 15), and the above instantaneous flow rate value Q is in "L/min".

Following the above, the process goes to step S147, and the integrated flow rate value Qt is updated by adding Q/60 thereto by using the instantaneous flow rate value Q calculated at the above step S146. Here, Q is divided by 60 to be converted to "L/sec".

After the processing of the above step S148 or the above step S147 ended, the above operation permitting flags 1,2 are reset (step S149), and this flow rate calculation processing is closed.

Figure 24:
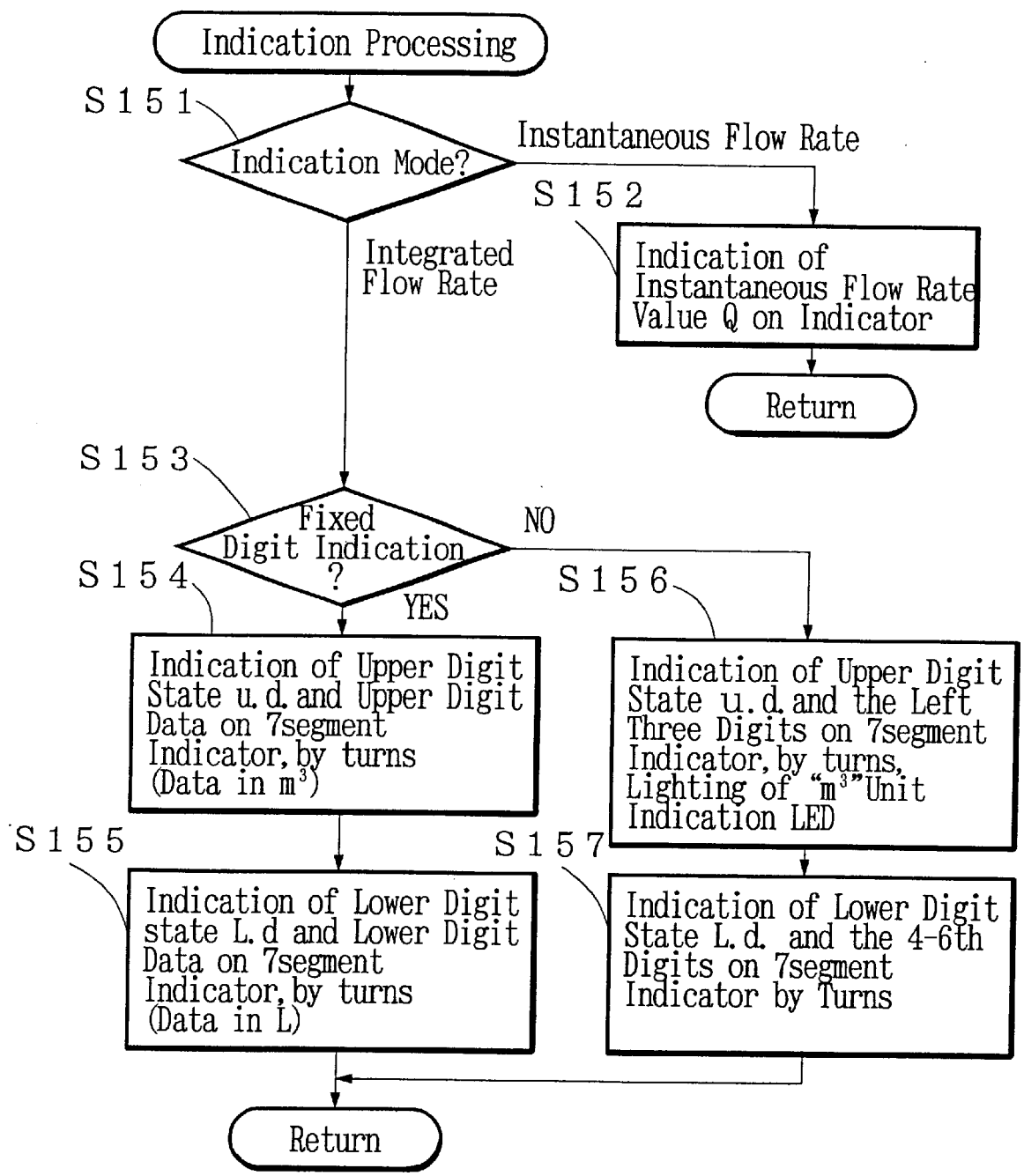
FIG. 24 is a flowchart of an indication processing of the flowmeter of the present invention.

FIG. 24 is a flowchart of the indication processing of the above step S70 (FIG. 15). Upon starting this indication processing, first in step S151 the indication mode having been set is judged. Here, when the indication is set in the instantaneous flow rate, the process goes to step S152, and the instantaneous flow rate value Q calculated in the above flow rate calculation processing is indicated on the above indicator 31. The set of this indication mode is done in a later-described key input processing.

And, when the mode is of the integrated flow rate indication, the process goes to step S153, and whether or not the fixed digit indication has been set is judged. Here, when the fixed digit indication (the indication of the fixed-point system) has been set, the process goes to step S154, and a mark "u.d." showing indication of the upper digits (or figures) and the upper digit data of the integrated flow rate value in "$m^3$" are indicated on the above indicator 31 for the fixed time-period (for example, every 0.5 second in 5 seconds) by turns. Following the above, the process goes to step S155, and a mark "L.d." showing indication of the lower digits (or figures) and the lower digit data of the integrated flow rate value in "L" are indicated on the above indicator 31 for the fixed time-period by turns similarly to the above step S154.

Meanwhile, when the floating-point system indication has been set, the judgment result of the above step S153 comes to NO, and step S156 is reached. In this step S156, the above "u.d." and the left three digits (figures) of the integrated flow rate value are indicated on the above indicator 31 for the fixed time-period by turns. And, if the above unit indicating portion 32 is provided, a "$m^3$" unit indication LED 35 is lighted in addition to the above indication. And, the process goes to step S157, and the above "L.d." and the data of the 4th–6th digits of the integrated flow rate value are indicated on the above indicator 31 for the fixed time-period by turns. And, if the above unit indicating portion 32 is provided, a unit indication LED 35 or 36 is lighted in addition to the above indication. That is, when the unit of the data of the 4th–6th is of "cubic meter" or "litter", the "$m^3$" unit indication LED 35 or the "L" unit indication LED 36, respectively, is lighted.

Figure 25:
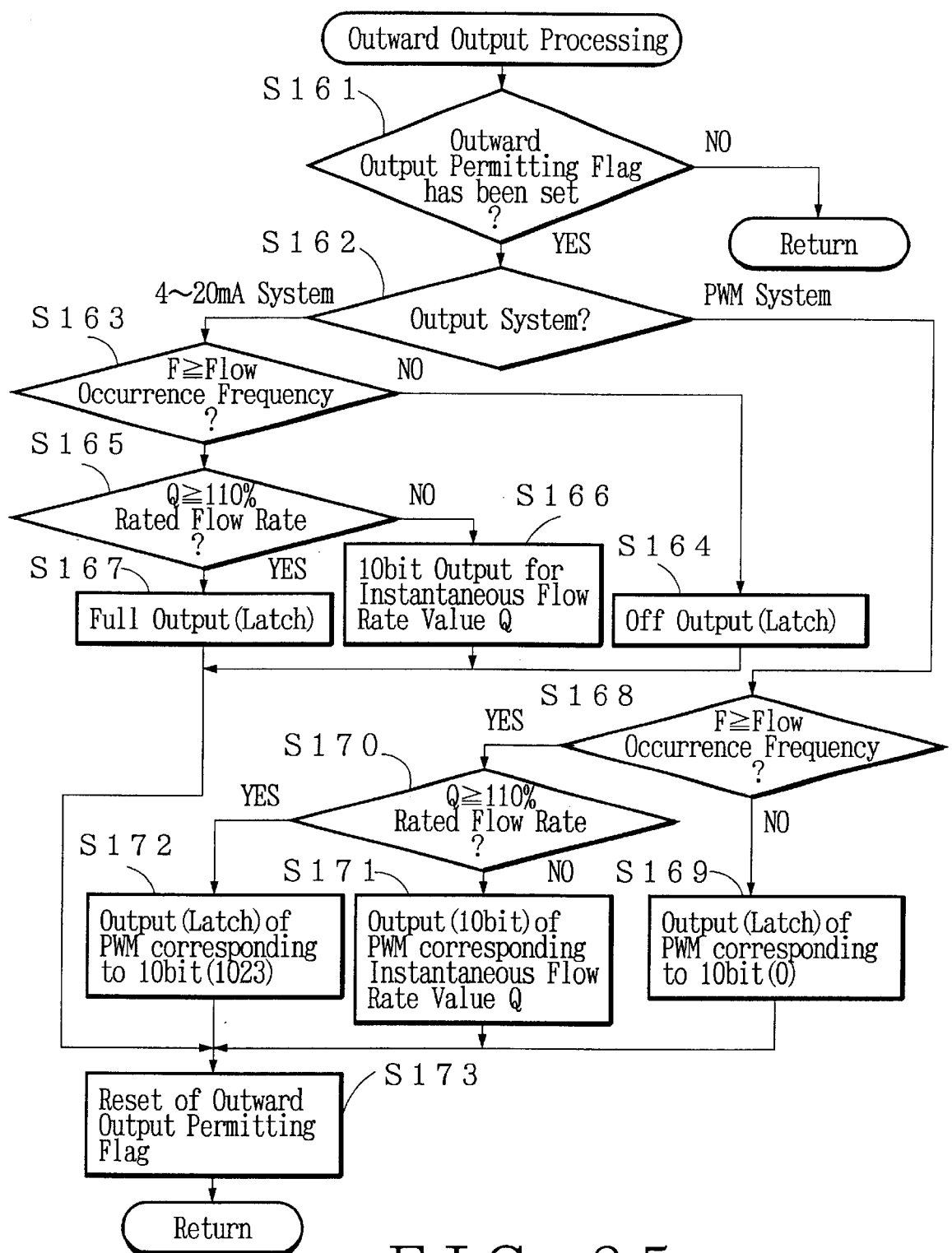
FIG. 25 is a flowchart of an outward output processing of the flowmeter of the present invention.

FIG. 25 is a flowchart of the above outward output processing S71 (FIG. 15). When this outward output processing is started, first in step S161 whether or not the above outward output permitting flag is set is judged. This outward output permitting flag is to be set at the timing of j=3 (FIG. 22) at step S118 in the above frequency measurement interruption processing (FIG. 20). When this outward output permitting flag has not been set, this outward output processing is closed because it is not a timing of outputting outward.

In this way, in the present invention, because there is a fixed timing for the outward output, the accuracy of the data to the external apparatus is improved, thereby securing highly accurate monitoring.

Meanwhile, when the outward output permitting flag has been set, the signal system, having been set, of the outward output is judged in step S162. As stated above, the output system has been set by the jumper pin J2 of the above function selecting portion 12 (FIG. 11).

Here, when the 4–20 mA transmission system has been selected as the signal system, in step S163 whether or not the frequency f calculated at the above step S144 (FIG. 23) is not less than the above flow occurrence frequency F1 is judged. When not less than the flow occurrence frequency F1, the process goes to step S164 and outputs all "0" to the 10-bit output latch. And, when the frequency f is not less than the flow occurrence frequency F1, the process goes to step S165, and whether or not the instantaneous flow rate value Q calculated at the above step S144 (FIG. 23) is not less than the 110% rated flow rate value is judged. When this judgment result is YES, the process goes to step S167 and outputs all "1" to the 10-bit output latch. Meanwhile, if the judgment result of the Step S165 is NO, the process goes to step S166 and outputs a 10-bit output corresponding to the above calculated instantaneous flow rate value Q to the above 10-bit latch. By this, this 10-bit latch output is converted into an analog signal at the 10-bit D/A conversion portion 73 of the above signal outputting portion 40 (FIG. 12) and then converted into a corresponding current signal in the V/I conversion portion 74, and the 4–20 mA transmission signal for the above external apparatus EXCT from the 4–20 mA transmission signal outputting portion 75 is outputted.

Meanwhile, when the PWM signal system has been selected as the output system with the jumper pin J2 at the above function selecting portion 12 being open, step S168 is reached. And, similarly to the above case, whether or not the measured frequency f is not less than the flow occurrence frequency F1 is judged. When the result is NO, a 10-bit pulse signal having a duty corresponding to "0" is outputted to the gate of the above output transistor 76 (step S169) from the PWM output function portion built in the microcomputer 20. And, when the measured frequency f is not less than the flow occurrence frequency F1, the process goes to step S170 and judges whether or not the above calculated instantaneous flow rate value Q is not less than the 110% rated flow rate value. And, when the judgment result is NO, the process goes to step S171, and a pulse signal having a duty corresponding to the above calculated instantaneous flow rate value Q (10-bit data) is outputted to the gate of the above output transistor 76. And, when the above instantaneous flow rate value Q is not less than the 110% rated flow rate value, the process goes to step S172, and a 10-bit pulse signal having a duty corresponding to all "1" is outputted to the gate of the above output transistor 76. By this, the PWM signal, having a resolvability of 10-bit, corresponding to the measured instantaneous flow rate can be outputted to the external apparatus EXCT through the above output transistor 76.

After the signal based on the signal system having set at the above steps S167 and S166 or S164, or otherwise at the above step S172 and S171 or S169 has been outputted to the external apparatus EXCT, the above outward output permitting flag is reset in step S173, and this outward output processing is closed.

In this way, in the present invention, since the measurement result having a resolvability of 10-bit is used, error propagation can be prevented, thereby obtaining a highly accurate measurement result.

Figure 26:
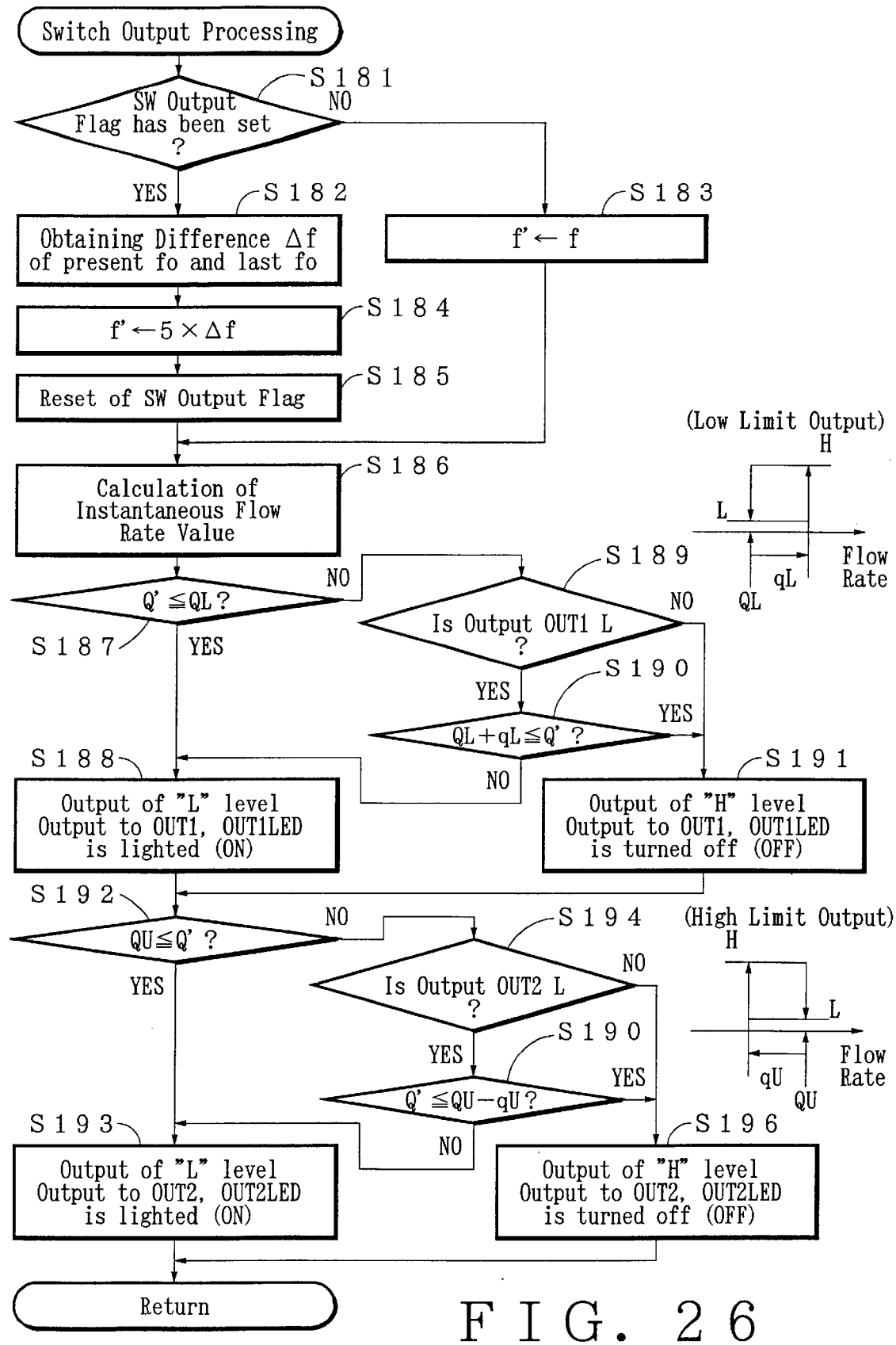
FIG. 26 is a flowchart of a switch output processing of the flowmeter of the present invention.

FIG. 26 is a flowchart showing the operation of the above switch output processing S72 (FIG. 15). Upon starting this switch output processing, first in step S181 it is judged whether or not the above switch output flag has been set. The switch output flag is to be set in step S113 in the above frequency measurement interruption processing (FIG. 20). When the high-speed switch output mode has been set, this flag is set every 0.2 second at the above step S113 (FIG. 20). Here, at the time of the normal switch output mode wherein the switch output flag has not been set, the process goes to step S185, and the above measured frequency f is written in the register f'. Meanwhile, at the time of the high speed output mode wherein the above switch output flag has been set, the process goes to step S182, wherein the count value f0 of the above main counter 81 is read-in, the difference Δf against the count value f0 of the main counter which was read in at the last switch output processing is obtained, and 5×Δf is written in the register f' (step S183). And, in step S184 the above switch output flag is reset. Here, the switch output flag is written as SW output flag in the flowchart.

That is, the value having been obtained by multiplying the difference Δf with 5 times is used as the frequency value f' for the switch output in the high-speed switch output mode wherein the switch output flag has been set, and the frequency value f (this value is calculated almost every 1 second) calculated at the above step S144 (FIG. 23) is used as the frequency value f' for the switch output in the normal switch output mode.

Like this, after having decided the frequency value f' for the switch output, the process goes to step S186, and the instantaneous flow rate value Q' (=Ai×f'+Bi) corresponding to the frequency value f' is calculated based on the expression (3).

Next, the process goes to step S187, and the instantaneous flow rate value Q' calculated at the above step S186 is compared with the bottom flow rate value QL having been set in advance. As a result, the process goes to step S188 at the time of Q'≦QL, outputs the high level to the gate of the above output transistor 70, and outputs "L" (Low) level signal from the first output OUT1. Simultaneously, the LED 33 for the above first output is lighted.

At the time of Q'>QL, the process goes to step S189 and judges whether or not the output OUT1 is of "L" level. When the result is YES, the process goes to step S190 and judges whether or not the instantaneous flow rate value Q' is not less than QL+qL. When the result is NO, the above step S188 is reached.

In this way, a hysteresis characteristic is given to the output OUT1 in steps S189 and S190. By this, as also shown in FIG. 26, the output OUT1 comes to "L" level when the instantaneous flow rate value Q' has become lower than the bottom flow rate value QL and comes to "H" (High) level when the instantaneous flow rate value Q' has become QL+qL or more.

Meanwhile, when the judgment result of the above step S189 is NO and the judgment result of the above step S190 is YES, the process goes to step S191, outputs Low level to the gate of the above output transistor 70, and outputs High level signal from the first output OUT1. And simultaneously, the above OUT1LED 33 is turned off.

After having executed the processing of the above step S188 or the above step S191 for the first output OUT1, the process goes to step S192 and compares the above instantaneous flow rate value Q' with the ceiling flow rate value QU. As a result, the process goes to step S193 at the time of QU≦Q', wherein the High level signal is outputted to the gate of the above output transistor 71 (FIG. 12), "L" level is outputted to the above second output OUT2, and the above second output LED 34 is lighted.

Meanwhile, the process goes to step S194 at the time of Q'<QU, and whether or not the second output OUT2 is of Low level is judged. As a result, the process goes to step S195 at the time of Low level, and whether or not the above instantaneous flow rate value Q' is not more than QU−qU is judged. Here, the above qU is a value to define the hysteresis characteristic of the above second switch output. This second switch output OUT2 turns over from High level to Low level when the instantaneous flow rate value Q' has become equal to the ceiling flow rate value QU or more and also turns over from Low level to High level when the instantaneous flow rate value Q' has become equal to QU−qU or less. Accordingly, when the judgment result of the above step S195 is NO, the process goes to the above step S193 because the output OUT2 shall not be still turned over from Low level to High level.

And, when the judgment result of the above step S194 is NO or the judgment result of or the above step S195 is YES, the process goes to step S196, wherein Low level signal is outputted to the gate of the above output transistor 71 (FIG. 12), "H" level is outputted to the above second output OUT2, and the above second output LED 34 is turned off.

In this way, in the switch output processing of the present invention, the count value f0 of the above main counter is checked every 0.2 second, the difference Δf with the last count value (i.e. 0.2 second before) is found, and the approximate flow rate is calculated on the basis of 5×Δf as the frequency in 1 second. And, using the approximate flow rate value calculated every 0.2 second the comparison with the ceiling and bottom flow rate values is carried out. Accordingly, since the signal can be sent out with quicker detection of an accident than the conventional case of executing the comparison every measurement periods (for example, 1 second), an overheating trouble in such a cooling water system described above can be prevented.

Here, though the approximate frequency value is calculated based on the difference Δf of the count value of the main counter 81 of every 0.2 second in the above, another method can be adopted. That is, an approximate frequency in 1 second is to be found by multiplying a different coefficient with the count value f0 of the main counter 81 every 0.2 second, which coefficient corresponds to a time-point in the first period every 0.2 second. Specifically, the frequency value in 1 second is of the count value f0×5 of the main counter at the time-point of 0.2 second, and similarly: f0×2.5 at the time-point of 0.4; f0×1.667 at the time-point of 0.6; and f0×1.25 at the time-point of 0.8. The approximate flow rates are calculated by using these values as the frequencies in 1 second and compared with the above ceiling and bottom flow rate values. According to this method, more highly accurate approximate flow rates can be obtained compared with the ones obtained by the previous method, though the control program becomes complicated since different coefficients are used.

Figure 27:
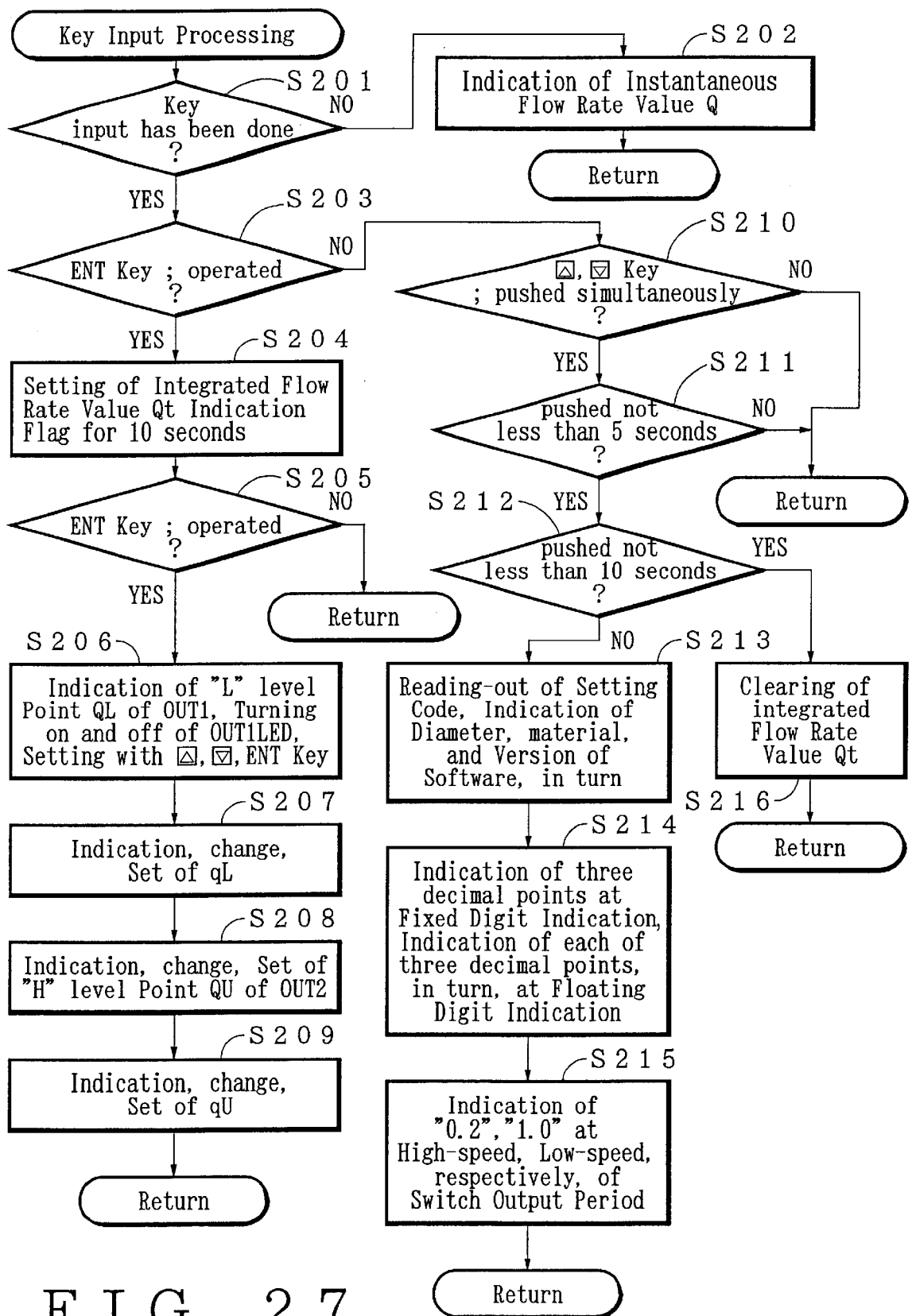
FIG. 27 is a flowchart of a key input processing of the flowmeter of the present invention.

FIG. 27 is a processing flowchart of the above key input processing S73 (FIG. 15). Upon starting this key input processing, first in step S201, whether or not any one of the up key (the Δ key) 42, the set key (the ENT key) 41, and the down key (the ▽ key) 43 of the above manual operating portion 13 is operated is judged. Here, if an key operation is not detected, the process goes to step S202, the above instantaneous flow rate value Q is indicated, and the key input processing is closed. When the key operation has been detected, the process goes to step S203 and judges whether or not the operated key is the ENT key 41. If the operated key is the ENT key 41, the process goes to step S204, and the integrated flow rate value Qt indication flag is set for a fixed time-period (here, 10 seconds). By this, in step S151 of the above indication processing (FIG. 24) the indication mode comes to the integrated flow rate mode, and the above integrated flow rate value Qt is indicated on the indicating portion 30. And, the process goes to step S205 and judges whether or not the above the ENT key 41 has been operated again. And, when the ENT key 41 has not been operated, the key input processing is just closed.

Like this, the integrated flow rate value Qt can be indicated on the above indicating portion 30 for the fixed time with one operation of the ENT key 41.

Meanwhile, when the judgment result of the above step S205 is YES with the ENT key 41 having been operated again, the process goes to step S206, wherein the Low level point (the bottom flow rate value QL) of the output OUT1 is indicated on the above indicator 31, and the above OUT1LED 33 is indicated on and off. In this state, an operator can change the value of the above QL by using the above Δ key 42 or ▽ key 43 and set it by the ENT key 41. After completing the setting of the QL with the operation of the ENT key 41, the process goes to step S207, the hysteresis value qL is indicated, and a changing and setting operation of this qL are carried out. In the same way, indication, change, and set of the ceiling flow rate value QU of step S208 and also the hysteresis value qU of step S209 are carried out by the operation of the ENT key 41, and when the ENT key 41 is operated in step S209, the key input processing is brought to an end.

Like this, by pushing the ENT key 41 two times the change and set of the bottom flow rate value QL, hysteresis value qL, ceiling flow rate value QU, and hysteresis value qU can be carried out.

Meanwhile, when the result at the above step S203 is NO, that is, when the operated key is the Δ key 42 or the ▽ key 43, the process goes to step S210, and whether or not the above Δ key 42 and ▽ key 43 were pushed simultaneously is judged. And, when this judgment result is YES, whether or not the Δ key 42 and ▽ key 43 were being pushed for the first fixed time (for example, for 5 seconds) simultaneously is further judged (step S211). When the judgment result of the above step S210 is NO or the judgment result of the above step S211 is NO, that is, when the Δ key 42 and ▽ key 43 were not being pushed for the first fixed time (5 seconds) simultaneously, this key input processing is closed.

Meanwhile, the Δ key 42 and ▽ key 43 have been pushed for the above first fixed time simultaneously, and accordingly when the judgment result of the above step S211 is YES, the process goes to step S212 and judges whether or not the above Δ key 42 and ▽ key 43 were being pushed for the second fixed time (for example, for 10 seconds) simultaneously. If YES, the process goes to step S216, the integrated flow rate value Qt stored in the above RAM 85 and EEPROM 17 is cleared, and this key input processing is closed.

By this, the integrated flow rate value Qt is cleared, and the integration from 0 can be again started.

And, when the judgment result of the above step S212 is NO, namely, when the Δ key 42 and ▽ key 43 were being pushed for, for example, not less than 5 seconds and less than 10 seconds simultaneously, the process goes to step S213, the above setting code is read out, and the corresponding diameter, material, and version information of the software are indicated for the fixed time-period in turn. This is similar to the indication at the above step S64 (FIG. 15).

Next, the process goes to step S214, and the preset indication mode is indicated on the above indicator 31. Here, when the indication mode is set in the fixed digit indication for example, three decimal points at the above indicator 31 all are lighted. And, when the indication mode is set in the floating-point system indication, three decimal points on the above indicator 31 each are lighted in turn. An operator can change the indication mode by operating the above Δ key 42 or ▽ key 43 at this time and can set the indication mode by operating the ENT key 41.

When an operator operates the ENT key 41, the process goes to step S215, and the switch output period having been set is indicated on the above indicator 31. Here, when the switch output period has been set in high-speed for example, "0.2" is indicated on the above indicator 31, and when the switch output period has been set in low-speed, "1.0" is indicated on the above indicator 31. An operator can change the set of this switch output period by operating the above Δ key 42 or ▽ key 43 and can set the switch output period by operating the ENT key 41. And, the key input processing ends when the ENT key 41 has been operated.

Like this, in this key input processing the above Δ key 42 and ∇ key 43 are mainly used for the setting change, and the ENT key 41 is used for the decision, whereby the set and change of each parameter can be easily carried out.

Here, in the embodiment stated above, though the measurement of the number and the period of the input pulse is carried out by using the rising time-point of the input pulse, the dropping time-point of the input pulse may be also used.

And, the above first period, second the period, and reference clock period may be changed suitably, not limited to the above-described ones. For example, a higher-speed reference clock can give a higher resolvability in the measurement.

Further, in the embodiment stated above, though the indicator 31 is of the LED having three figured, the LED having four figures, eight figures, or the like can be used. Further, another indication element such as LCD (liquid crystal display) can be used, not limited to the LED.

Figure 28:
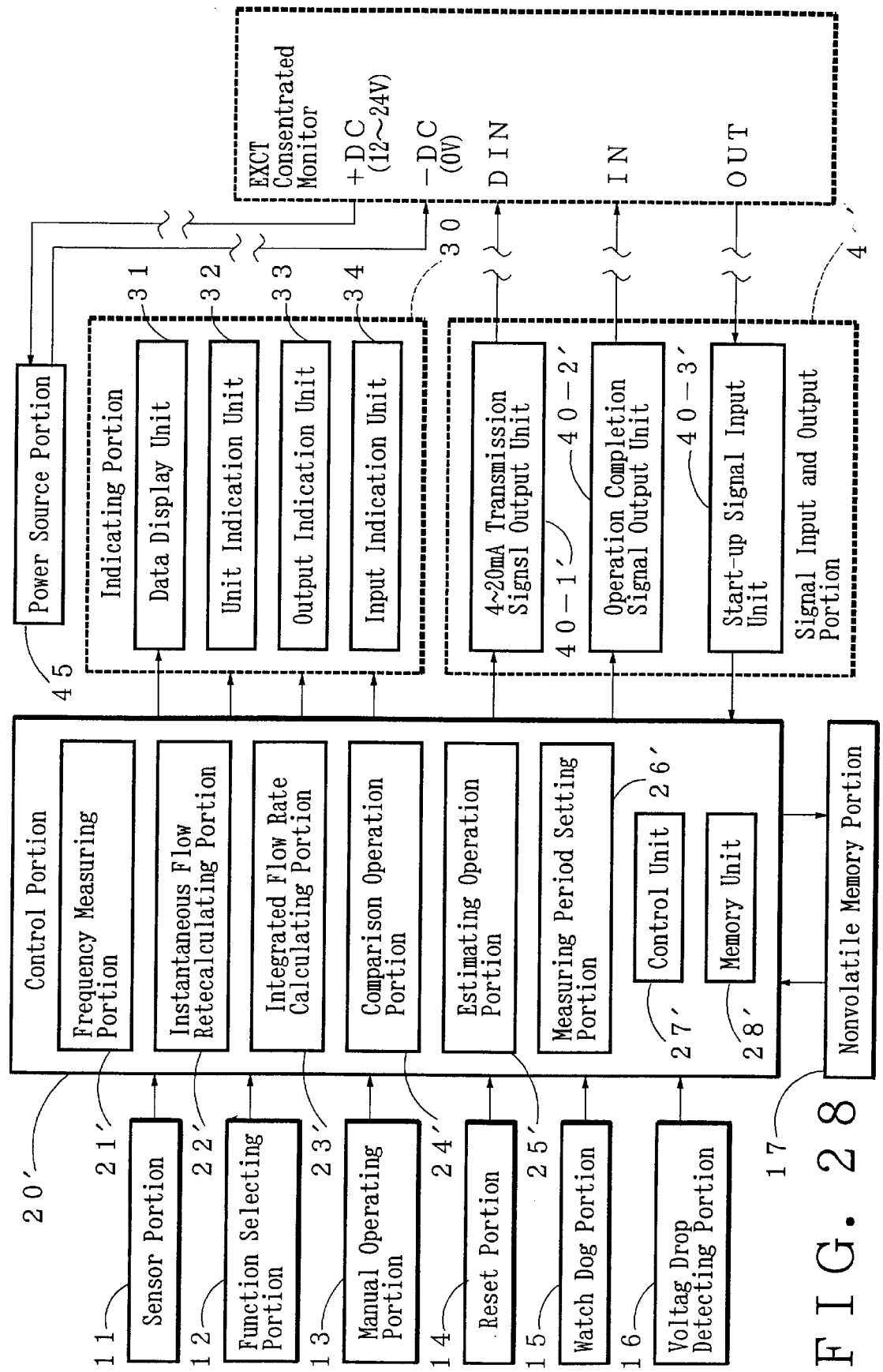
FIG. 28 is a block diagram showing an example of a basic structure of a second embodiment of the flowmeter of the present invention.

Next, a second embodiment of the flowmeter will be described. FIG. 28 is a block diagram showing an example of the basic structure of the flowmeter of the second embodiment.

As shown, the sensor portion 11, the function selecting portion 12, the manual operating portion 13, the reset signal output portion 14, the watch dog timer portion 15, the voltage drop detecting portion 16, the nonvolatile memory portion 17, the indicating portion 30, and the power source portion 45 are the same as those of the flowmeter of the first embodiment shown in FIG. 7. However, though the signal outputting portion 40 is provided in the first embodiment, a signal input and output portion 40' to carry out the input and the output of a signal for the external apparatus EXCT such as the concentrated monitors is substituted for the signal outputting portion 40 in this second embodiment.

Here, the control portion 20' has a frequency measuring portion 21' to measure the frequency of a pulse signal having the frequency corresponding to the flow rate of the measured fluid inputted from the sensor portion 11 every measuring period set by the measuring period setting portion 26', an instantaneous flow rate calculating portion 22' to calculate the corresponding instantaneous flow rate based on the frequency measured by the frequency measuring portion 21', an integrated flow rate calculating portion 23' to calculate an integrated batch flow rate Qb by adding the instantaneous flow rate calculated by the instantaneous flow rate calculating portion 22' every measuring period, a comparison operation portion 24' to compare a preset integrated batch flow rate value Qbs and the integrated batch flow rate value Qb calculated by the integrated flow rate calculating portion 23', an estimating operation portion 25' to estimate an integrated batch flow rate value Qt at the next integrated batch flow rate calculation timing and to compare the above preset the integrated batch flow rate value Qbs and the estimate integrated batch flow rate value Qt, a measuring period setting portion 26' to change a measuring period at the above frequency measuring portion 21' according to the comparison output from the above estimating operation portion 25', a control unit 27' to carry out the control of the whole integrating batch flowmeter based on the control program stored in a memory unit 28', and a memory unit 28' consisting of such as ROM, RAM to store the control program and various data. The control portion 20' is formed of a single tip microcomputer, for example.

Further, the above signal input and output portion 40' has a current range of 4–20[mA] and has a 4–20 mA transmission signal output unit 40-1' to output an analogue flow rate signal corresponding to the flow rate signal to the input terminal DIN of the concentrated monitor EXCT, an operation completion signal output unit 40-2' to output an integrating batch operation completion signal to the input terminal IN of the concentrated monitor EXCT, and a start-up signal input unit 40-3' to receive an integrating batch start-up signal from the output terminal OUT of the concentrated monitor EXCT.

Here, in place of or in addition to the above 4–20 mA transmission signal output unit 40-1', a PWM modulation signal having a duty corresponding to the measured flow rate value or a measured flow rate value itself calculated by the above instantaneous flow rate calculating portion 22' may be outputted to the concentrated monitor EXCT in digital signal.

Figure 29:
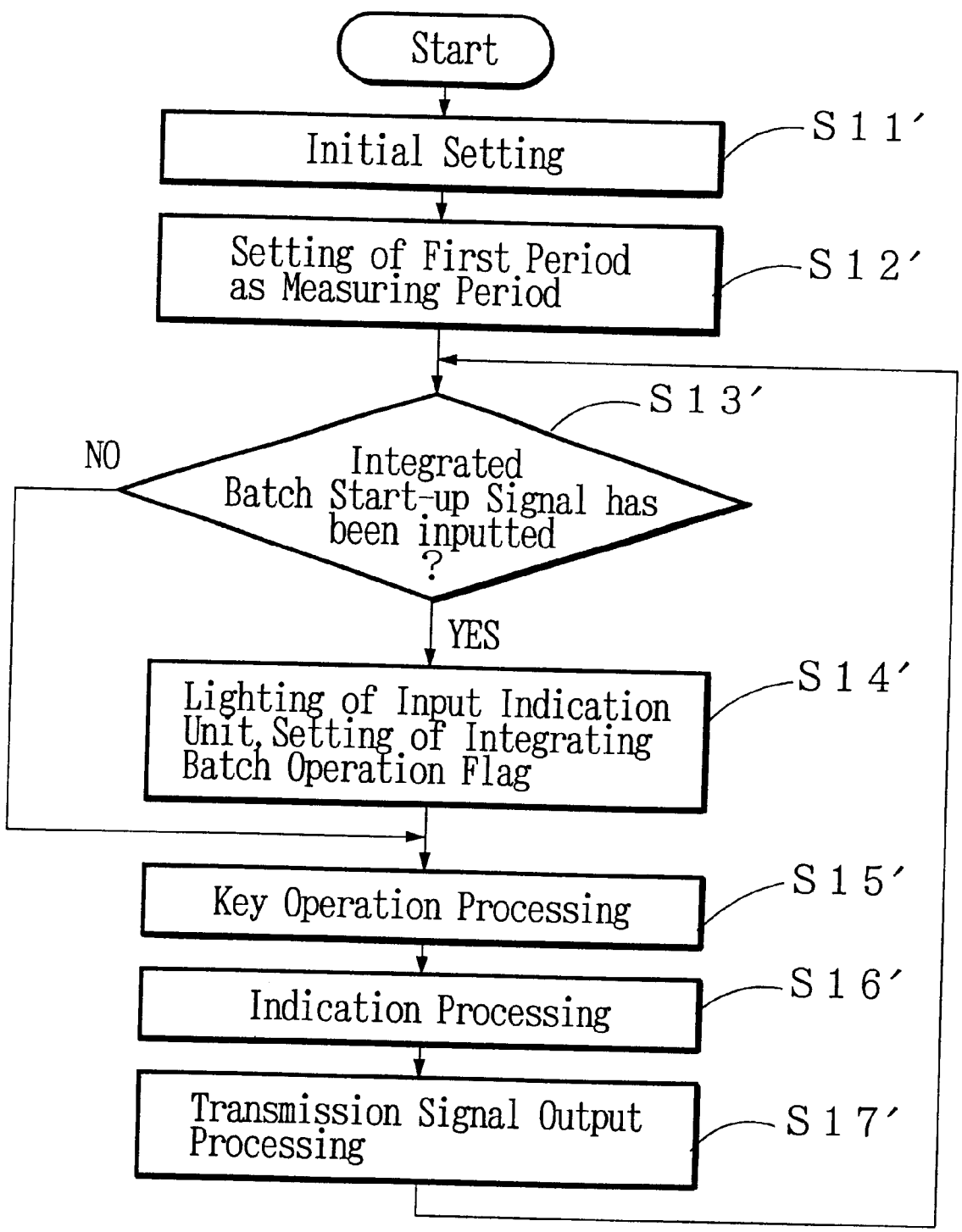
FIG. 29 is a flowchart showing an operation of the flowmeter shown in FIG. 28.
Figure 30:
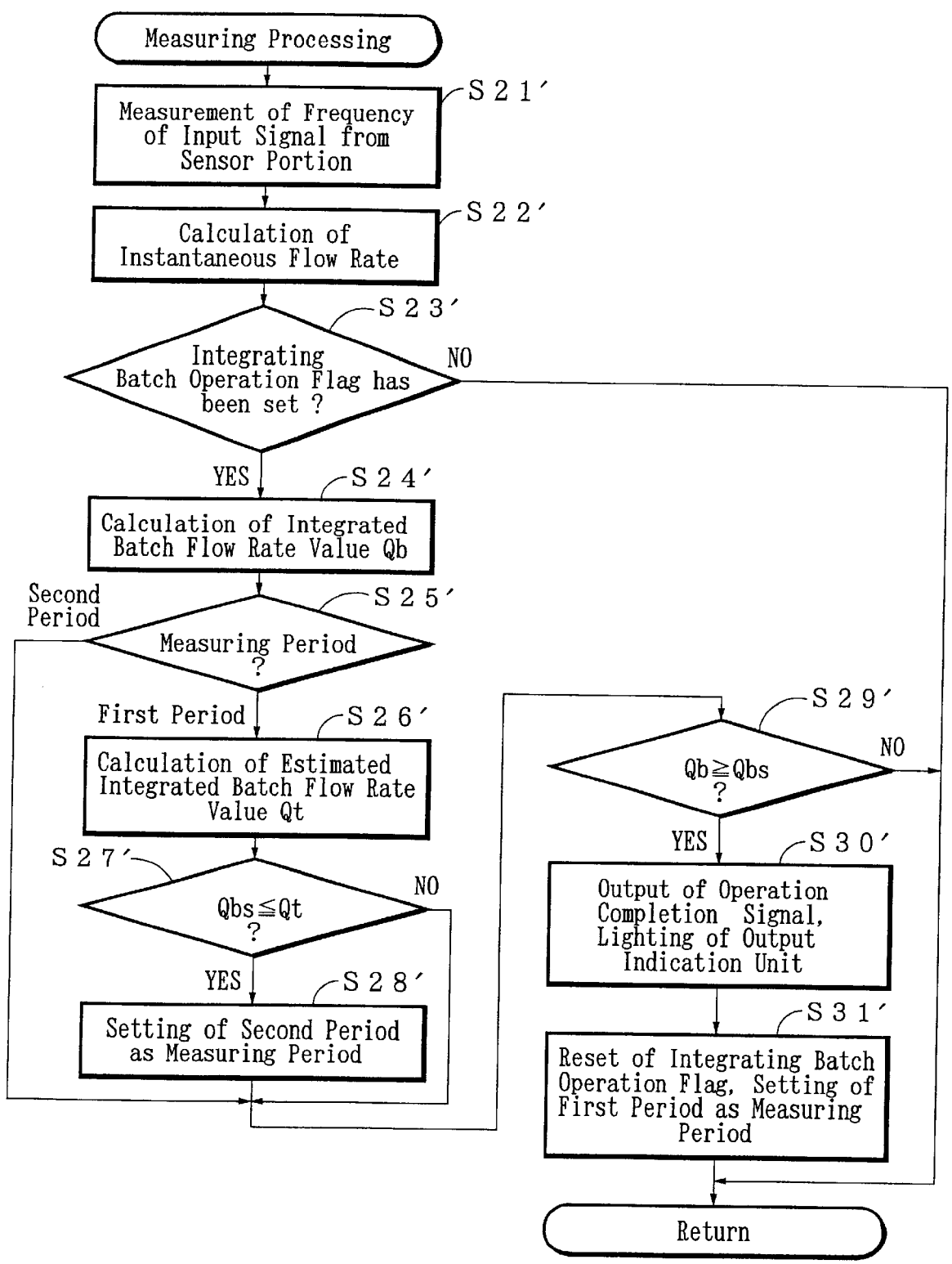
FIG. 30 is also a flowchart showing an operation of the flowmeter shown in FIG. 28.

The operation of the above flowmeter is described referring to the main routine shown in FIG. 29 and a flowchart of the measuring processing shown in FIG. 30. Here, the above measuring processing is started every period to be set by the above measuring period setting portion 26'. And, the above measuring period setting portion 26' sets the first period normally and sets a second period shorter than the above first period when it is judged by the above estimating operation portion 25' that the integrated batch flow rate value Qb will exceed the above preset integrated batch flow rate value Qbs at the next comparison.

In the main routine of FIG. 29, when the operation of the integrating batch flowmeter is started, first in step S11', the initial setting processing of the flags or the registers are carried out. Subsequently, the process goes to step S12' and sets the above measuring period setting portion 26' in the above first period. By this, the above frequency measuring portion 21' measures the frequency of the inputted pulse signal from the above sensor portion 11 every first period, and then the precessings of the above instantaneous flow rate calculating portion 22 and the above integrated flow rate calculating portion 23' are carried out every first period.

Next, the process goes to step S13', it is judged whether or not the integrating batch start-up signal has been inputted from the above start-up signal input unit 40-3'. When the integrating batch start-up signal has not been inputted, the process goes to a key operation processing of step S15'. Meanwhile, when an integrating batch start-up signal is outputted from the above concentrated monitor EXCT and a judgment of the above step S13' is YES, the process goes to step S14', makes the input indication unit 34 turned on, and sets an integrating batch operation flag. And the key operation processing of step S15' is reached.

In the key operation processing of step S15', it is judged whether or not the operation of the above manual operating portion 13 has been carried out. And, the process goes to step S16', and the indication processing is carried out. In this indication processing, a processing to indicate the integrated flow rate value or the instantaneous flow rate value measured by a later-described measuring processing is carried out by using a data display unit 31 and a unit indication unit 32 of the above indicating portion 30. Next, the process goes to step S17', a transmission signal output processing is carried out. In this transmission signal output processing, the measured instantaneous flow rate is outputted to the above concentrated monitor EXCT by using the above 4–20 mA transmission signal output units and so on. And, returning to the above step S13', the above steps S13'–S17' are executed repeatedly. The above is the main routine.

Next, the measuring processing to be executed with the first or second period set by the above measuring period setting portion 26' is described referring to FIG. 30. Here, the measuring period is set in the first period at the starting point.

On starting this measuring processing, first in step S21', the measuring processing of the input signal from the above sensor portion 11 is executed by the above frequency measuring portion 21'. And, the process goes to step S22', the instantaneous flow rate is calculated based on the above frequency data measured by the above instantaneous flow rate calculating portion 22'. Here, it is desirable to calculate this instantaneous flow rate by using the expression (3) rather than using the expression (2) or (3) from viewpoint of the accuracy.

Next, the process goes to step S23', it is judged whether or not the integrating batch operation flag has been set. When the above integrating batch start-up signal has not been inputted, this judgment result comes to NO, and this measuring processing is closed.

Meanwhile, when the above integrating batch operation flag has been set, the process goes to step S24', wherein the instantaneous flow rate value of this time calculated in the above step S22' is added to the integrated value of the instantaneous flow rate value until the last time, and the integrated batch flow rate value Qb is calculated.

And, the process goes to step S25', it is judged whether the measuring period having set in the above measuring period setting portion 26' is the first period or the second period.

As a result of this judgment, when the first period, the process goes to step S26', wherein an estimated value (an estimate integrated batch flow rate value) Qt of the integrated batch flow rate value at the next measuring period is calculated by adding the instantaneous flow rate value of this time calculated in the above step S22' to the integrated batch flow rate value Qb calculated in the above step S24'. And, the process goes to step S27', wherein this estimate integrated batch flow rate value Qt is compared with the preset integrated batch flow rate value Qbs. As a result of this comparison, when the preset integrated batch flow rate value Qbs is larger than the estimate integrated batch flow rate value Qt, step S29' is just reached. Meanwhile, when the estimate integrated batch flow rate value Qt is larger than or equal to the preset integrated batch flow rate value Qbs, the process goes to step S28' since it can be expected that the estimate integrated batch flow rate value Qt exceeds the preset integrated batch flow rate value Qbs at the next measuring time, and the second period having shorter period is set to the above measuring period setting portion 26'. By this, the comparison with the preset integrated batch flow rate value Qbs is executed with the second period.

Meanwhile, when the current measuring period is the second the period, step S29' is just reached.

In step S29', the integrated batch flow rate value Qb calculated at the above step S24 is compared with the above preset integrated batch flow rate value Qbs. As a result of this comparison, this measuring processing is just closed at the time of Qb<Qbc. Meanwhile, at the time of Qb≧Qbs, namely, when the calculated integrated batch flow rate value Qb has become not less than the preset integrated batch flow rate value Qbs, the process goes to step S30', wherein the integrating batch operation completion signal is outputted to the concentrated monitor EXCT through the above operation completion signal output unit 40-2' and the output indication unit 33 of the above indicating portion 30 is turned on. As the result, the concentrated monitor EXCT stops supplying the fluid (liquid) without delay in case of the liquid mixing system, for example. And, the process goes to step S31', wherein the above integrating batch operation flag is reset, the measuring period is set in the above first period when the measuring period has been set in the second period, and the measuring processing is closed.

Figure 43:
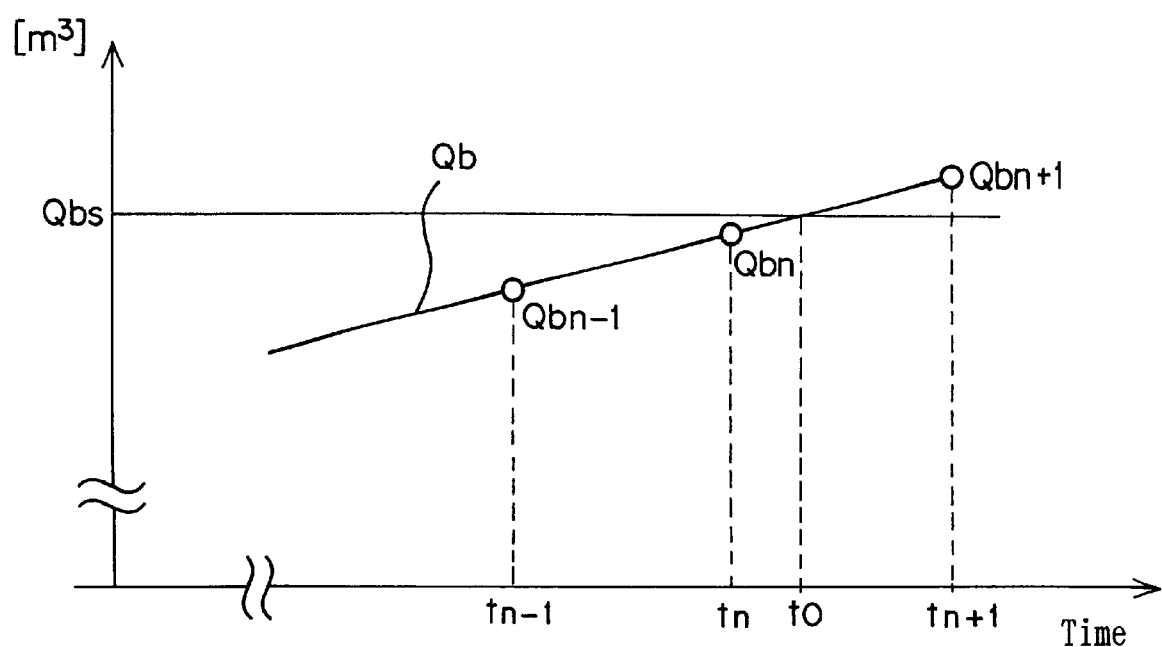
FIG. 43 is a diagram showing an operation in the conventional liquid mixing system.

Here, the measurement with the above first period and the measurement with the above second period may be carried out in the same measuring method. In this case, the measuring accuracy would be a little lower than that of the different method because the measuring period is shorter. However, as described with respect to the above FIG. 43, the delay time of the timing of the integrating batch operation completion can be reduced.

Like this, according to the flowmeter of the present invention, the flowmeter having the integrating batch function can be directly connected to the concentrated monitor, a local monitoring board can be eliminated, thereby downsizing the facility.

And, since the integration processing and the like are not performed at the concentrated monitor EXCT, the processing can be simplified, thereby reducing the memory capacity.

Further, it can be detected without delay that the integrated flow rate value has exceeded the preset integrated flow rate value.

Here, as described above, though it is necessary for the highly accurate measurement of the flow rate from a small flow to a large flow that the frequency of the pulse signal corresponding to the flow rate outputted from the above sensor portion 11 is measured in a short time regardless of flow quantity, the measuring principle described based on the previous figure can be applied.

And, the specific structure of the flowmeter of the second embodiment is similar to the first embodiment shown in FIGS. 8A–8C and 13A–13C.

Next, the operation of the integrating batch flowmeter is described in detail.

The flowmeter works by means of the main routine, the frequency measurement interruption processing, and the 1 msec clock count interruption processing.

Here, the measurement of the integer portion of the frequency of a measured signal by the above main counter according to the above frequency measuring method and a processing related to the measurement of the decimal portion by the above secondary counter are executed by means of the above frequency measurement interruption processing and the 1 msec clock count interruption processing, wherein various processings such as an calculation of the frequency by using the expression (4) by means of the above main routine, an calculation of the instantaneous flow rate value and the integrated batch flow rate value on the basis of the above frequency and their indication, the comparison processing, and the output to the concentrated monitor are executed.

Figure 31:
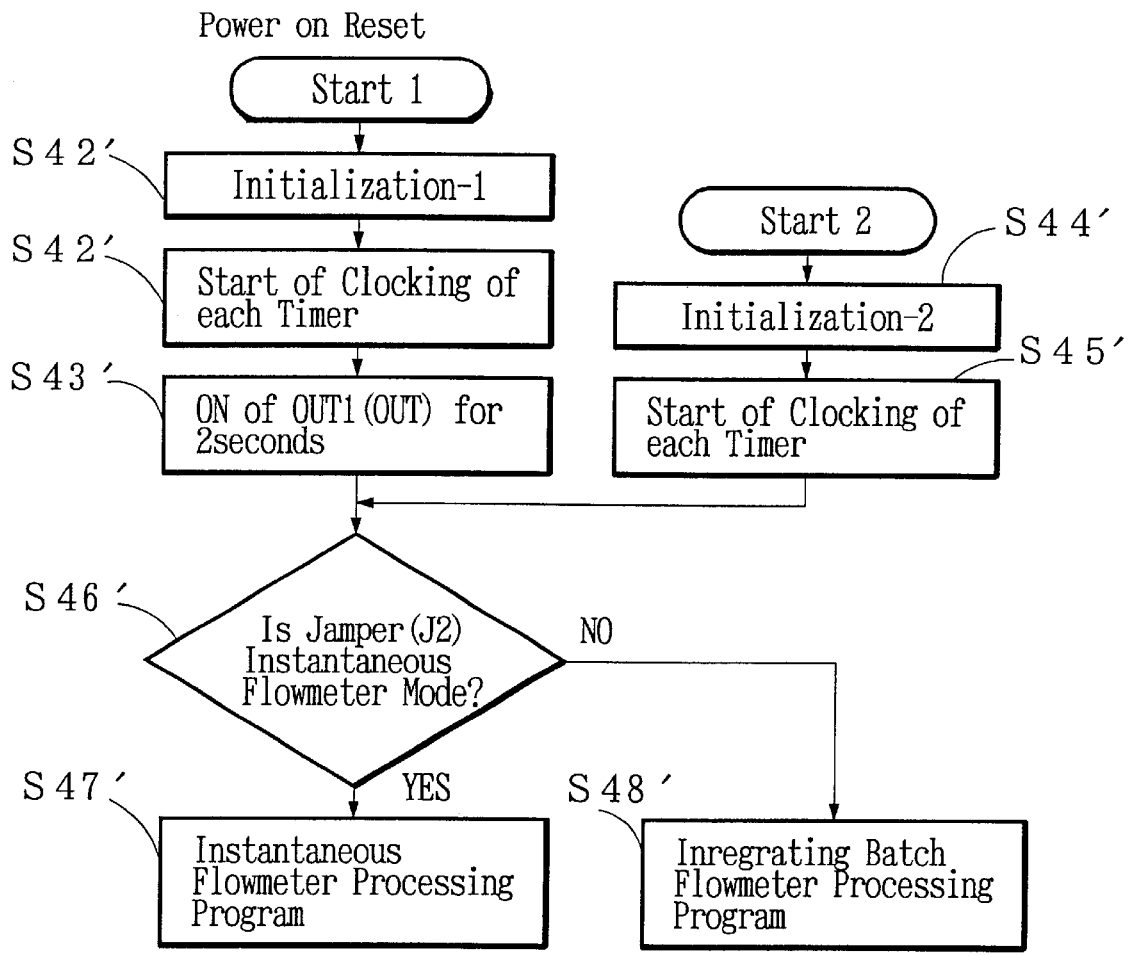
FIG. 31 is a flowchart of a main routine of an integrating batch flowmeter of the second embodiment.

FIG. 31 shows an processing flow of the main routine. As shown, the main routine includes two start positions of a first start (start 1) and a second start. Here, when the reset signal from the above power ON reset circuit 14 has been inputted, the operation starts from the above start 1, and when there has been an interruption input from the above watch dog timer 15, the operation starts from the above start 2.

And, when the power source supply from the above direct current stabilization power source circuit 78 starts by, for example, connecting the flowmeter with the above external apparatus EXCT, the above power ON reset circuit 14 detects the this state and the power ON reset pulse is applied to the microcomputer 20. By this, the processing starts from start 1, and first the first initialization processing of step S41' is executed. With the first initialization processing on the basis of this power ON reset the determined initialization processing of the instantaneous flowmeter is executed, and all the contents of the above RAM 85 is reset. Next, the process goes to step S42', the clock operation each timer of the above timer group 83. However, the timer to generate the above 1 msec reference clock and the above second period timer (0.2 second timer) do not start here, and accordingly the signal from the first period timer is not outputted as described above.

Next, the above output OUT is turned into an ON state for only two seconds (step S43'). By this, the start (start 1) of this instantaneous flowmeter by the power ON reset can be informed to the adjustment test unit. Simultaneously, the above OUT1LED 33 is also lighted for only two seconds.

Meanwhile, when the signal to the above watch dog timer 15 was not outputted in the fixed time-period because of a control program runaway or the like, an interruption signal is inputted from the above watch dog timer 15. And then, the process starts from the above start 2, and the second initialization processing of step S44' is executed. In this second initialization processing, though the fixed initialization processing of the instantaneous flowmeter is executed, the correction coefficient, the integrated flow rate value data, and the integrating batch data all stored in the above RAM 85 are not cleared differently from the above first initialization processing. And, similarly to the above step S42', the clock operation of each timer except for the above second period timer (0.2 second timer) and the 1 msec reference clock timer is started (step S45').

After the above steps S43' or step S45' has been executed, the process goes to step S46', and whether or not the above jumper pin J1 is set to the instantaneous flowmeter mode. When the above jumper pin J1 is in the instantaneous flowmeter mode with the short-circuited jumper pin J1, this judgment result comes to YES, and the instantaneous flowmeter processing program of step S47' is executed. Meanwhile, when the above jumper pin J1 is opened, the integrating batch flowmeter processing program of step S48' is executed. In the integrating batch flowmeter of the present invention, the integrating batch flowmeter processing program (step S48') in case of the judgment result of the above step S46 being NO will be described in detail.

Figure 32:
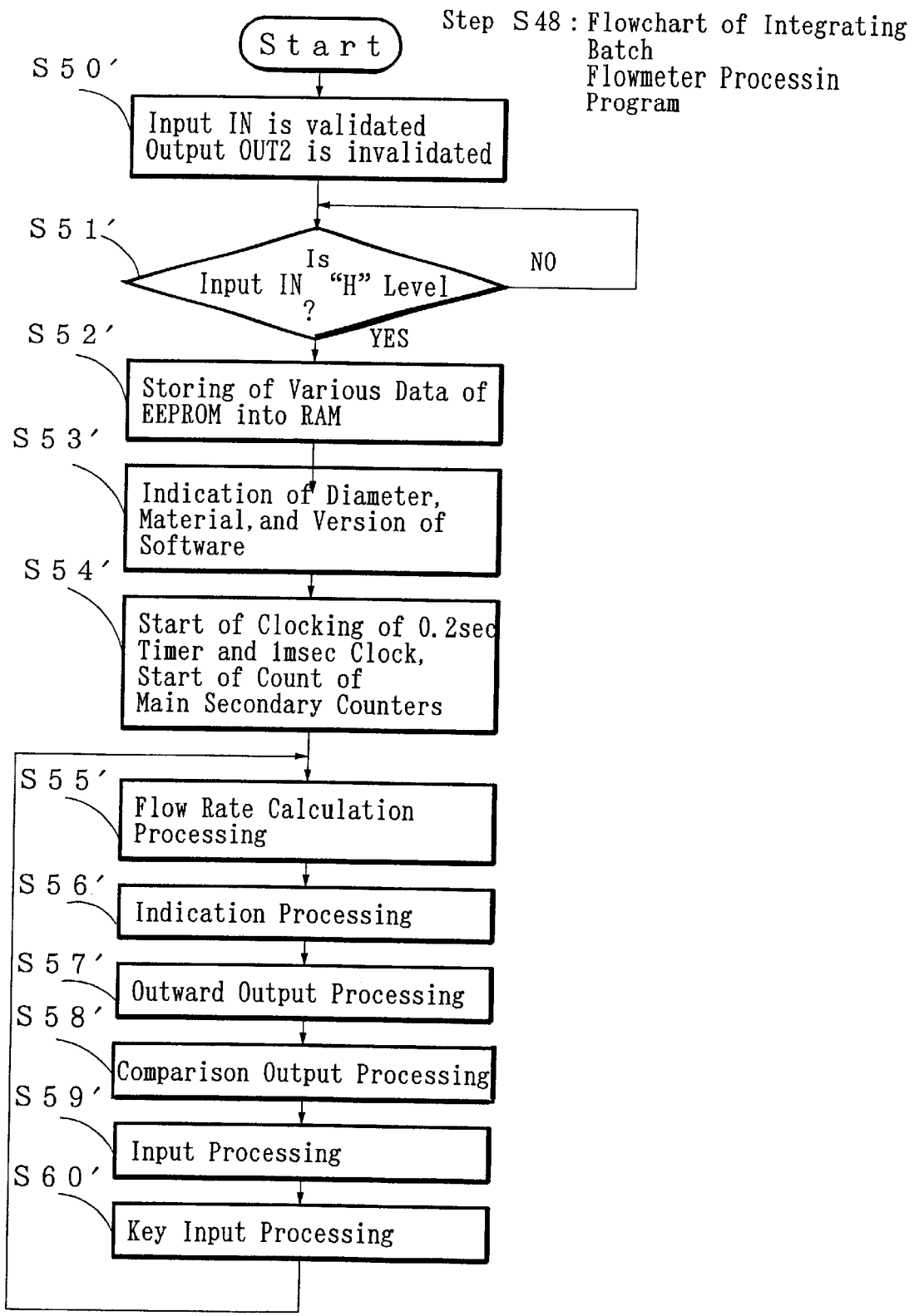
FIG. 32 is a flowchart of a processing program in the integrating batch flowmeter of the second embodiment.

FIG. 32 is a flowchart showing the operation of the integrating batch flowmeter processing program of the step S48'.

On starting the integrating batch flowmeter processing program, first in step S50', the above input IN is validated, and the second output OUT2 is invalidated.

Next, the process goes to step S51' and waits for the above input signal IN coming to High level. Like this, in the integrating batch flowmeter of this embodiment, when the input signal from the above concentrated monitor EXCT, namely the integrating batch start-up signal, has become High level, the operation is started.

Next, the process goes to step S52', wherein the various data (the above linear expression corrected gradient data A1–A5 and the linear expression corrected intercept data B1–B5, and the like) stored in the above EEPROM 17 are read out and stored in the fixed area of the above RAM 85.

Next, the process goes to step S53', wherein, based on the above setting code and the information having been read out from the above EEPROM 17, the diameter and material of the flow-channel and the version information of the control program are indicated on the above indicating portion 30 in turn by the fixed time (for example, 1 sec.).

Like this, in the instantaneous flowmeter of the present invention, since the version of the corresponding control program is indicated at the start of the operation on the indicator 31 for indicating the measurement data, the maintenance becomes very easy.

After having executed the indication (step S53') of the diameter, material, and version of the program, the process goes to step S54', wherein the clock processing of the above 0.2 second timer and the above 1 msec clock are started, and the count processing of the above main/secondary counter is started. And, the register to store a value j showing a position of the 0.2 second interruption within the 1 second is set to 0. The value j is counted as 1 when the 0.2 second interruption is of the same timing as the first signal (1 second timer) and then counted as 2, 3, and 4. And, when j=5, the value j is converted to 0 and is again counted from 1.

And, the flow rate calculation processing of step S55' is just reached. Following the above, the indication processing of step S56', the outward output processing of step S57', the comparison output processing of step S58', the input processing of step S59', and the key input processing of step S60' are executed in turn. And, the process returns to the above step S55' after the key input processing of the above step S60' has been executed, and the processings of the above steps S55'–S60' are executed repeatedly. Here, the details of each processing of steps S55'–S60' will be describe later.

The above is the summary of the integrating batch flowmeter processing program.

Next, the above frequency measurement interruption processing and the 1 msec clock count interruption processing will be described referring to FIGS. 33, 34, and 35.

Figure 33:
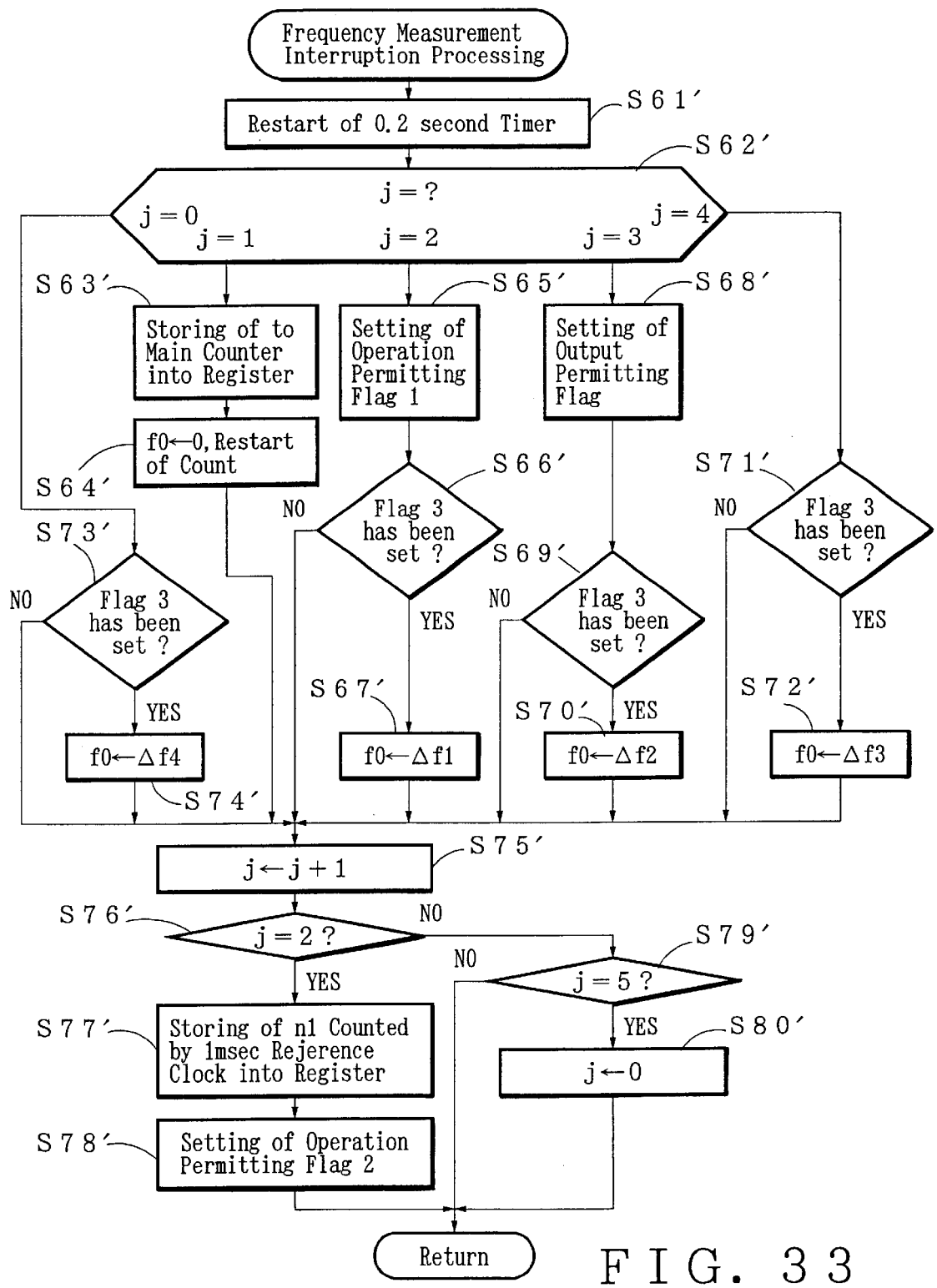
FIG. 33 is a flowchart showing a frequency measurement interruption processing.

FIG. 33 is a flowchart of the above frequency measurement interruption processing. This frequency measurement interruption processing is stated by the output of the above second period timer (0.2 second timer) generated every 0.2 second. Upon starting this processing, first in step S61' the above 0.2 second timer is restarted. By this, an interruption at each 0.2 second can be secured each time. And, as described above, since the above first period timer is generated based on the output of this 0.2 second timer in this embodiment, an accuracy of the output of the first period timer (1 second timer) is also secured.

Next, the process goes to step S62', the contents, i.e. any one of 0–4, of the above register j is checked. And, at the time of j=1 (this is the same timing as the output of the above first period timer), the count contents f0 of the main counter 81 is stored in the register in step S63', the count contents of the main counter 81 is reset in 0 in step S64', the count of the input pulse signal by the main counter 81 is restarted, and step S75' is reached.

Figure 35:
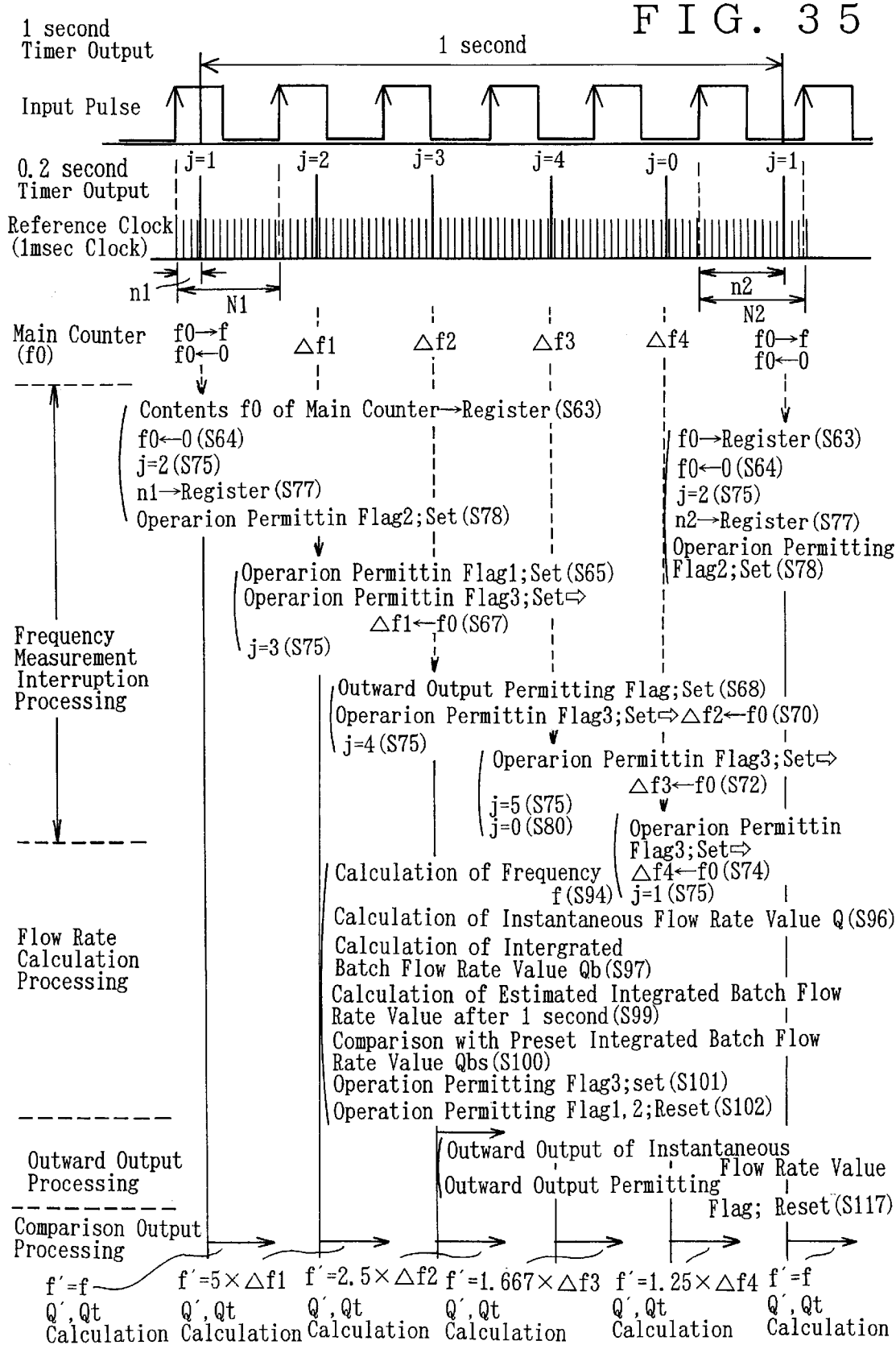
FIG. 35 is a timing chart showing the frequency measurement interruption processing and the 1 msec clock count processing.

By this, as shown in FIG. 35, at the time of j=1, the count value f0 of the main counter is stored in the register at the measurement starting (ending) point of the above first period timer. Accordingly, the number f0 of the input signal pulse inputted during 1 second, namely the integer portion of the frequency of the input signal pulse, is stored in the register.

And, at the time of j=2, the operation permitting flag 1 is set at step S65', and step S66' is reached. And, in step S66' it is judged whether or not the operation permitting flag 3 is set, and the count contents f0 of the main counter 81 is stored in the register as Δf1 (S67') when it has been set, and step S75' is reached. Meanwhile, when the flag 3 has not been set, the process goes to step S75'.

Further, at the time of j=3, the outward output permitting flag is set at step S68', and step S69' is reached. And, it is judged whether or not the flag 3 has been set in step S69', the count contents of the main counter 81 is taken in as Δf2 when the flag 3 has been set, and step S75' is just reached when the flag 3 has not been set.

At the time of j=4, the process goes to step S71', the count contents f0 of the main counter 81 at the time-point is taken in as Δf3' (step S72') when the flag 3 has been set. When it has not been set, step S75' is just reached.

At the time of j=0, the process goes to step S73', the count contents f0 of the main counter 81 at the time-point is taken in as Δf4 when the flag 3 has been set. When it has not been set, step S75' is just reached.

With the above-mentioned processings, as shown in FIG. 35, the contents of the above main counter 81 is taken in each register at each timing. The calculation processing of the frequency of the input pulse signal at each timing is carried out by using these values, f0, Δf1, Δf2, Δf3, and Δf4 having taken in, as described later.

Here, the flag 3 mentioned above and the flag 3 in the flowchart of FIG. 33 each are the above operation permitting flag 3.

Next, the process goes to step S75', and the contents of the above register j is incresed. And, in step S76' it is judged whether or not the contents of the above register j is 2. At the time of j=2, step S77' is reached. As described later, the above secondary counter 82 counts the above 1 msec reference clock from the rising to the dropping of the input pulse from the above sensor portion 11, the count value n1 of the above secondary counter 82 at this point is stored in the register in this step S77'. And, the operation permitting flag 2 is set (step S78'), and the frequency measurement interruption processing of this time is closed.

That is, as shown in FIG. 35, by the above step S77', the time n1, from the rising edge of the input pulse signal just before the above measurement starting point or the measurement ending point to the measurement starting point of this time, counted by means of the 1 msec reference clock is obtained in the register.

Meanwhile, the process goes to S79' when the judgment result of the above step S76' is NO, whether or not j=5 is judged. And, at the time of j=5 the contents of the register j is set in 0, and at the time of j≠5, this frequency measurement interruption processing is just closed. That is, in this step S80' j=5 is replaced with j=0.

Figure 34:
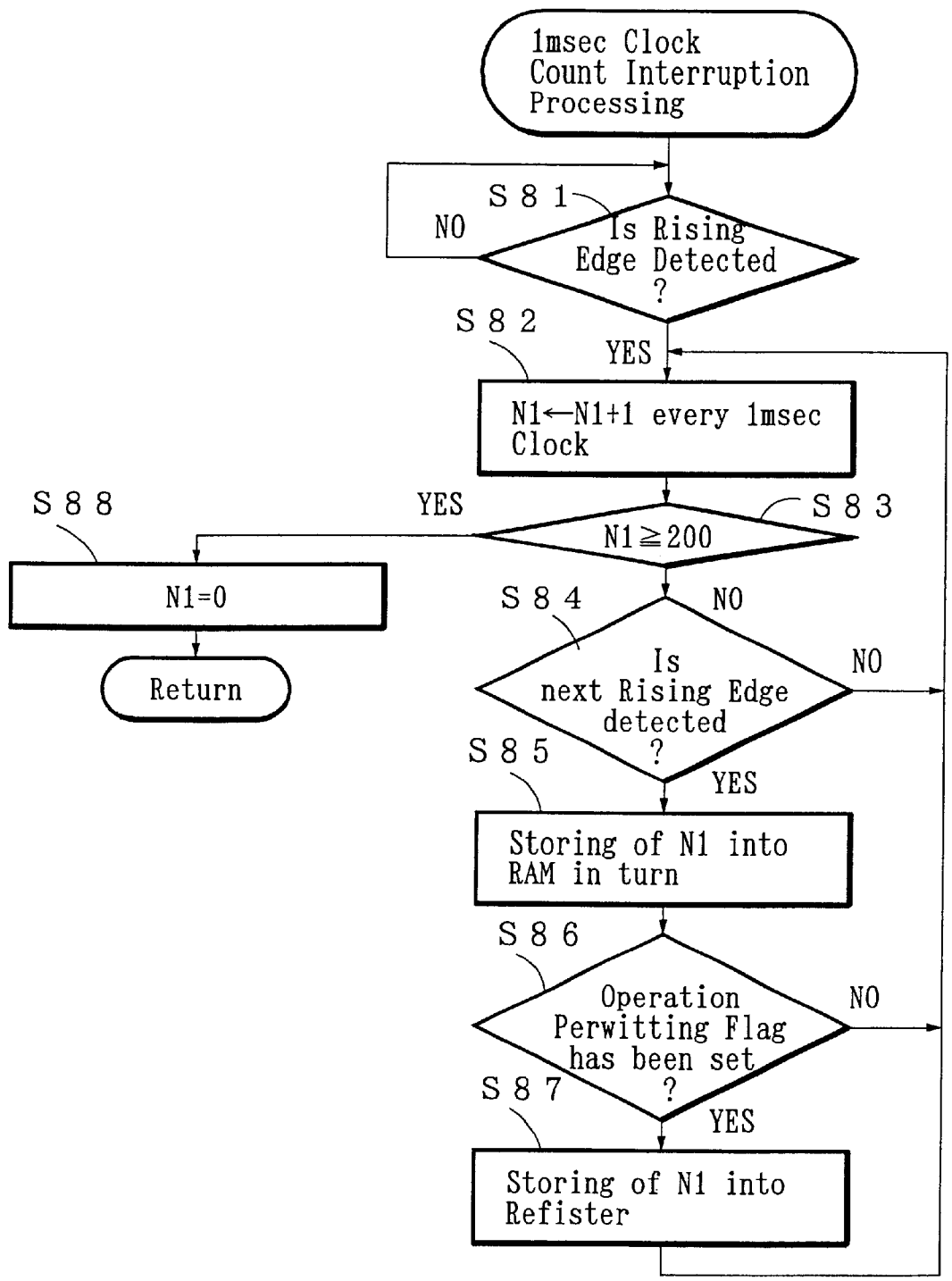
FIG. 34 is a flowchart showing a 1 msec clock count processing.

FIG. 34 is a flowchart showing the above 1 msec clock count interruption processing.

When the rising edge of the above input pulse signal has been detected, this 1 msec clock count interruption processing is started (step S81'), and the count of the 1 msec clock is started (step S82'). Here, this count processing is actually executed in the above secondary counter 82. And, it is judged whether or not the count value N1 is not less than 200 (namely, not less than 1 msec×200=0.2 sec) (step S83'), the above second counter is reset when not less than 200, and the detection of the rising edge of the next input pulse signal is waited (step S88'). Since the measurement bottom frequency is 5 Hz in this example, the measurement bottom frequency is not more than 5 Hz when the period of the input pulse is not less than 0.2 sec, the next input pulse is waited. That is, if the flow occurrence frequency f1 is 5 Hz, no pulse is inputted because there is no measurable flow; that is, the input pulse measurement is not necessary.

Meanwhile, the process goes to S84' when the judgment result of the above step S83' is NO, the count is repeated till the next rising edge is detected (NO of step S84'). And, the count value N1 of the secondary counter 82 is stored in the fixed area of the above RAM 85 when the next rising edge has been detected (step S85'). That is, as shown in FIG. 35, the period of the above input pulse is measured by the 1 msec clock in turn, and the calculated value is stored in the RAM 85 in turn. Here, the count value of this time is stored in an area of the RAM 85 other than the previous area for the last count value. That is, at least, for example, three areas for storing the count values are prepared as the area for storing the count value N1 of the secondary counter 82 of the RAM 85, and just previous three count values N1 are stored therein in turn.

Next, the process goes to step S86', and whether or not the above operation permitting flag 2 is set is judged. When the judgment result is NO, the process returns to the above step S82', the above measurement of the period of the input pulse signal is continued. Meanwhile, when the operation permitting flag 2 is set and the result of the above step S86' is YES, the process goes to step S87', and the count value N1 of this time is read out of the above RAM 85 and stored in the above register. And, the processings after the above step S82' are repeated. That is, like the above, the above operation permitting flag 2 has been set at the timing corresponding to j=1 (step S78' in the above frequency measurement interruption processing), and then the above count value N1 is stored in the register at the rising point of the first input pulse after the measurement starting point as shown in FIG. 35. By this, the period N1, over the time of j=1, of the input pulse signal can be obtained in the register by means of the 1 msec clock count interruption processing.

Like this, the count contents f0 and Δf1–Δf4 of the main counter 81 and the count contents n1 and N1 of the secondary counter 82 are written in the register by means of the above frequency measurement interruption processing and the 1 msec clock count interruption processing. After the above flow rate calculation processing of step S55' (FIG. 32), the flow rate value and the integrated batch flow rate value are calculated using these count values. And these are indicated, outputted outside, and compared with the preset integrated batch flow rate value, and the integrating batch operation completion signal is outputted.

These processings will be described in detail hereinafter.

Figure 36:
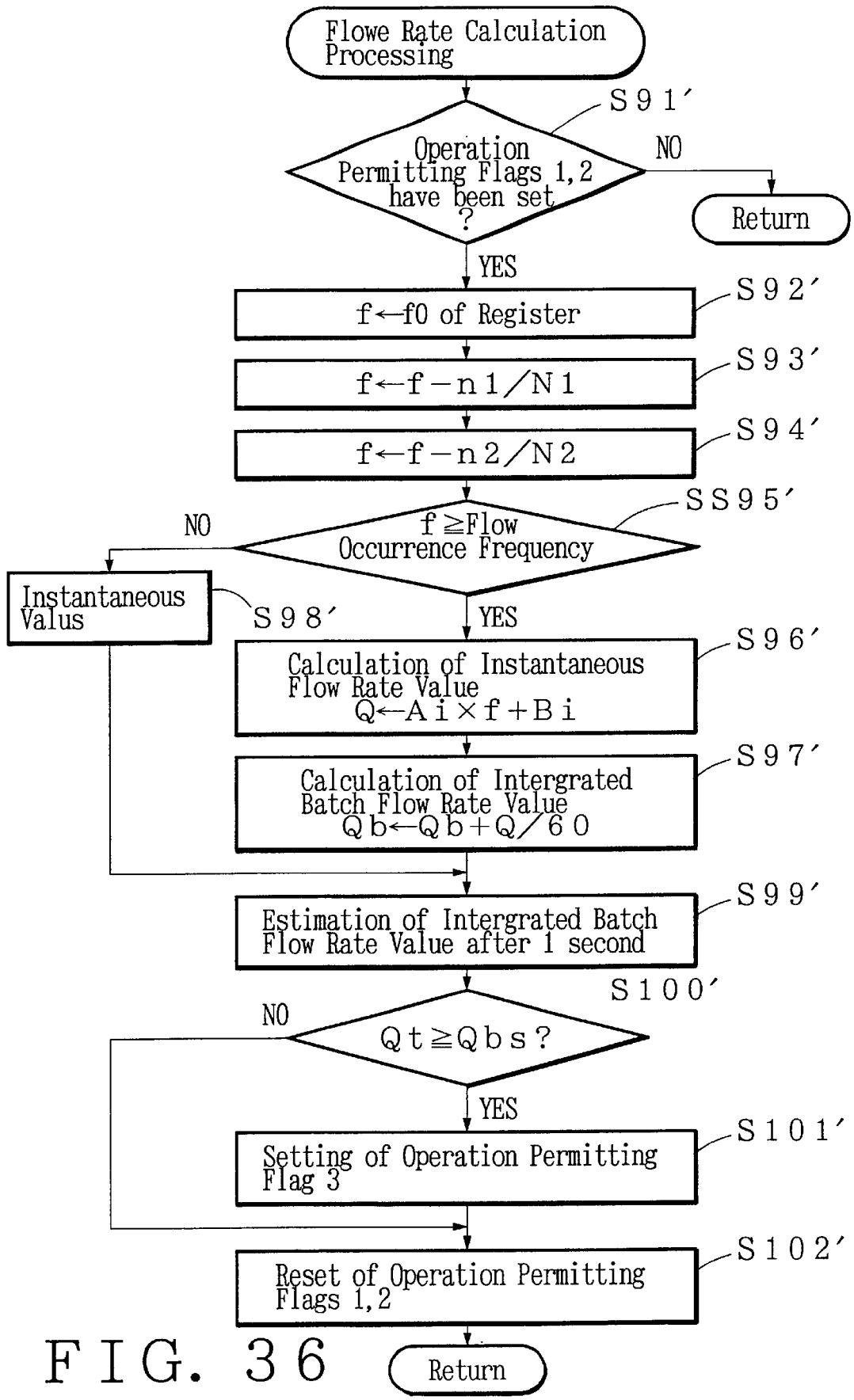
FIG. 36 is a flowchart of a flow rate calculation processing.

FIG. 36 is a flowchart showing the flow rate calculation processing of the above step S55'. Upon starting this processing, first it is judged whether or not the above operation permitting flags 1,2 both have been set (step S91'). Here, when the above operation permitting flags 1,2 are not set, since the count value f0 of the main counter and the count values N1,n1 of the above secondary counter have not been prepared in the above register, it is not the timing to execute the calculation of the instantaneous flow rate value and the integrated batch flow rate value; therefore this flow rate calculation processing is closed.

Meanwhile, when both the above operation permitting flags 1,2 are set (that is, at the time of j=2 and over as shown in FIG. 35), the process goes to step S92', and the number f0 of the input pulse signal counted by the above main counter 81 for 1 second is stored in the register f. Next, the process goes to step S93', and a subtraction of the decimal portion at the measurement starting point is carried out. That is, as stated above, an operation of the front portion "f−n1/N1" of the above expression (4) is carried out by using values of N1 and n1 having been counted by the above secondary counter 82 and having been stored in the register and the result is stored in the above register f. Following the above, the process goes to step S94', and the addition of the decimal portion at the above measurement ending point is carried out. That is, an operation of the rear portion "f+n2/N2" of the above expression (4) is carried out by using values of N2 and n2 having been counted by the above secondary counter 82 and having been stored in the register and the result is stored in the above register f. That is, by the above steps S92', S93' and S94' the operation of the expression (4) is executed, the frequency f of the input pulse signal in 1 second is calculated highly accurately.

Next, the process goes to step S95' and judges whether or not the calculated frequency f is not less than the above flow occurrence frequency F1. When the result is NO, that is, not more than the measurement bottom frequency, the process goes to step S98' and stores 0 in the register Q storing the instantaneous value. Meanwhile, the process goes to S96' when the above frequency f is not less than the flow occurrence frequency F1, the instantaneous flow rate value Q (=Ai×f+Bi) is calculated based on the above expression (3). Here, the correction coefficients Ai and Bi are the ones having been read out from the above EEPROM 17 in the above step S52' (FIG. 32). The above frequency data f1–f6 have become corrected frequency data F1–F6 by the adjustment test process. And, the above instantaneous flow rate value Q is in "L/min".

Following the above, the process goes to step S97', and the integrated batch flow rate value Qb is updated by adding Q/60 thereto by using the instantaneous flow rate value Q calculated at the above step S96'. Here, Q is divided by 60 to be converted to "L/sec".

Following the above, the process goes to step S99', the estimated value Qt of the integrated batch flow rate at next the instantaneous flow rate calculation timing, namely after 1 sec., is calculated. This estimated value Qt is calculated by adding Q/60 to the integrated batch flow rate value Qb calculated in the above step S97', while assuming the current instantaneous flow rate Q is unchangeable.

And, in step S100' the estimated value Qt calculated in the above step S99' is compared with the preset integrated batch flow rate value Qbs. As a result of this comparison, in case of Qt<Qbs, namely when the integrated batch flow rate value Qt after 1 second does not reach the preset integrated batch flow rate value Qbs, step S102' is just reached. Meanwhile, in case of Qt≧Qbs, namely when the integrated batch flow rate value Qt is expected to become not less than the preset integrated batch flow rate value Qbs, the process goes to step S101', the operation permitting flag 3 is set, and step S102 is reached.

Next, in step S102', the above operation permitting flags 1 and 2 are reset, the flow rate calculation processing is closed.

Here, the above operation permitting flag 3 is the one to order to calculate the instantaneous flow rate and the integrated batch flow rate with the shorter period (the period of the second period timer). That is, as described in the above FIG. 33, it is judged whether or not the operation permitting flag 3 has been set at steps S66', S69', S71', and S73' in the above frequency measurement interruption processing. When the operation permitting flag 3 has been set, the count value of the main counter 81 at each time-point is stored in each register as Δf1–Δf4. And, in the comparison output processing (FIG. 39) described in detail after, the instantaneous flow rate and the integrated batch flow rate value Qt are calculated using the corresponding count value f or Δfi (i=1–4) of the main counter 81 every output timing of the second period timer of 0.2 second period, and the comparison with the above preset integrated batch flow rate value Qbs is carried out based on this calculated integrated batch flow rate value Qt.

Like this, in the flowmeter of the present invention, whether or not the integrated batch flow rate becomes not less than the preset integrated batch flow rate value at the next flow rate calculation timing is expected, and the timing to calculate the flow rate is changed to a shorter period based on the expected result.

Figure 37:
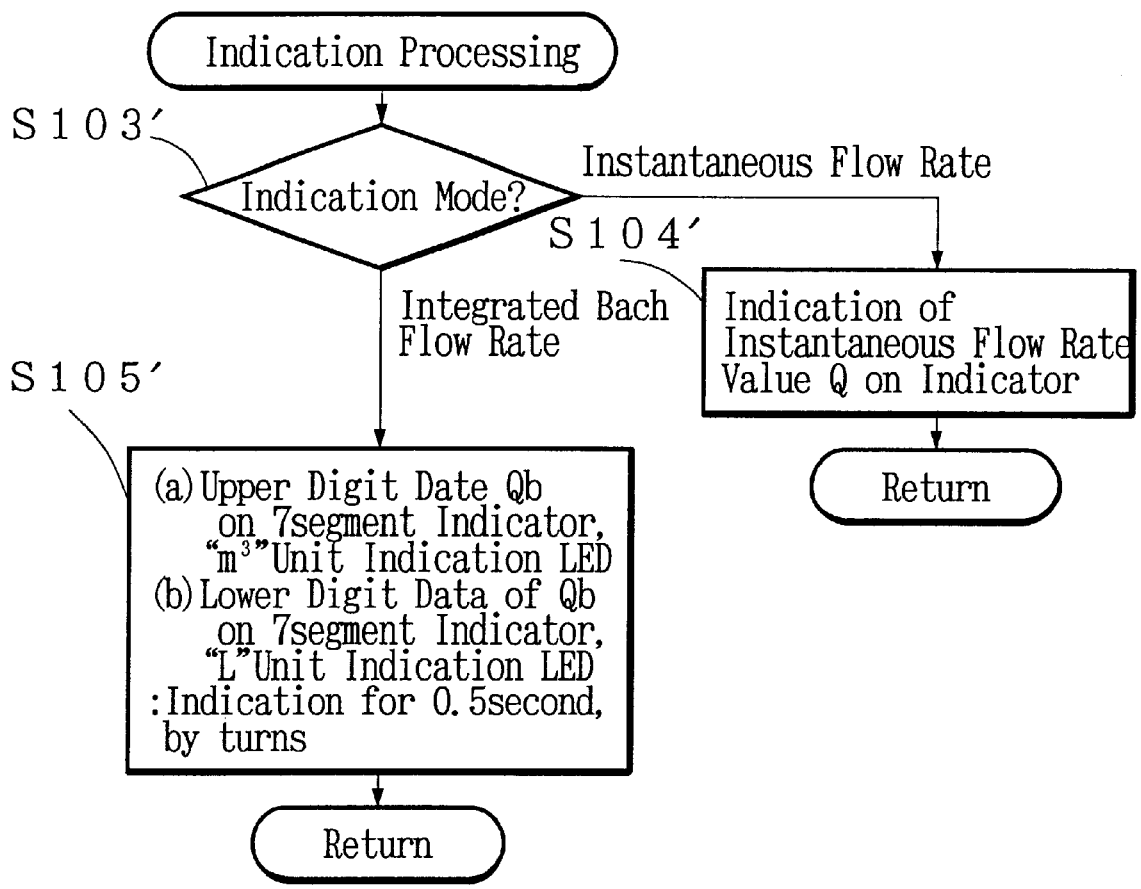
FIG. 37 is a flowchart of an indication processing.

FIG. 37 is a flowchart of the indication processing of the above step S56' (FIG. 32). Upon starting this indication processing, first in step S103' the indication mode having been set is judged. Here, when the indication is set in the instantaneous flow rate, the process goes to step S104', and the instantaneous flow rate value Q calculated in the above flow rate calculation processing is indicated on the above indicator 31. The set of this indication mode is done in a later-described key input processing.

And, when the mode is the integrated batch flow rate indication, the process goes to step S105'. A state of indicating the upper digits (or figures) data of the integrated batch flow rate value and also a "$m^3$" unit indication LED 35 on the above indicator 31 and another state of indicating the lower digits (or figures) data of the integrated batch flow rate value and also a "L" unit indication LED 36 on the above indicator 31 are brought about by turns every fixed time (for example, for 0.5 sec. by turns in 5 sec.)

Figure 38:
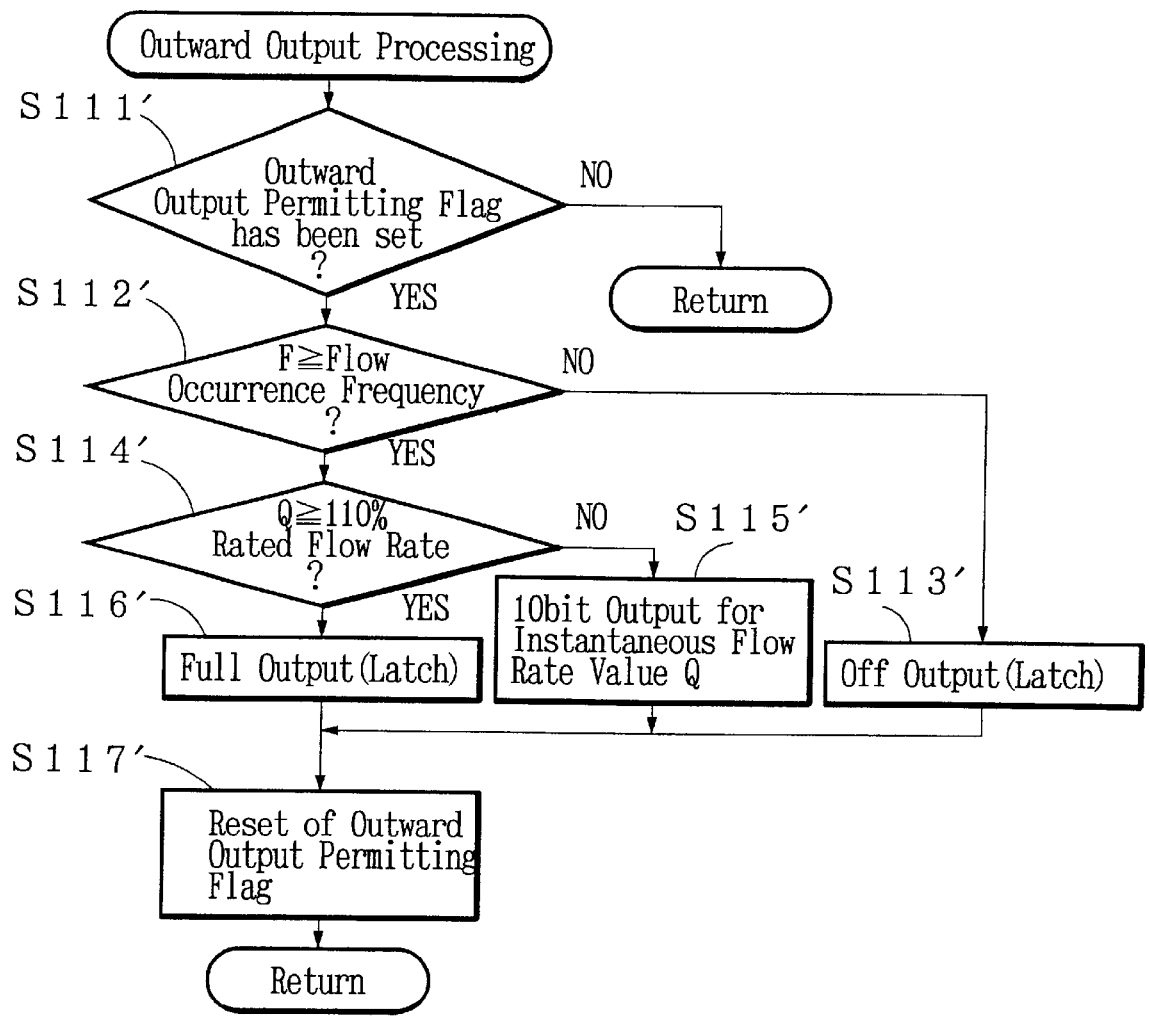
FIG. 38 is a flowchart of an outward output processing.

FIG. 38 is a flowchart of the above outward output processing S57 (FIG. 32). When this outward output processing is started, first in step S111' whether or not the above outward output permitting flag is set is judged. This outward output permitting flag is to be set at the timing of j=3 (FIG. 33) at step S68' in the above frequency measurement interruption processing (FIG. 35). When this outward output permitting flag has not been set, this outward output processing is closed because it is not a timing of outputting outward.

Like this, in the present invention, because there is a fixed timing for the outward output, the accuracy of the data to the external apparatus is improved, thereby securing highly accurate monitoring.

Here, when the outward output permitting flag is set, the process goes to step S112', and whether or not the frequency f calculated at the above step S94' (FIG. 36) is not less than the above flow occurrence frequency F1 is judged. When not less than the flow occurrence frequency F1, the process goes to step S113' and outputs all "0" to the 10-bit output latch. And, when the frequency f is not less than the flow occurrence frequency F1, the process goes to step S114', and whether or not the instantaneous flow rate value Q calculated at the above step S94' (FIG. 36) is not less than the 110% rated flow rate value is judged. When this judgment result is YES, the process goes to step S116' and outputs all "1" to the 10-bit output latch. Meanwhile, if the judgment result of the Step S165 is NO, the process goes to step S115' and outputs a 10-bit output corresponding to the above calculated instantaneous flow rate value Q to the above 10-bit latch. By this, this 10-bit latch output is converted into an analog signal at the 10-bit D/A conversion portion 73 of the above signal outputting portion 40 (FIG. 12) and then converted into a corresponding current signal in the V/I conversion portion 74, and the 4–20 mA transmission signal is outputted.

Here, as described above, the 10-bit measurement result can be outputted to the concentrated monitor EXCT through the output terminal directly in parallel. After having outputted the transmission signal corresponding to the flow rate measured at the above steps S116', S115', or S113' to the concentrated monitor, the above outward output permitting flag is reset in step S117', and the outward output processing is closed.

Like this, in the present invention, since the measurement result having a resolvability of 10-bit is used, error propagation can be prevented, thereby obtaining a highly accurate measurement result.

Figure 39:
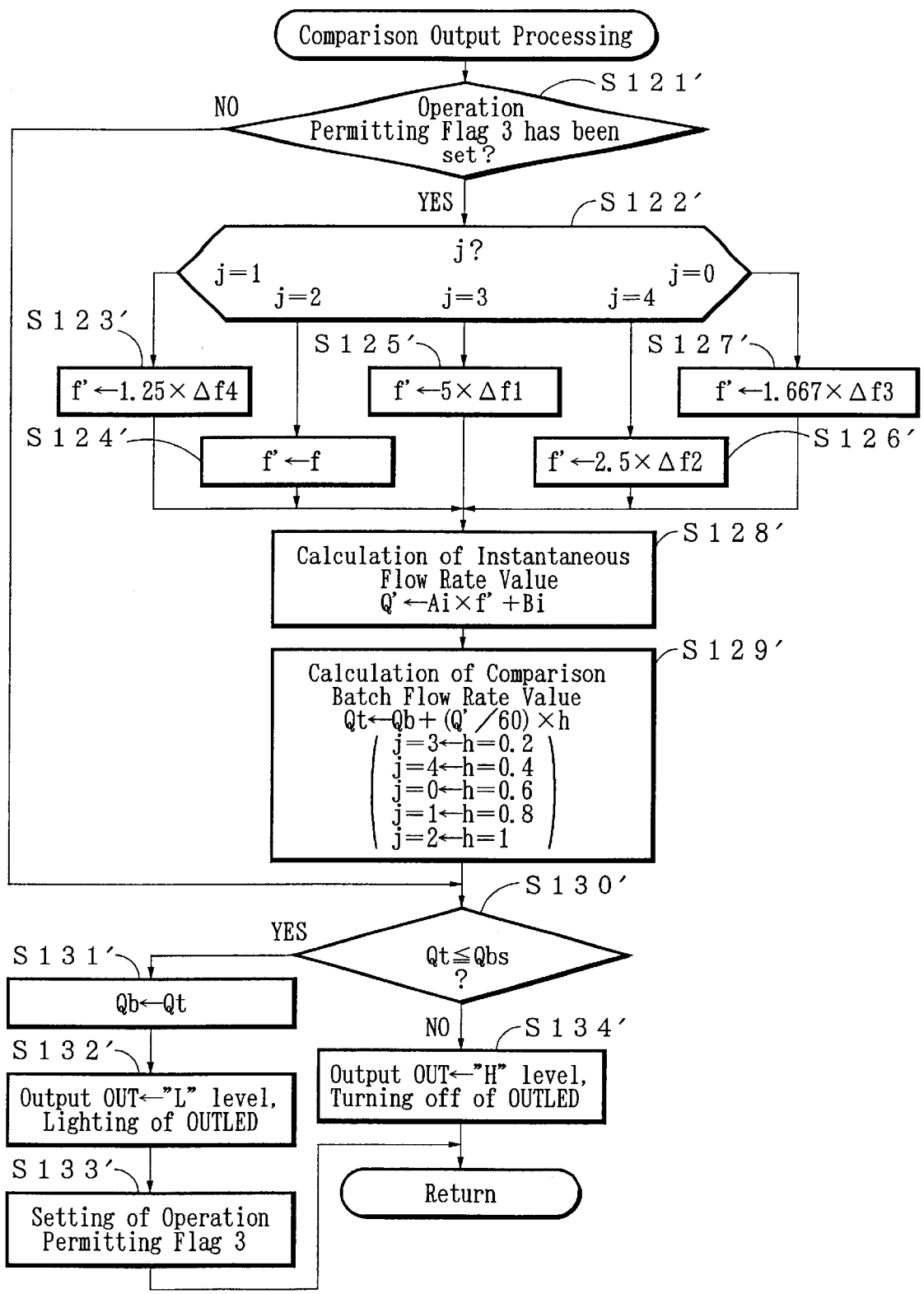
FIG. 39 is a flowchart of a comparison output processing.

FIG. 39 is a flowchart showing the operation of the above comparison output processing S58 (FIG. 32). Upon starting this the above comparison output processing, first in step S121' it is Judged whether or not the above the above operation permitting flag 3 has been set. The operation permitting flag 3 is to be set in step S101' in the above flow rate calculation processing (FIG. 36). Here, when the above operation permitting flag 3 have not been set, the process goes to step S130'.

Meanwhile, when the above operation permitting flag 3 have been set, the process goes to step S122', the timing is found. And, at the time of j=1, step S123' is reached. As described above, in step S73' of the frequency measurement interruption processing (FIG. 33), the count value f0 of the above main counter 81 at the time-point of j=0 is read in the register as Δf4. In this step S123', Δf4×1.25 is stored in the f register as the approximate frequency value, and step S128' is reached.

And, at the time of j=2, the process goes to step S124', and the frequency calculated at step S94' in the above flow rate calculation processing (FIG. 36) is stored in the f' register.

At the time of j=3, Δf1×5 stored in the register is stored in the f' register (step S125'). And similarly, Δf2×2.5 at the time of j=4 and Δf3×1.667 at the time of j=5 are stored in the f' register (step S126', S127'), and step S128 ' is reached.

Here, the operations at the above steps S123', S125', S126' and S127' convert the latest count contents (Δf1–Δf4) of the above main counter 81 at the respective timings into the count contents in 1 second.

Next, the process goes to step S128', the instantaneous flow rate value Q' (=Ai×f'+Bi) is calculated with the expression (3) by using the frequency value f' stored in the above f' register. Next, the process goes to step S129', and the comparison batch flow rate value (Qt=Qb+(Q'/60)×h) to be compared with the above preset integrated batch flow rate value Qbs is calculated by using the above calculated instantaneous flow rate value Q'. Here, h is a coefficient to correct the instantaneous flow rate value (the flow rate in 1 second) calculated at the above step S128 according to the value of j. As shown, the value of h is: 0.2 at the time of j=3; 0.4 at the time of j=4; 0.6 at the time of j=0; 0.8 at the time of h=1; and 1 at the time of j=2.

And, the process goes to step S130', the comparison batch flow rate value Qt calculated in the above step S129' and the above preset integrated batch flow rate value Qbs is compared. Here, even if the above operation permitting flag 3 is not set and the result is NO in S121', the above comparison is carried out in this step S130'. However, in this case, the integrated batch flow rate value Qb calculated in the above flow rate calculation processing is compared with the above preset integrated batch flow rate value Qbs. By this, when the integrated batch flow rate value Qb agrees with the preset integrated batch flow rate value Qbs, that is, at the timing of synchronizing with the one second timer output, reaching the preset integrated batch flow rate value Qbs can be detected.

As a result of comparison of step S130', when Qt≧Qbs, the process goes to step S131', and the above comparison batch flow rate value Qt is stored as the integrated batch flow rate value Qb. And, in step S132' Low level is outputted to the above output OUT, and the above OUTLED33 is lighted. And, the process goes to step S133', the above operation permitting flag 3 is reset, and the comparison output processing S58' is closed.

Meanwhile, as a result of comparison of the above step S130', when the comparison batch flow rate value Qt does not reach the preset integrated batch flow rate value Qbs, the process goes to step S134'. And, the above output OUT comes to High level, the above OUTLED 33 is turned off, and the comparison output processing S58 is closed.

Like this, in the flowmeter of the present invention, when it is expected that the integrated batch flow rate value Qbs at the next measuring period (after 1 sec.) becomes not less than the preset integrated batch flow rate value Qbs, namely, when the operation permitting flag 3 is set at step S101' in the above flow rate calculation processing, the count contents of the main counter 81 is read in every second period (0.2 second), and the integrated batch flow rate value (the comparison integrated batch flow rate value) Qt is compared with the integrated batch flow rate value Qbs based on the latest count contents. Accordingly, differently from the conventional integrating batch flowmeter, it can be prevented that the integrated batch flow rate is detected later than the time when the integrated batch flow rate has just reached the preset integrated batch flow rate.

Here, though the flow rate at each timing of the second period is calculated by correcting the count value f0 of the main counter 81 at the point according to the value of j in the comparison output processing (FIG. 39) stated above, a method is not limited to this.

For example, a difference Δf of the count value f0 of the above main counter 81 is calculated every second period, the flow rate is calculated with Δf×5 being an approximate value of the input pulse, and the integrated batch flow rate may be calculated every second period based on the above.

Further, k in the next expression (6) is calculated from the integrated batch flow rate value Qb of this time calculated in the above flow rate calculation processing (FIG. 36), the instantaneous flow rate value Q of this time, and the preset integrated batch flow rate value Qbs. The above integrating batch operation completion signal may be outputted at the timing corresponding to the value of k.

$$K=(Qbs-Qb)/(Q/60) \qquad (6)$$

That is, the integrating batch operation completion signal is outputted at the timing of:

j=2 at the time of 0.1<k≦0.3;
j=3 at the time of 0.3<k≦0.5;
j=4 at the time of 0.5<k≦0.7;
j=0 at the time of 0.7<k≦0.9; and
j=1 at the time of 0.0<k≦0.1 and 0.9≦k≦1.0.

Figure 40:
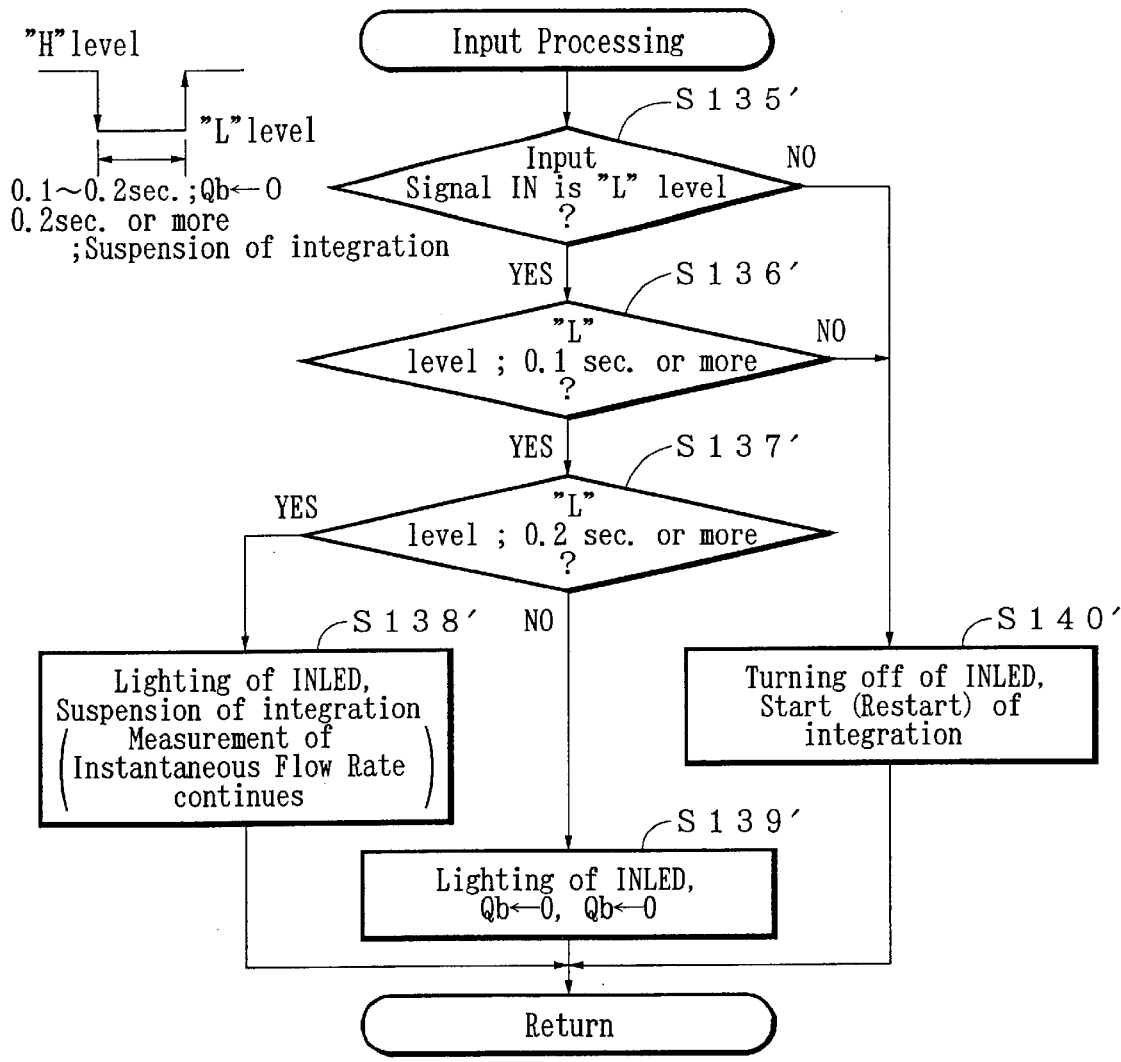
FIG. 40 is a flowchart of an input processing.

FIG. 40 is a flowchart of the above input processing S59' (FIG. 32). In this processing, the integrating batch operation of the flowmeter is started by the input signal IN outputted from the above concentrated monitor EXCT. Though this input signal IN is normally of High level here, the case of Low level can be applied.

In this input processing, first, whether or not the above input signal IN has been of Low level not less than the first fixed time (for example, 0.1 second) is judged (step S135', S136'). If not, the process goes to step S140', the Input INLED 34 is kept in a turned-off state, and the integrating (totalizing) of the flow rate is continued.

Meanwhile, if YES, the process goes to step S137', and whether or not the time of continuation of the input signal IN being Low level is not less than the second fixed period (for example, 0.2 second) is judged. As a result of this judgment, when the time of continuation of the input signal IN being Low level is 0.1 second and more and below 0.2 second, the process goes to step S139'. And, the above input INLED 34 is lighted, the above integrated batch flow rate value Qb stored in the register and the above comparison batch the flow rate value Qt are cleared, and the input processing is closed. And then, the integrated batch flow rate value Qb is integrated (totalized) from 0 again.

And, when the time of continuation of the input signal IN being Low level is not less than 0.2 second, the process goes to step S138'. And, the above input INLED 34 is lighted, the integrating (totalizing) of the above flow rate is suspended, and the input processing is closed. At this time, the measurement of the above instantaneous flow rate is not stopped. That is, when the time of continuation of the input signal IN being Low level is not less than 0.2 second, the integration of the flow rate is suspended until the input signal IN comes to High level. And, when the input signal IN has come to High level, the judgment result of the above step S135' comes to NO, and the integration is restarted at step S140'.

Here, in above-mentioned description, the above first and second fixed time are not limited to 0.1 second and 0.2 second, respectively.

Figure 41:
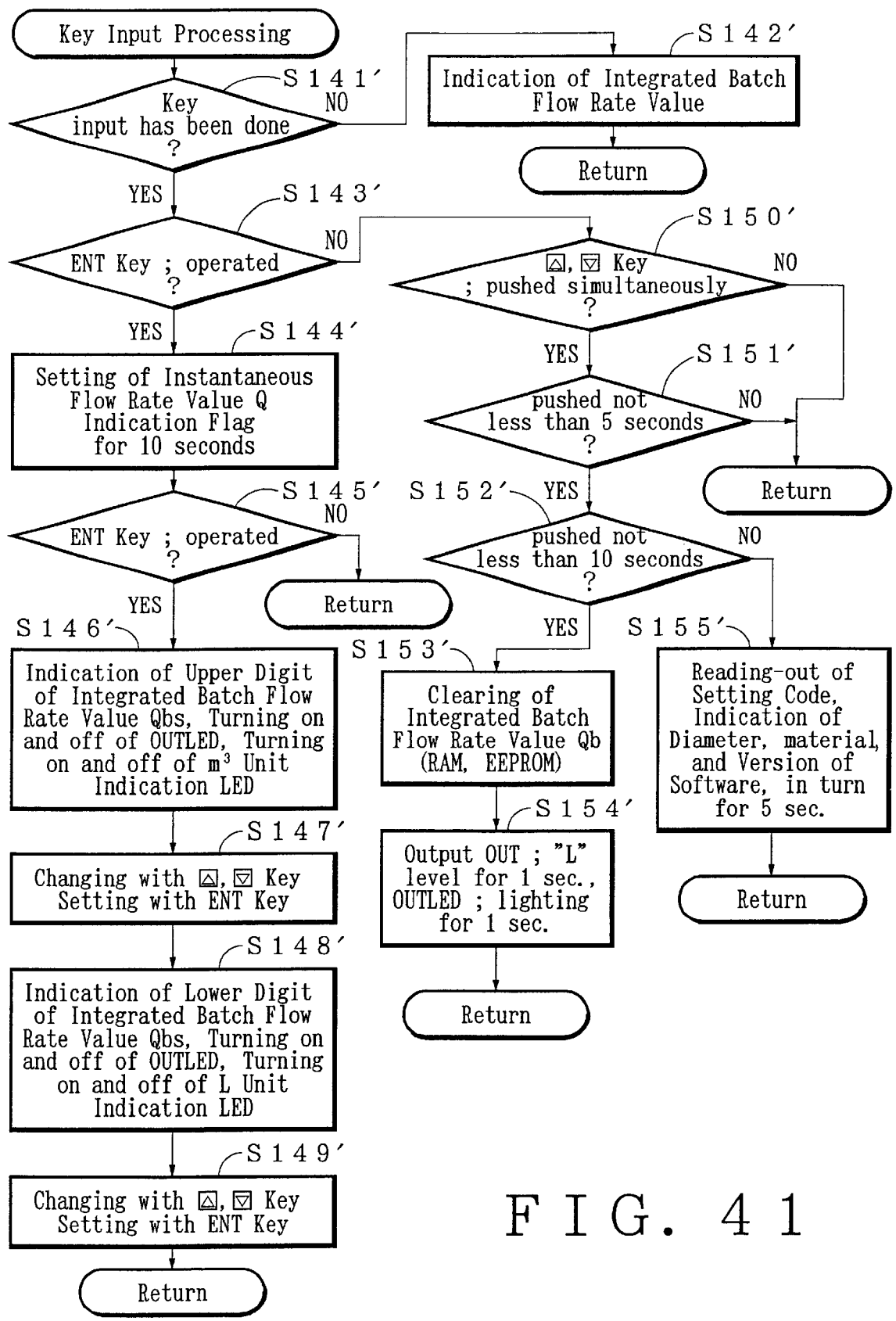
FIG. 41 is a flowchart of a key input processing.
Figure 42:
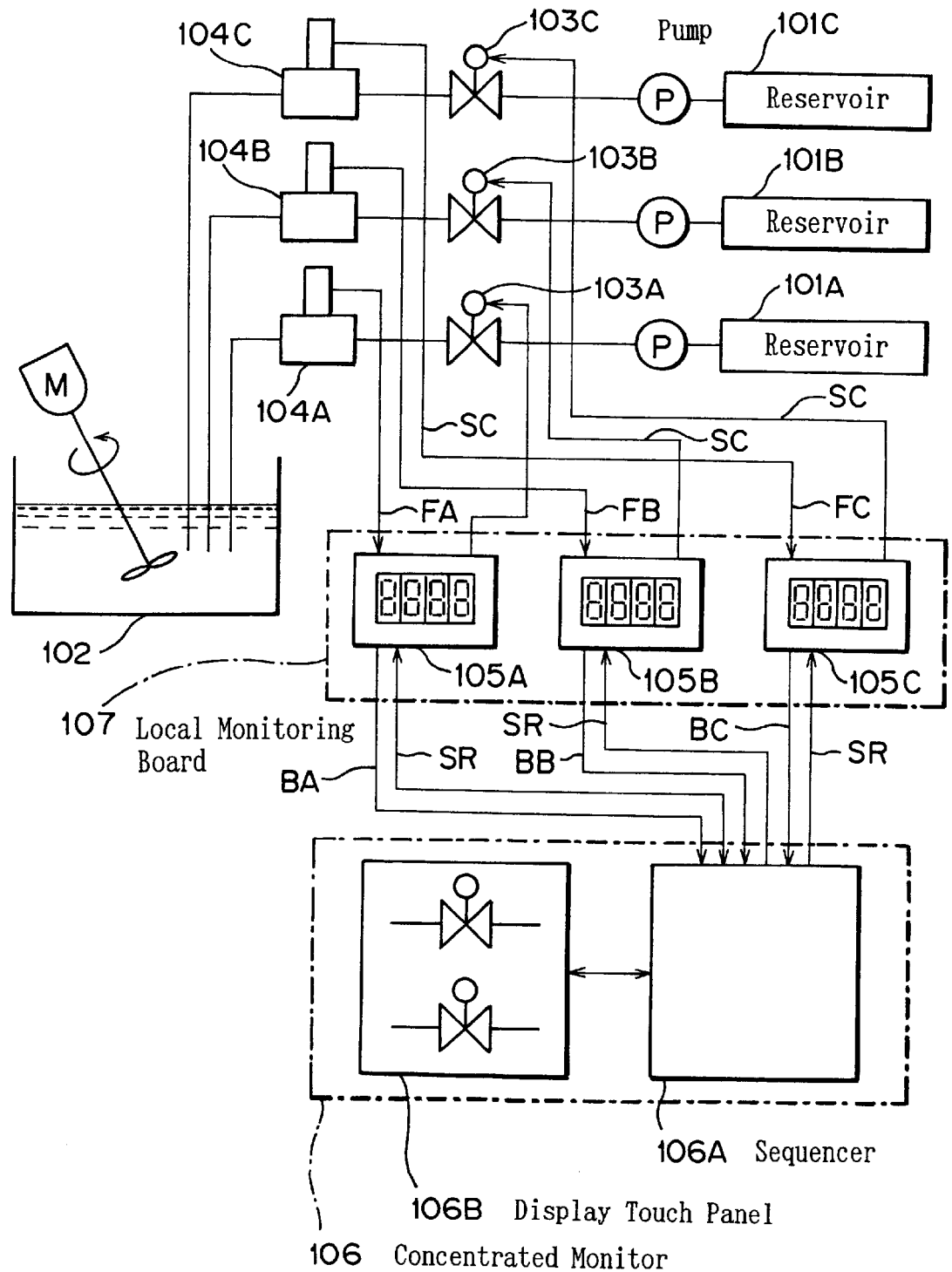
FIG. 42 is a schematic diagram showing an example of a conventional liquid mixing system.

FIG. 41 is a processing flowchart of the above key input processing S60 (FIG. 32). Upon starting this key input processing, first in step S141', whether or not any one of the up key (the Δ key) 42, the set key (the ENT key) 41, and the down key (the ▽ key) 43 of the above manual operating portion 13 is operated is judged. Here, if an key operation is not detected, the process goes to step S142', the above instantaneous flow rate value Q is indicated, and the key input processing is closed.

When the key operation has been detected, the process goes to step S143' and judges whether or not the operated key is the ENT key 41. If the operated key is the ENT key 41, the process goes to step S144', and the instantaneous flow rate value Q indication flag is set for a fixed time-period (here, 10 seconds). By this, in step S103' of the above indication processing (FIG. 37) the indication mode comes to the instantaneous flow rate mode, and the above instantaneous flow rate value Q is indicated on the indicating portion 30. And, the process goes to step S145' and judges whether or not the above ENT key 41 has been operated again. And, when the ENT key 41 has not been operated, the key input processing is just closed.

Like this, the instantaneous flow rate value Q can be indicated on the above indicating portion 30 for the fixed time with one operation of the ENT key 41.

Meanwhile, when the judgment result of the above step S145' is YES with the ENT key 41 having been operated again, the process goes to step S146', wherein the upper digits (or figures) of the above-preset integrated batch flow rate value Qbs is indicated on the above indicator 31, and the above OUTLED 33 and the m³ unit indication LED 35 are indicated on and off. An operator can change the value of the above Qbs by using the above Δ key 42 or ▽ key 43 and can set it with the ENT key 41 (step S147'). When the ENT key 41 is operated and the set of this Qbs is completed, the process goes to step S148', wherein the lower digits of the above preset integrated batch flow rate value Qbs is indicated on the above indicator 31 this time, and the above OUTLED 33 and the L unit indication LED 36 are indicated on and off. And, in step S149', an operator can change the value of the above Qbs by using the above Δ key 42 or ▽ key 43 and can set it with the ENT key 41 similarly to the above. When the ENT key 41 is operated in this step S149', the key input processing is brought to an end.

Like this, the integrated batch flow rate value Qbs can be changed and set by pushing the ENT key 41 twice.

Meanwhile, when the result at the above step S143' is NO, that is, when the operated key is the Δ key 42 or the ▽ key 43, the process goes to step S150', and whether or not the above Δ key 42 and ▽ key 43 were pushed simultaneously is judged. And, when this judgment result is YES, whether or not the Δ key 42 and ▽ key 43 were being pushed for the third fixed time (for example, for 5 seconds) simultaneously is further judged (step S151'). When the judgment result of the above step S150' is NO or the judgment result of the above step S151' is NO, that is, when the Δ key 42 and ▽ key 43 were not being pushed for the third fixed time (5 seconds) simultaneously, this key input processing is closed.

Meanwhile, the Δ key 42 and ▽ key 43 have been pushed for the above third fixed time simultaneously, and accordingly when the judgment result of the above step S151' is YES, the process goes to step S152' and judges whether or not the above Δ key 42 and ▽ key 43 were being pushed for the fourth fixed time (for example, for 10 seconds) simultaneously. If NO, that is, when the Δ key 42 and the ▽ key 43 were being pushed not less than 5 seconds and below 10 seconds, the process goes to step S155', wherein the above setting code is read out, and information about the diameter, material, version of the software are indicated for the fixed time-period in turn. This is similar to the indication at the above step S53' (FIG. 32). After this step S155', the key input processing is closed.

And, when the judgment result of the above step S152' is YES, that is, when the Δ key 42 and the ▽ key 43 have been simultaneously pushed continuously not less than the fourth fixed time (for 10 seconds), the process goes to step S153', and the integrated batch flow rate value Qb stored in the above RAM 85 and EEPROM 17 is cleared. And, the process goes to step S154', wherein the above output OUT signal comes to Low level for the fixed time-period (for example, 1 second), it is informed to the above concentrated monitor EXCT that the integrated batch flow rate value Qb has been cleared, the above OUTLED 33 is lighted for 1 second, and the key input processing is closed. By this, the integration of the integrated batch flow rate value Qt can be restarted from 0 again.

Like this, in this key input processing the above Δ key 42 and ▽ key 43 are mainly used for the setting change, and the ENT key 41 is used for the decision, whereby the set and change of each parameter can be easily carried out.

Here, in the embodiment stated above, though the measurement of the number and the period of the input pulse is carried out by using the rising time-point of the input pulse, the dropping time-point of the input pulse may be also used.

And, the above first period, second the period, and reference clock period may be changed suitably, not limited to the above-described ones. For example, a higher-speed reference clock can give a higher resolvability in the measurement.

Further, in the embodiment stated above, though the indicator 31 is of the LED having three figured, the LED having four figures, eight figures, or the like can be used. Further, another indication element such as LCD (liquid crystal display) can be used, not limited to the LED.

Still further, though the estimate integrated batch flow rate Qt is calculated, while assuming that the instantaneous flow rate value of this time continues for 1 second, in the calculation of the estimate integrated batch flow rate value Qt at the above steps S26' (FIG. 30) and step S99' (FIG. 36), the estimate integrated batch flow rate value Qt may be calculated by means of a method such as linear approximation using the last several instantaneous flow rate values.

Still further, though Karman vortex type flow sensor is applied, a supersonic flow sensor, an eddy current flow sensor, an electromagnetic flow sensor, a turbo flow sensors, and the like may be used.

Still further, the measured fluid may not be a liquid but a gas.

SUSCEPTIBILITY IN INDUSTRIAL APPLICATION

As described hereinabove, according to the flowmeter of the present invention and the control method thereof, the instantaneous flow rate value can be measured highly accurately every first period.

And, the integrated flow rate can be indicated with a lot of figures, which makes the flowmeter convenient.

Further, since the measured flow rate can be transmitted to an external apparatus at a fixed timing based on the measurement result with high resolvability, highly accurate monitoring can be performed without deviation of data.

Still further, the flow detecting switch enables an operator to decide whether or not the switch output shall be carried out in a high-speed mode.

Still further, the set point of the switch output can be easily changed in the flow detecting switch.

And, since a local monitoring board is not required, downsizing of the apparatus can be attained and also a wiring process can be eliminated.

And, since the integration processing and the comparison processing are carried out in the integrating batch flowmeter, these processings need not be executed in the concentrated monitor, whereby load at the concentrated monitor can be reduced, and memory capacity can be also reduced.

Further, since the measuring period is shortened right before the integrated batch flow rate value reaches the preset integrated batch flow rate value, a highly accurate integrating batch processing can be attained.

Still further, since a highly accurate measurement result can be obtained in the measurement with a short period, a highly accurate measured flow rate can be transmitted to an external apparatus, thereby attaining few deviations of data and highly accurate monitoring.

Still further, since the preset integrated batch flow rate value can be changed by means of a key operation, the integrating batch flowmeter with good operability can be provided.

Still further, in a measuring and monitoring system including an external apparatus EXCT, even if the system has been stopped once, the system can be restarted without resetting the integrated batch flow rate value, while executing correct batch control. Therefore, the reserved fluid having not been completely mixed is not wasted.

What is claimed is:

1. The flowmeter characterized by comprising:
    a sensor portion to output a pulse signal having a frequency corresponding to a flow rate to be measured;
    a first signal generating portion to generate a first signal having a first period;
    a first measuring portion to count number of pulses outputted from the sensor portion during the first period according to the first signal;
    a second measuring portion to measure position of the first signal in a pulse including the first signal in its period;
    a first arithmetic portion to calculate the frequency of the pulse signal every first period on a basis of both of a count value by the first measuring portion and a measurement result by the second measuring portion;
    a second arithmetic portion to calculate an instantaneous flow rate on a basis of the frequency having been calculated, and
    a means for invalidating the measurement result when a state that a pulse period of the pulse signal is equal to a period corresponding to a commercial alternating current power supply frequency has occurred successively fixed times.

2. A flowmeter comprising:
    a sensor portion to output a pulse signal having a frequency corresponding to a measured flow rate,
    a frequency measuring portion to measure the frequency of the pulse signal,
    an instantaneous flow rate calculating portion to calculate an instantaneous flow rate on a basis of the frequency of the pulse signal having been measured,
    an integrated flow rate calculating portion to calculate an integrated flow rate by integrating the instantaneous flow rate,
    and an indicating portion to indicate the instantaneous flow rate or the integrated flow rate,
    wherein the indicating portion is capable of indicating the integrated flow rate with an indication method of either a fixed-point system of a floating-point system selectively, and
    the indicating portion indicates the integrated flow rate, while switching indication of upper figures and lower figures of the integrated flow rate in turn.

3. A flow detecting switch, characterized by comprising:
    a sensor portion to output a signal corresponding to a measured flow rate,
    an instantaneous flow rate measuring portion to measure an instantaneous flow rate on a basis of the signal from the sensor portion,
    a comparing portion to compare the instantaneous flow rate value calculated by an arithmetic portion with a preset flow rate value having been preset, and
    a switch output portion to output either one of a high level signal and a low level signal, being a digital signal, on a basis of a comparison result of the comparing portion,
    wherein the comparing portion has two operation modes of a normal mode to compare the instantaneous flow rate value calculated by every first period with the preset flow rate value and a high-speed mode to compare the instantaneous flow rate value calculated every second period shorter that the first period with the preset flow rate value.

4. The flow detecting switch as set forth in claim 3, characterized in that the instantaneous flow rate measuring portion has
    a first signal generating portion to generate a first signal having a first period,
    a first measuring portion to count number of pulses included in a pulse signal outputted from the sensor portion during the first period according to the first signal,
    a second measuring portion to measure a position of the first signal in a pulse including the first signal in its period, and
    a first arithmetic portion to calculate a frequency of the pulse signal every first period on a basis of both a count value by the first measuring portion and a measurement result by the second measuring portion.

5. The flow detecting switch as set forth in claim 3 or claim 4, characterized in that
    a plurality of values can be set as the respective preset flow rate values, and the switch output portion is controlled by a logical sum of comparison results for the respective preset flow rate values.

6. A flowmeter for carrying out flow measurement on a basis of a flow detection signal outputted from a flow sensor according to a flow rate of a measured fluid, characterized by comprising an instantaneous flow rate calculating means to calculate an instantaneous flow rate every fixed measuring period on a basis of the flow detection signal, an integrated flow rate calculating means to calculate an integrated flow rate by integrating the instantaneous flow rate, a judging means to judge whether or not the integrated flow rate has reached a preset integrated flow rate, an integration completion informing means to output an integration completion signal when the integrated flow rate has reached the preset integrated flow rate, an estimating operation means to calculate an estimated value of the integrated flow rate calculated by the integrated flow rate calculating means at a next measuring time-point and to judge whether or not the estimated value of the integrated flow rate reaches the preset integrated flow rate, and a measuring period controlling means to change the measuring period of the instantaneous flow rate calculating means to a shorter period when the estimating operation means has judged that the estimated value of the integrated flow rate at the next measuring time-point reaches the preset integrated flow rate.

7. The flowmeter as set forth in claim 6, characterized in that the integrated flow rate calculating means starts an integrating operation of the instantaneous flow rate according to an integration start direction signal supplied from an outside.

8. The flowmeter as set forth in claim 7, characterized in that the integrated flow rate is reset when the integration start direction signal has continued not less than a first fixed time and below a second fixed time, the integrating operation by the integrated flow rate calculating means is stopped when the integration start direction signal has continued not less than the second fixed time, and the integrating operation is restarted when an input of the integration start direction signal has disappeared.

9. The flowmeter as set forth in claim 6 or claim 7, characterized in that the estimating operation means calculates an estimated value of the integrated flow rate at the next measuring time-point by using the instantaneous flow rate having been calculated.

10. The flowmeter as set forth in claim 6 or claim 7, characterized in that the instantaneous flow rate calculating means has a first signal generating portion to generate a first signal having a first period, a first measuring portion to count number of pulses included in the flow detection signal inputted during the first period according to the first signal, a second measuring portion to measure a position of the first signal in a pulse including the first signal in its period, and a first arithmetic portion to calculate a frequency of the flow detection signal every first period on a basis of both of a count value by the first measuring portion and a measurement result by the second measuring portion, and a second arithmetic portion to calculate the instantaneous flow rate on a basis of the frequency having been calculated.

11. The flowmeter as set forth in claim 6 or claim 7, characterized by further comprising a manual operating portion for enabling the preset integrated flow rate to be changed.

12. A control method of a flowmeter for carrying out flow measurement on a basis of a flow detection signal outputted from a flow sensor according to a flow rate of a measured fluid, characterized by comprising the steps of:

an instantaneous flow rate calculating step to calculate an instantaneous flow rate every fixed measuring period on a basis of the flow detection signal;

an integrated flow rate calculating step to calculate an integrated flow rate by integrating the instantaneous flow rate;

a judging step to judge whether or not the integrated flow rate has reached a preset integrated flow rate;

an integration completion informing step to inform of an integration completion when the integrated flow rate has reached the preset integrated flow rate;

an estimating operation step to calculate an estimated value of the integrated flow rate calculated by the integrated flow rate calculating step at a next measuring time-point and to judge whether or not the estimated value of the integrated flow rate reaches the preset integrated flow rate; and a measuring period controlling step to change the measuring period of the instantaneous flow rate calculating step to a shorter period when the estimating operation step has judged that the estimated value of the integrated flow rate at the next measuring time-point reaches the preset integrated flow rate.

13. The control method of the flowmeter, as set forth in claim 12, characterized in that the integrated flow rate calculating step starts an integrating operation of the instantaneous flow rate according to an integration start direction signal supplied from an outside.

14. The control method of the flowmeter, as set forth in claim 13, characterized in that the integrated flow rate is reset when the integration start direction signal has continued not less than a first fixed time and below a second fixed time, the integrating operation by the integrated flow rate calculating step is stopped when the integration start direction signal has continued not less than the second fixed time, and the integrating operation is restarted when an input of the integration start direction signal has disappeared.

15. The control method of the flowmeter, as set forth in claim 12 or claim 13, characterized in that the estimating operation step calculates an estimated value of the integrated flow rate at the next measuring time-point by using the instantaneous flow rate having been calculated.

16. The control method of the flowmeter, as set forth in claim 12 or claim 13, characterized in that the instantaneous flow rate calculating step comprises the steps of:

a first step to count number of pulses included in the flow detection signal inputted during a first period according to a first signal having the first period, a second step to measure position of the first signal in a pulse including the first signal in its period, a third step to calculate a frequency of the flow detection signal every first period on a basis of both of a count value by the first step and a measurement result by the second step, and a fourth step to calculate the instantaneous flow rate on a basis of the frequency calculated at the third step.

17. A recording medium having recorded a control program for making a flowmeter carry out flow measurement on a basis of a flow detection signal outputted from a flow sensor according to a flow rate of a measured fluid, which recording medium having recorded a control program makes a flowmeter:

calculate an instantaneous flow rate every fixed measuring period on a basis of the flow detection signal;

calculate an integrated flow rate by integrating the instantaneous flow rate on a basis of an instruction from an outside;

judge whether or not the integrated flow rate has reached a preset integrated flow rate;

inform of an integration completion when the integrated flow rate has reached the preset integrated flow rate;

calculate an estimated value of the integrated flow rate calculated at a next measuring time-point and judge whether or not the estimated value reaches the preset integrated flow rate; and change the measuring period for calculating the instantaneous flow rate to a shorter period when it has been judged that the estimated value of the integrated flow rate reaches the preset integrated flow rate.

* * * * *